United States Patent
Zhou et al.

(10) Patent No.: US 12,393,328 B2
(45) Date of Patent: *Aug. 19, 2025

(54) CROSS-DEVICE OBJECT DRAG METHOD AND DEVICE

(71) Applicant: HUAWEI TECHNOLOGIES CO., LTD., Guangdong (CN)

(72) Inventors: Xingchen Zhou, Nanjing (CN); Youhui Lin, Nanjing (CN); Huan Wang, Nanjing (CN); Yuan Cao, Nanjing (CN); Ning Ding, Nanjing (CN); Xi Wei, Shenzhen (CN); Haijun Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,068

(22) Filed: Jun. 18, 2024

(65) Prior Publication Data

US 2024/0338118 A1    Oct. 10, 2024

Related U.S. Application Data

(63) Continuation of application No. 18/015,383, filed as application No. PCT/CN2021/108611 on Jul. 27, 2021.

(30) Foreign Application Priority Data

Jul. 29, 2020 (CN) .......................... 202010747181.x

(51) Int. Cl.
G06F 17/00 (2019.01)
G06F 3/0486 (2013.01)
G06F 3/14 (2006.01)

(52) U.S. Cl.
CPC .......... *G06F 3/0486* (2013.01); *G06F 3/1454* (2013.01)

(58) Field of Classification Search
CPC .. G06F 3/0486; G06F 3/1454; G06F 3/04883; G06F 3/0482; G06F 3/0485
See application file for complete search history.

(56) References Cited

U.S. PATENT DOCUMENTS 6,211,879 B1    4/2001 Soohoo
6,331,840 B1   12/2001 Nielson et al.
(Continued)

FOREIGN PATENT DOCUMENTS

| CN | 101354639 A | 1/2009 |
|----|-------------|--------|
| CN | 101794448 A | 8/2010 |

(Continued)

OTHER PUBLICATIONS

Wang Changhong, Try the remote projection function, Computer Knowledge and Technology (Experience Skills), Issue 11, 2018, with an English translation, total 6 pages.
(Continued)

*Primary Examiner* — Laurie A Ries

(57) ABSTRACT

The method comprises: a first terminal displays an object on a display of the first terminal. The first terminal receives a drag operation entered by a user. The drag operation is used to initiate drag for the object. The first terminal displays, on the display of the first terminal in response to the drag operation, an animation in which the object moves with the drag operation. The first terminal sends drag data to a second terminal after determining that a drag intent of the user is cross-device drag. The drag data is used by the second terminal to display the object on a display of the second terminal.

20 Claims, 51 Drawing Sheets

(56) References Cited

U.S. PATENT DOCUMENTS

| | | |
|---|---|---|
| 7,730,425 B2 | 6/2010 | De los Reyes et al. |
| 8,531,519 B1 | 9/2013 | Peng et al. |
| 8,607,150 B2 | 12/2013 | Tsai |
| 8,806,364 B2 | 8/2014 | Hwang |
| 9,696,825 B2 | 7/2017 | Lin et al. |
| 10,168,868 B2 | 1/2019 | Lee et al. |
| 10,234,953 B1 | 3/2019 | Li et al. |
| 11,029,838 B2 | 6/2021 | Lemay et al. |
| 11,036,310 B2 | 6/2021 | Seo et al. |
| 11,196,933 B2 | 12/2021 | Misawa et al. |
| 11,599,322 B1 | 3/2023 | Johnson et al. |
| 11,604,572 B2 * | 3/2023 | Li ..................... H04M 1/72469 |
| 11,893,219 B2 * | 2/2024 | Zhou ..................... G06F 3/0482 |
| 2001/0012025 A1 | 8/2001 | Wojaczynski et al. |
| 2006/0038741 A1 | 2/2006 | Mori et al. |
| 2006/0136828 A1 | 6/2006 | Asano |
| 2007/0055941 A1 | 3/2007 | Bhakta et al. |
| 2007/0288599 A1 | 12/2007 | Saul et al. |
| 2010/0041442 A1 | 2/2010 | Hong |
| 2010/0070899 A1 | 3/2010 | Hunt et al. |
| 2010/0281363 A1 | 11/2010 | Inaba |
| 2011/0080356 A1 * | 4/2011 | Kang ..................... G06F 9/543 709/204 |
| 2011/0083099 A1 | 4/2011 | Eun |
| 2011/0209103 A1 | 8/2011 | Hinckley et al. |
| 2011/0265027 A1 | 10/2011 | Lipstein et al. |
| 2012/0046071 A1 | 2/2012 | Brandis et al. |
| 2012/0096396 A1 | 4/2012 | Ording et al. |
| 2012/0216126 A1 | 8/2012 | Trivedi et al. |
| 2012/0297341 A1 | 11/2012 | Glazer et al. |
| 2013/0009887 A1 | 1/2013 | Huang et al. |
| 2013/0050277 A1 | 2/2013 | Wang et al. |
| 2013/0080143 A1 | 3/2013 | Reeves et al. |
| 2013/0135309 A1 | 5/2013 | King et al. |
| 2013/0145290 A1 | 6/2013 | Weber et al. |
| 2013/0162538 A1 | 6/2013 | Ichieda |
| 2013/0318451 A1 | 11/2013 | Wu et al. |
| 2013/0321340 A1 | 12/2013 | Seo et al. |
| 2013/0332872 A1 | 12/2013 | Grinberg |
| 2013/0342482 A1 | 12/2013 | Kim et al. |
| 2014/0009394 A1 | 1/2014 | Lee et al. |
| 2014/0082519 A1 | 3/2014 | Wang et al. |
| 2014/0136986 A1 | 5/2014 | Martin et al. |
| 2014/0222663 A1 | 8/2014 | Park et al. |
| 2014/0292720 A1 | 10/2014 | Liang |
| 2014/0344741 A1 | 11/2014 | Newman |
| 2015/0012831 A1 | 1/2015 | Boggess |
| 2015/0020013 A1 | 1/2015 | Kim et al. |
| 2015/0160914 A1 | 6/2015 | Oitaira |
| 2015/0180912 A1 | 6/2015 | Dufour |
| 2015/0195607 A1 | 7/2015 | Kim et al. |
| 2015/0293741 A1 | 10/2015 | Glazer |
| 2015/0356949 A1 | 12/2015 | Kim |
| 2016/0050476 A1 | 2/2016 | Patil |
| 2016/0092154 A1 | 3/2016 | Bourlier et al. |
| 2016/0139776 A1 | 5/2016 | Donahue et al. |
| 2016/0162243 A1 | 6/2016 | Neisler et al. |
| 2016/0188275 A1 | 6/2016 | Huang |
| 2016/0216782 A1 | 7/2016 | Lin et al. |
| 2016/0239110 A1 | 8/2016 | Chen et al. |
| 2016/0320937 A1 | 11/2016 | Zhou |
| 2016/0342319 A1 | 11/2016 | Wang et al. |
| 2016/0343350 A1 | 11/2016 | Khoury et al. |
| 2017/0017454 A1 | 1/2017 | Kim et al. |
| 2017/0031582 A1 | 2/2017 | Palandro et al. |
| 2017/0052685 A1 | 2/2017 | Kovasc et al. |
| 2017/0199715 A1 | 7/2017 | Manchinasetti et al. |
| 2017/0228207 A1 | 8/2017 | Szeto et al. |
| 2017/0277381 A1 | 9/2017 | Allyn |
| 2017/0351472 A1 | 12/2017 | Passeri et al. |
| 2018/0070122 A1 | 3/2018 | Baek et al. |
| 2018/0077547 A1 | 3/2018 | Sanchez Barajas et al. |
| 2018/0095623 A1 | 4/2018 | Haggar et al. |
| 2018/0098018 A1 | 4/2018 | Cho et al. |
| 2018/0107358 A1 | 4/2018 | Chodakowski et al. |
| 2018/0189972 A1 | 7/2018 | Humbert et al. |
| 2019/0098204 A1 | 3/2019 | Chen et al. |
| 2019/0110100 A1 | 4/2019 | Gao et al. |
| 2019/0196707 A1 | 6/2019 | Szeto et al. |
| 2019/0200203 A1 | 6/2019 | Jiang |
| 2019/0265941 A1 | 8/2019 | Baba |
| 2019/0295498 A1 | 9/2019 | Lee et al. |
| 2019/0346986 A1 | 11/2019 | Nilo et al. |
| 2020/0019367 A1 | 1/2020 | Sun et al. |
| 2020/0053417 A1 | 2/2020 | Choi et al. |
| 2020/0257425 A1 | 8/2020 | Ye |
| 2021/0064191 A1 | 3/2021 | Liao et al. |
| 2021/0181939 A1 | 6/2021 | Lee et al. |
| 2021/0240332 A1 | 8/2021 | Walkin et al. |
| 2021/0263642 A1 | 8/2021 | Li et al. |
| 2021/0405952 A1 * | 12/2021 | Wang ..................... G06F 3/0482 |
| 2022/0164091 A1 | 5/2022 | Kang et al. |
| 2022/0229708 A1 | 7/2022 | Hu |
| 2022/0253187 A1 * | 8/2022 | Wang ..................... G06F 3/0486 |
| 2022/0391158 A1 * | 12/2022 | Lemmens ............. G06F 3/1438 |
| 2023/0176705 A1 | 6/2023 | Kwon et al. |
| 2023/0205393 A1 | 6/2023 | Yamada et al. |
| 2023/0244373 A1 | 8/2023 | Pan et al. |

FOREIGN PATENT DOCUMENTS

| | | |
|---|---|---|
| CN | 101865656 A | 10/2010 |
| CN | 102333152 A | 1/2012 |
| CN | 102419689 A | 4/2012 |
| CN | 102523346 A | 6/2012 |
| CN | 102620713 A | 8/2012 |
| CN | 102646117 A | 8/2012 |
| CN | 102687117 A | 9/2012 |
| CN | 102945131 A | 2/2013 |
| CN | 103245337 A | 8/2013 |
| CN | 103279288 A | 9/2013 |
| CN | 103425408 A | 12/2013 |
| CN | 103873637 A | 6/2014 |
| CN | 103973979 A | 8/2014 |
| CN | 104137048 A | 11/2014 |
| CN | 104268251 A | 1/2015 |
| CN | 104349110 A | 2/2015 |
| CN | 104484144 A | 4/2015 |
| CN | 104811793 A | 7/2015 |
| CN | 105183343 A | 12/2015 |
| CN | 105512086 A | 4/2016 |
| CN | 105516754 A | 4/2016 |
| CN | 105549869 A | 5/2016 |
| CN | 105549870 A | 5/2016 |
| CN | 105556451 A | 5/2016 |
| CN | 105635948 A | 6/2016 |
| CN | 105681441 A | 6/2016 |
| CN | 105843470 A | 8/2016 |
| CN | 105892851 A | 8/2016 |
| CN | 105955689 A | 9/2016 |
| CN | 105979148 A | 9/2016 |
| CN | 105988686 A | 10/2016 |
| CN | 106055202 A | 10/2016 |
| CN | 106095237 A | 11/2016 |
| CN | 106354451 A | 1/2017 |
| CN | 106406127 A | 2/2017 |
| CN | 106507439 A | 3/2017 |
| CN | 106657651 A | 5/2017 |
| CN | 106844063 A | 6/2017 |
| CN | 106850165 A | 6/2017 |
| CN | 107085508 A | 8/2017 |
| CN | 107124690 A | 9/2017 |
| CN | 107222936 A | 9/2017 |
| CN | 107329927 A | 11/2017 |
| CN | 107425942 A | 12/2017 |
| CN | 107479784 A | 12/2017 |
| CN | 107491469 A | 12/2017 |
| CN | 107506039 A | 12/2017 |
| CN | 107846617 A | 3/2018 |
| CN | 107908489 A | 4/2018 |
| CN | 107943439 A | 4/2018 |
| CN | 108037972 A | 5/2018 |
| CN | 108123826 A | 6/2018 |
| CN | 108154538 A | 6/2018 |

(56) References Cited

FOREIGN PATENT DOCUMENTS

| | | |
|---|---|---|
| CN | 108228020 A | 6/2018 |
| CN | 108268640 A | 7/2018 |
| CN | 108399529 A | 8/2018 |
| CN | 108447097 A | 8/2018 |
| CN | 108600544 A | 9/2018 |
| CN | 108616561 A | 10/2018 |
| CN | 108647062 A | 10/2018 |
| CN | 108702414 A | 10/2018 |
| CN | 108717714 A | 10/2018 |
| CN | 108718439 A | 10/2018 |
| CN | 104618793 B | 11/2018 |
| CN | 108734736 A | 11/2018 |
| CN | 108762619 A | 11/2018 |
| CN | 108765498 A | 11/2018 |
| CN | 108781235 A | 11/2018 |
| CN | 108829323 A | 11/2018 |
| CN | 108874713 A | 11/2018 |
| CN | 108900764 A | 11/2018 |
| CN | 108958684 A | 12/2018 |
| CN | 108984137 A | 12/2018 |
| CN | 109099888 A | 12/2018 |
| CN | 109120970 A | 1/2019 |
| CN | 109164964 A | 1/2019 |
| CN | 109462692 A * | 3/2019 |
| CN | 109525697 A | 3/2019 |
| CN | 109644263 A | 4/2019 |
| CN | 109669747 A | 4/2019 |
| CN | 109690967 A | 4/2019 |
| CN | 109739450 A | 5/2019 |
| CN | 109753215 A | 5/2019 |
| CN | 109803126 A | 5/2019 |
| CN | 208849986 U | 5/2019 |
| CN | 109889885 A | 6/2019 |
| CN | 109922205 A | 6/2019 |
| CN | 110109636 A | 8/2019 |
| CN | 110113538 A | 8/2019 |
| CN | 110221798 A | 9/2019 |
| CN | 110243386 A | 9/2019 |
| CN | 110267073 A | 9/2019 |
| CN | 110278338 A | 9/2019 |
| CN | 110321093 A | 10/2019 |
| CN | 110333814 A | 10/2019 |
| CN | 110363819 A | 10/2019 |
| CN | 110417992 A | 11/2019 |
| CN | 110443853 A | 11/2019 |
| CN | 110471639 A | 11/2019 |
| CN | 110473262 A | 11/2019 |
| CN | 110489042 A | 11/2019 |
| CN | 110515576 A | 11/2019 |
| CN | 110515579 A | 11/2019 |
| CN | 110515580 A | 11/2019 |
| CN | 110557674 A | 12/2019 |
| CN | 110574359 A | 12/2019 |
| CN | 110597473 A | 12/2019 |
| CN | 110602805 A | 12/2019 |
| CN | 110618970 A | 12/2019 |
| CN | 110673782 A | 1/2020 |
| CN | 110703966 A | 1/2020 |
| CN | 107925694 B | 2/2020 |
| CN | 110750197 A | 2/2020 |
| CN | 110806831 A | 2/2020 |
| CN | 110851040 A | 2/2020 |
| CN | 110908625 A | 3/2020 |
| CN | 111062778 A | 4/2020 |
| CN | 111079550 A | 4/2020 |
| CN | 111107222 A | 5/2020 |
| CN | 111125526 A | 5/2020 |
| CN | 111158540 A | 5/2020 |
| CN | 111190559 A | 5/2020 |
| CN | 111221491 A | 6/2020 |
| CN | 111240547 A | 6/2020 |
| CN | 111240575 A | 6/2020 |
| CN | 111290675 A | 6/2020 |
| CN | 111314768 A | 6/2020 |
| CN | 111324327 A | 6/2020 |
| CN | 111327769 A | 6/2020 |
| CN | 111399789 A | 7/2020 |
| CN | 111399959 A | 7/2020 |
| CN | 111443884 A | 7/2020 |
| CN | 111666055 A | 9/2020 |
| CN | 111782427 A | 10/2020 |
| CN | 111858522 A | 10/2020 |
| CN | 111949350 A | 11/2020 |
| CN | 112083867 A | 12/2020 |
| CN | 112148182 A | 12/2020 |
| CN | 112527221 A | 3/2021 |
| CN | 114356198 A | 4/2022 |
| EP | 2632188 A1 | 8/2013 |
| JP | 2012063865 A | 3/2012 |
| JP | 2018097880 A | 6/2018 |
| KR | 20110076153 A | 7/2011 |
| KR | 20180042643 A | 4/2018 |
| WO | 0203186 A2 | 1/2002 |
| WO | 2015197908 A1 | 12/2015 |
| WO | 2018120884 A1 | 7/2018 |
| WO | 2019071872 A1 | 4/2019 |
| WO | 2022256681 A2 | 12/2022 |

OTHER PUBLICATIONS

Han Yumin, Classification of Interaction Modes and Its Significance, CD Technology, Editorial Department Mailbox, Issue 02, 1997, with the English Abstract, 5 pages.

Marquardt Nicolai et al: "Gradual engagement facilitating information exchange between digital devices as a function of proximity", Proceedings of the Third ACM Conference on Data and Application Security and Privacy, CODASPY 13, ACM Press, New York, New York, USA, Nov. 11, 2012 (Nov. 11, 2012), pp. 31-40, XP058985017.

Yang Bowen et al, Camera Calibration Technique of Wide-Area Vision Measurement, Acta Optica Sinica, vol. 32, No. 9, with the English Abstract, 9 pages.

Bowen Yang et al, Camera Calibration Techniques for Large Field Visual Measurement, Acta Optica Sinica, Sep. 2012, (vol. 32, Issue 09), pp. 166-174.

* cited by examiner

CONT.
FROM

TO FIG. 18(c)

CROSS-DEVICE OBJECT DRAG METHOD AND DEVICE

CROSS-REFERENCE TO RELATED APPLICATIONS

This application is a continuation of U.S. patent application Ser. No. 18/015,383, filed on Jan. 10, 2023 (now U.S. Pat. No. 12,073,071), which is a national stage of International Application No. PCT/CN2021/108611, filed on Jul. 27, 2021, which claims priority to Chinese Patent Application No. 202010747181.X, filed on Jul. 29, 2020. All of the aforementioned patent applications are hereby incorporated by reference in their entireties.

TECHNICAL FIELD

This application relates to the field of electronic devices, and in particular, to a cross-device object drag method and a device.

BACKGROUND

With development of electronic technologies and the mobile Internet, a user may have more terminals such as a mobile phone, a tablet computer, a personal computer (personal computer, PC), and a smart home device (for example, a television). Generally, each terminal is used independently. In a scenario in which a plurality of terminals need to be collaboratively used, for example, collaborative office, the user connects the plurality of terminals for use. For example, the user has a PC and a mobile phone. The user may connect the PC and the mobile phone for collaborative use in a wireless or wired manner, to implement collaborative office of the PC and the mobile phone.

SUMMARY

Embodiments of this application provide a cross-device object drag method and a device, so that in a scenario in which a plurality of terminals are collaboratively used, an object such as a user interface (user interface, UI) element is dragged between the plurality of terminals, to improve usage efficiency of collaborative use of the plurality of terminals.

To achieve the foregoing objective, this application uses the following technical solutions.

According to a first aspect, this application provides a cross-device object drag method. The method may be performed by a first terminal, the first terminal is connected to a second terminal, and the method may include: The first terminal displays an object on a display of the first terminal. The first terminal receives a drag operation entered by a user, where the drag operation is used to initiate drag for the object. The first terminal displays, on the display of the first terminal in response to the drag operation, an animation in which the object moves with the drag operation. The first terminal sends drag data to the second terminal after determining that a drag intent of the user is cross-device drag, where the drag data is used by the second terminal to display the object on a display of the second terminal.

In an example, in this embodiment, the first terminal and the second terminal each are a terminal that may run an operating system, on which an application may be installed, and that has a display (or a display). The operating systems run on the first terminal and the second terminal may be the same or different.

By using the technical solution provided in this embodiment, the user is allowed to drag, in a drag manner, an object such as a window, a UI element, or a UI control on an interface from one terminal to another terminal that is collaboratively used with the terminal, to improve usage efficiency of collaborative use of a plurality of terminals, make drag more direct and explicit, and improve user experience in drag. This breaks a barrier between screens and systems of different terminals, and can implement dragging various objects without depending on a projection window. In addition, a drag target end device, for example, the second terminal, does not need to be used as an extended screen of the first terminal, to implement cross-device and cross-system object drag in a real sense. In addition, the user can implement drag without installing other auxiliary software in advance.

In a possible implementation, the method may further include: In a process in which the object moves on the display of the first terminal, the first terminal displays a second region of the object on the display of the first terminal when a first region of the object is dragged out of the display of the first terminal, where the drag data is specifically used by the second terminal to display the first region of the object on the display of the second terminal, and the second region of the object displayed on the first terminal and the first region of the object displayed on the second terminal can present complete content of the object. The first terminal and the second terminal collaboratively display the animation of the dragged object based on drag of the user, so that the drag animation is smoothly and intuitively presented to the user.

In another possible implementation, the drag operation includes at least an operation of triggering the object to move. The second region of the object displayed on the display of the first terminal dynamically changes with the operation. A region that is of the object and that is displayed on the display of the first terminal is dynamically adjusted based on an operation of the user on the first terminal, so that touch sensitivity is better.

In another possible implementation, after the first terminal displays the second region of the object on the display of the first terminal, the method may further include: The first terminal receives third drag data from the second terminal, where the third drag data is sent by the second terminal to the first terminal after the second terminal receives a drag operation of the user on the first region of the object displayed on the second terminal, and the third drag data includes coordinate information of a first corner of the object. The second region of the object displayed on the display of the first terminal dynamically changes with a change of the third drag data. The region that is of the object and that is displayed on the display of the first terminal is dynamically adjusted based on an operation of the user on the second terminal, so that touch sensitivity is better. This implementation is applicable to a scenario of two different users or a non-continuous drag task.

In another possible implementation, the drag data may include first drag data and second drag data. Before the sending drag data to the second terminal, the method may further include: The first terminal obtains the first drag data from a drag start event when the object starts to be dragged; and the first terminal obtains the second drag data from a drag movement event in the process in which the object moves on the display of the first terminal.

In another possible implementation, the object may be a window or a partial region of a window, and the window includes an interface of an application. The first drag data may include the interface of the application and rectangle information of the object. The second drag data may include the coordinate information of the first corner of the object. For example, the coordinate information of the first corner of the object in the second drag data may be coordinate information of a first corner that is on the display of the first terminal and that is of the object.

In another possible implementation, when the drag object is a window, after the drag data is sent to the second terminal, the method may further include: The first terminal receives a drag release operation entered by the user, where the drag release operation is used to indicate that drag for the object ends. The first terminal sends data to the second terminal in response to the drag release operation, where the data is used by the second terminal to display the interface of the application on the display of the second terminal. When the drag object is a partial region of a window, after the drag data is sent to the second terminal, the method may further include: The first terminal receives a drag release operation entered by the user, where the drag release operation is used to indicate that drag for the object ends. The first terminal sends data to the second terminal in response to the drag release operation, where the data and the drag data are used by the second terminal to display a partial region of the interface of the application on the display of the second terminal, and content of the partial region is the same as content of the partial region of the window dragged by the user. After the user releases the drag, the corresponding data can be sent to the second terminal, so that the interface of the application or the partial region of the interface of the application in the dragged window is displayed on the second terminal, to give the user a visual effect of dragging the window or the partial region of the window to the second terminal.

In another possible implementation, the first drag data may further include an application label of an application, and the application label is used by the second terminal to start a local application that is on the second terminal and that corresponds to the application label. After the drag data is sent to the second terminal, the method may further include: The first terminal receives a drag release operation entered by the user, where the drag release operation is used to indicate that drag for the object ends. The first terminal sends indication information to the second terminal in response to the drag release operation, where the indication information indicates that drag for the object ends. After the user releases drag, the indication information may be sent to the second terminal, so that the second terminal starts a local corresponding application and displays an interface based on the indication information and the application label included in the drag data, and provides the user with a visual effect of dragging a window to the second terminal.

In another possible implementation, the window may be an application window or a freeform (freeform) window.

In another possible implementation, the object may be a video component, a floating window, a picture-in-picture, or a freeform window. The first drag data may include rectangle information of the object, and a layer name of the object on a current display interface of the first terminal. The second drag data may include the coordinate information of the first corner of the object. For example, the coordinate information of the first corner of the object in the second drag data may be coordinate information of a first corner that is on the display of the first terminal and that is of the object.

In another possible implementation, after the first terminal determines that the drag intent of the user is cross-device drag, the method may further include: The first terminal sends screen recording data to the second terminal, where the screen recording data and the drag data are used by the second terminal to display a partial region or an entire region of the object on the display of the second terminal. The screen recording data is sent to the second terminal, and is used by the second terminal to restore corresponding dragged content.

In another possible implementation, after the drag data is sent to the second terminal, the method may further include: The first terminal receives a drag release operation entered by the user, where the drag release operation is used to indicate that drag for the object ends. The first terminal sends indication information to the second terminal in response to the drag release operation, where the indication information is used indicate the second terminal to display the entire region of the object on the display of the second terminal. After the user releases the drag, the indication information can be sent to the second terminal, so that the second terminal displays the entire region of the dragged object based on the indication information, to give the user a visual effect of dragging the UI element to the second terminal.

In another possible implementation, the object may be a UI control on a first interface, or the object is a partial region of a first interface, and the partial region includes a UI control. In an example, the UI control may be a widget or another control on the interface. That the first terminal displays, on the display of the first terminal in response to the drag operation, an animation in which the object moves with the drag operation includes: The first terminal displays, on the display of the first terminal in response to the drag operation, an animation in which a shadow of the object moves with the drag operation. The first drag data may include rectangle information of the shadow, the shadow, and an identifier of the UI control. The second drag data may include coordinate information of a first corner of the shadow.

In another possible implementation, after the drag data is sent to the second terminal, the method may further include: The first terminal receives a drag release operation entered by the user, where the drag release operation is used to indicate that drag for the object ends. The first terminal obtains an instruction stream of the first interface and sends the instruction stream to the second terminal, where the instruction stream and the identifier of the UI control are used by the second terminal to display the UI control on the display of the second terminal. After the user releases the drag, the instruction stream of the interface of the dragged UI control can be sent to the second terminal, so that the second terminal can extract the UI control from the instruction stream based on the received identifier of the dragged UI control, and display the UI control, to give the user a visual effect of dragging the UI control to the second terminal.

In another possible implementation, after the first terminal receives the drag release operation entered by the user, the method may further include: The first terminal determines that the second region of the object displayed on the first terminal is less than a first threshold, or determines that the first region that is dragged out of the display of the first terminal is greater than a second threshold.

In another possible implementation, the method may further include: The first terminal displays the second region of the object on the display of the first terminal when the first terminal determines that the second region of the object displayed on the first terminal is greater than the first threshold, or determines that the first region that is dragged out of the display of the first terminal is less than the second threshold.

In another possible implementation, the determining that a drag intent of the user is cross-device drag may include: The first terminal determines that the object is dragged to a drag sensing region disposed on an edge of the display of the first terminal; or the first terminal determines that a distance between the object and an edge of the display of the first terminal is less than a predetermined distance.

In another possible implementation, before the drag data is sent to the second terminal, the method may further include: The first terminal determines that a target device for cross-device drag is the second terminal.

In another possible implementation, before the first terminal determines that the target device for cross-device drag is the second terminal, the method may further include: The first terminal displays information about at least two candidate terminals, where the at least two candidate terminals include: a terminal connected to the first terminal, and/or a terminal that is not connected to the first terminal but whose distance from the first terminal is within a connectable range. That the first terminal determines that a target device for cross-device drag is the second terminal may include: The first terminal receives a selection operation of the user on information about at least one second terminal. If the second terminal selected by the user is not connected to the first terminal, the method further includes: The first terminal establishes a connection to the second terminal. The user may select one or more second terminals as a target device for drag, to implement collaborative office of a plurality of devices.

In another possible implementation, the method may further include: The first terminal displays prompt information when the first terminal determines that the drag intent of the user is cross-device drag, where the prompt information is used to prompt that the object is to be dragged out of the display of the first terminal.

According to a second aspect, this application provides a cross-device object drag method, performed by a second terminal. The second terminal is connected to a first terminal, and the method may include: The second terminal receives drag data from the first terminal, where the drag data is sent by the first terminal after the first terminal determines that a drag intent of a user to drag an object on a display of the first terminal is cross-device drag. The second terminal displays the object on a display of the second terminal based on the drag data.

In a possible implementation, that the second terminal displays the object on a display of the second terminal based on the drag data may include: The second terminal displays a first region of the object on the display of the second terminal based on the drag data when determining that the first region of the object is dragged out of the display of the first terminal, where a second region of the object displayed on the first terminal and the first region of the object displayed on the second terminal can present complete content of the object.

In another possible implementation, the drag data may include first drag data and second drag data, and the first region of the object displayed on the display of the second terminal dynamically changes with a change of the second drag data.

In another possible implementation, the method may further include: The second terminal receives a drag operation of the user on the first region of the object displayed on the display of the second terminal, where the first region of the object displayed on the display of the second terminal dynamically changes with the drag operation.

In another possible implementation, after the second terminal receives the drag operation of the user on the first region of the object displayed on the display of the second terminal, the method may further include: The second terminal sends third drag data to the first terminal, where the third drag data includes coordinate information of a first corner of the object, and is used by the first terminal to dynamically adjust the second region of the object displayed on the display of the first terminal.

In another possible implementation, the object may be a window or a partial region of a window, and the window includes an interface of an application. The first drag data includes the interface of the application and rectangle information of the object. The second drag data includes coordinate information of a first corner of the object.

In another possible implementation, when the object is a window, after the second terminal displays the first region of the object on the display of the second terminal based on the drag data when determining that the first region of the object is dragged out of the display of the first terminal, the method may further include: The second terminal receives data from the first terminal, where the data is sent by the first terminal after the user enters a drag release operation, and the drag release operation is used to indicate that drag for the object ends. The second terminal displays the interface of the application on the display of the second terminal based on the data. When the object is a partial region of a window, after the second terminal displays the first region of the object on the display of the second terminal based on the drag data when determining that the first region of the object is dragged out of the display of the first terminal, the method may further include: The second terminal receives data from the first terminal, where the data is sent by the first terminal after the user enters a drag release operation, and the drag release operation is used to indicate that drag for the object ends. The second terminal displays a partial region of the interface of the application on the display of the second terminal based on the data and the drag data, where content of the displayed partial region is the same as content of the partial region of the window.

In another possible implementation, the first drag data further includes an application label of the application. After the second terminal displays the first region of the object on the display of the second terminal based on the drag data when determining that the first region of the object is dragged out of the display of the first terminal, the method may further include: The second terminal receives indication information from the first terminal, where the indication information is sent by the first terminal after the user enters a drag release operation, and indicates that drag for the object ends. The second terminal starts a local application that is on the second terminal and that corresponds to the application label. When the dragged object is a window, the second terminal may further display an interface of the application corresponding to the application label. When the dragged object is a partial region of a window, the second terminal may further display a partial region of an interface of the application corresponding to the application label based on the drag data.

In another possible implementation, the window is an application window or a freeform (freeform) window.

In another possible implementation, the object may be a video component, a floating window, a picture-in-picture, or a freeform window. The first drag data may include rectangle information of the object, and a layer name of the object on a current display interface of the first terminal. The second drag data may include coordinate information of a first corner of the object.

In another possible implementation, the method may further include: The second terminal receives screen recording data from the first terminal. That the second terminal displays a first region of the object on the display of the second terminal based on the drag data when determining that the first region of the object is dragged out of the display of the first terminal includes: The second terminal displays the first region of the object on the display of the second terminal based on the drag data and the screen recording data when determining that the first region of the object is dragged out of the display of the first terminal.

In another possible implementation, after the second terminal displays the first region of the object on the display of the second terminal based on the drag data when determining that the first region of the object is dragged out of the display of the first terminal, the method may further include: The second terminal receives indication information from the first terminal, where the indication information is sent by the first terminal after the user enters a drag release operation; and the second terminal displays an entire region of the object on the display of the second terminal in response to the indication information based on the screen recording data.

In another possible implementation, the object may be a UI control on a first interface, or the object is a partial region of a first interface, and the partial region includes a UI control. The UI control may be a widget, or may be any control on the interface. That the second terminal displays a first region of the object on the display of the second terminal based on the drag data when determining that the first region of the object is dragged out of the display of the first terminal includes: The second terminal displays a first region of a shadow of the object on the display of the second terminal based on the drag data when determining that the first region of the object is dragged out of the display of the first terminal, where the first drag data includes rectangle information of the shadow, the shadow, and an identifier of the UI control; and the second drag data includes coordinate information of a first corner of the shadow.

In another possible implementation, after the second terminal displays the first region of the object on the display of the second terminal based on the drag data when determining that the first region of the object is dragged out of the display of the first terminal, the method may further include: The second terminal receives an instruction stream of the first interface from the first terminal. The second terminal displays the UI control on the display of the second terminal based on the instruction stream and the identifier of the UI control.

In another possible implementation, a layout of the UI control on the display of the second terminal is different from a layout of the UI control on the first interface.

In another possible implementation, after the second terminal displays the first region of the object on the display of the second terminal based on the drag data when determining that the first region of the object is dragged out of the display of the first terminal, the method may further include: The second terminal displays the first region of the object on the display of the second terminal.

In another possible implementation, after the second terminal receives the first drag data from the first terminal, the method may further include: The second terminal displays prompt information, where the prompt information is used to prompt that the object is to be dragged to the display of the second terminal.

According to a third aspect, this application provides a cross-device object drag apparatus. The apparatus may be used in a first terminal, the first terminal is connected to a second terminal, and the apparatus may include: a display unit, configured to display an object on a display of the first terminal; an input unit, configured to receive a drag operation entered by a user, where the drag operation is used to initiate drag for the object, and the display unit is further configured to display, on the display of the first terminal in response to the drag operation, an animation in which the object moves with the drag operation; and a sending unit, configured to send drag data to the second terminal after it is determined that a drag intent of the user is cross-device drag, where the drag data is used by the second terminal to display the object on a display of the second terminal.

In a possible implementation, the display unit is further configured to: in a process in which the object moves on the display of the first terminal, display a second region of the object on the display of the first terminal when a first region of the object is dragged out of the display of the first terminal, where the drag data is specifically used by the second terminal to display the first region of the object on the display of the second terminal, and the second region of the object displayed on the first terminal and the first region of the object displayed on the second terminal can present complete content of the object.

In another possible implementation, the drag operation includes at least an operation of triggering the object to move. The second region of the object displayed by the display unit on the display dynamically changes with the operation.

In another possible implementation, the apparatus further includes: a receiving unit, configured to receive third drag data from the second terminal, where the third drag data is sent by the second terminal to the first terminal after the second terminal receives a drag operation of the user on the first region of the object displayed on the second terminal, and the third drag data includes coordinate information of a first corner of the object. The second region of the object displayed by the display unit on the display dynamically changes with a change of the third drag data.

In another possible implementation, the drag data may include first drag data and second drag data. The apparatus may further include: an obtaining unit, configured to obtain the first drag data from a drag start event when the object starts to be dragged; and obtain the second drag data from a drag movement event in the process in which the object moves on the display of the first terminal.

In another possible implementation, the object may be a window, and the window includes an interface of an application or a partial region of a window. The first drag data may include the interface of the application and rectangle information of the object. The second drag data may include the coordinate information of the first corner of the object.

In another possible implementation, the input unit is further configured to receive a drag release operation entered by the user, where the drag release operation is used to indicate that drag for the object ends. The sending unit is further configured to send data to the second terminal in response to the drag release operation, where the data is used by the second terminal to display the interface of the application or a partial region of the interface of the application on the display of the second terminal.

In another possible implementation, the first drag data may further include an application label of an application, and the application label is used by the second terminal to start a local application that is on the second terminal and that corresponds to the application label. The input unit is further configured to receive a drag release operation entered by the user, where the drag release operation is used to indicate that drag for the object ends. The sending unit is further configured to send indication information to the second terminal in response to the drag release operation, where the indication information indicates that drag for the object ends.

In another possible implementation, the window is an application window or a freeform window.

In another possible implementation, the object may be a video component, a floating window, a picture-in-picture, or a freeform window. The first drag data may include rectangle information of the object, and a layer name of the object on a current display interface of the first terminal. The second drag data may include the coordinate information of the first corner of the object.

In another possible implementation, after the first terminal determines that the drag intent of the user is cross-device drag, the sending unit is further configured to send screen recording data to the second terminal, where the screen recording data and the drag data are used by the second terminal to display a partial region or an entire region of the object on the display of the second terminal.

In another possible implementation, the input unit is further configured to receive a drag release operation entered by the user, where the drag release operation is used to indicate that drag for the object ends. The sending unit is further configured to send indication information to the second terminal in response to the drag release operation, where the indication information indicates the second terminal to display the entire region of the object on the display of the second terminal.

In another possible implementation, the object is a UI control on a first interface, or the object is a partial region of a first interface, and the partial region includes a UI control. The display unit is specifically configured to display, on the display of the first terminal in response to the drag operation, an animation in which a shadow of the object moves with the drag operation, where the first drag data includes rectangle information of the shadow, the shadow, and an identifier of the UI control, and the second drag data includes coordinate information of a first corner of the shadow.

In another possible implementation, the input unit is further configured to receive a drag release operation entered by the user, where the drag release operation is used to indicate that drag for the object ends. The obtaining unit is further configured to obtain an instruction stream of the first interface. The sending unit is further configured to send the instruction stream of the first interface to the second terminal, where the instruction stream and the identifier of the UI control are used by the second terminal to display the UI control on the display of the second terminal.

In another possible implementation, the apparatus may further include: a determining unit, configured to determine that the second region of the object displayed on the first terminal is less than a first threshold, or determine that the first region that is dragged out of the display of the first terminal is greater than a second threshold.

In another possible implementation, the display unit is further configured to display the second region of the object on the display of the first terminal when it is determined that the second region of the object displayed on the first terminal is greater than the first threshold, or it is determined that the first region that is dragged out of the display of the first terminal is less than the second threshold.

In another possible implementation, the determining unit is further configured to determine that the drag intent of the user is cross-device drag.

The determining unit is specifically configured to determine that the object is dragged to a drag sensing region disposed on an edge of the display of the first terminal; or determine that a distance between the object and an edge of the display of the first terminal is less than a predetermined distance.

In another possible implementation, the determining unit is further configured to determine that a target device for cross-device drag is the second terminal.

In another possible implementation, the display unit is further configured to display information about at least two candidate terminals, where the at least two candidate terminals include a terminal connected to the first terminal, and/or a terminal that is not connected to the first terminal but whose distance from the first terminal is within a connectable range. The determining unit is specifically configured to receive a selection operation of the user on information about at least one second terminal. If the second terminal selected by the user is not connected to the first terminal, the apparatus may further include a connection unit, configured to establish a connection to the second terminal.

In another possible implementation, the display unit is further configured to display prompt information when it is determined that the drag intent of the user is cross-device drag, where the prompt information is used to prompt that the object is to be dragged out of the display of the first terminal.

According to a fourth aspect, this application provides a cross-device object drag apparatus. The apparatus may be used in a second terminal. The second terminal is connected to a first terminal, and the apparatus may include: a receiving unit, configured to receive drag data from the first terminal, where the drag data is sent by the first terminal after the first terminal determines that a drag intent of a user to drag an object on a display of the first terminal is cross-device drag; and a display unit, configured to display the object on a display of the second terminal based on the drag data.

In a possible implementation, the display unit is specifically configured to display a first region of the object on the display of the second terminal based on the drag data when it is determined that the first region of the object is dragged out of the display of the first terminal, where a second region of the object displayed on the first terminal and the first region of the object displayed on the second terminal can present complete content of the object.

In another possible implementation, the drag data includes first drag data and second drag data, and the first region of the object displayed by the display unit on the display of the second terminal dynamically changes with a change of the second drag data.

In another possible implementation, the apparatus further includes: an input unit, configured to receive a drag operation of the user on the first region of the object displayed on the display of the second terminal, where the first region of the object displayed by the display unit on the display of the second terminal dynamically changes with the drag operation.

In another possible implementation, the apparatus further includes: a sending unit, configured to send third drag data to the first terminal, where the third drag data includes coordinate information of a first corner of the object, and is used by the first terminal to dynamically adjust the second region of the object displayed on the display of the first terminal.

In another possible implementation, the object is a window, and the window includes an interface of an application or a partial region of a window. The first drag data includes the interface of the application and rectangle information of the object. The second drag data includes coordinate information of a first corner of the object.

In another possible implementation, the receiving unit is further configured to receive data from the first terminal, where the data is sent by the first terminal after the user enters a drag release operation, and the drag release operation is used to indicate that drag for the object ends. The display unit is further configured to display the interface of the application on the display of the second terminal based on the data, or display a partial region of the interface of the application on the display of the second terminal based on the data and the drag data.

In another possible implementation, the first drag data further includes an application label of the application. The receiving unit is further configured to receive indication information from the first terminal, where the indication information is sent by the first terminal after the user enters a drag release operation, and indicates that drag for the object ends. The display unit is further configured to start a local application that is on the second terminal and that corresponds to the application label, and display an interface of the application corresponding to the application label, or display a partial region of the interface of the application corresponding to the application label based on the drag data.

In another possible implementation, the window is an application window or a freeform window.

In another possible implementation, the object is a video component, a floating window, a picture-in-picture, or a freeform window. The first drag data includes rectangle information of the object, and a layer name of the object on a current display interface of the first terminal. The second drag data includes coordinate information of a first corner of the object.

In another possible implementation, the receiving unit is further configured to receive screen recording data from the first terminal. The display unit is specifically configured to display the first region of the object on the display of the second terminal based on the drag data and the screen recording data when it is determined that the first region of the object is dragged out of the display of the first terminal.

In another possible implementation, the receiving unit is further configured to receive indication information from the first terminal, where the indication information is sent by the first terminal after the user enters a drag release operation. The display unit is further configured to display an entire region of the object on the display of the second terminal in response to the indication information based on the screen recording data.

In another possible implementation, the object is a UI control on a first interface, or the object is a partial region of a first interface, and the partial region includes a UI control. The display unit is specifically configured to display a first region of a shadow of the object on the display of the second terminal based on the drag data when it is determined that the first region of the object is dragged out of the display of the first terminal, where the first drag data includes rectangle information of the shadow, the shadow, and an identifier of the UI control, and the second drag data includes coordinate information of a first corner of the shadow.

In another possible implementation, the receiving unit is further configured to receive an instruction stream of the first interface from the first terminal. The display unit is further configured to display the UI control on the display of the second terminal based on the instruction stream and the identifier of the UI control.

In another possible implementation, a layout of the UI control on the display of the second terminal is different from a layout of the UI control on the first interface.

In another possible implementation, the display unit is further configured to display the first region of the object on the display of the second terminal.

In another possible implementation, the display unit is further configured to display prompt information, where the prompt information is used to prompt that the object is to be dragged to the display of the second terminal.

According to a fifth aspect, this application provides a cross-device object drag apparatus. The apparatus may include a processor, and a memory configured to store instructions that can be executed by the processor. When the processor is configured to execute the instructions, the method according to any one of the first aspect or the possible implementations of the first aspect is implemented, or the method according to any one of the second aspect or the possible implementations of the second aspect is implemented.

According to a sixth aspect, this application provides a computer-readable storage medium. The computer-readable storage medium stores computer program instructions. When the computer program instructions are executed by a processor, the method according to any one of the first aspect or the possible implementations of the first aspect is implemented, or the method according to any one of the second aspect or the possible implementations of the second aspect is implemented.

According to a seventh aspect, this application provides a terminal. The terminal includes a display, one or more processors, and a memory. The display and the processor are coupled to the memory, the memory is configured to store computer program code, and the computer program code includes computer instructions. When the computer instructions are executed by the terminal, the terminal is enabled to perform the method according to any one of the first aspect or the possible implementations of the first aspect, or the terminal is enabled to perform the method according to any one of the second aspect or the possible implementations of the second aspect.

According to an eighth aspect, this application provides a computer program product, including computer readable code or a non-volatile computer-readable storage medium carrying computer readable code. When the computer readable code is run on a terminal, a processor in the terminal performs the method according to any one of the first aspect or the possible implementations of the first aspect, or performs the method according to any one of the second aspect or the possible implementations of the second aspect.

According to a ninth aspect, this application provides a cross-device object drag system. The system may include a first terminal and a second terminal. The first terminal is connected to the second terminal. The first terminal is configured to: display an object on a display of the first terminal; receive a drag operation entered by a user, where the drag operation is used to initiate drag for the object; display, on the display of the first terminal in response to the drag operation, an animation in which the object moves with the drag operation; and send drag data to the second terminal after determining that a drag intention of the user is cross-device drag. The second terminal is configured to receive the drag data from the first terminal, and display the object on a display of the second terminal based on the drag data.

In a possible implementation, the first terminal is further configured to: in a process in which the object moves on the display of the first terminal, display a second region of the object on the display of the first terminal when a first region of the object is dragged out of the display of the first terminal. The second terminal is specifically configured to display the first region of the object on the display of the second terminal, where the second region of the object displayed on the first terminal and the first region of the object displayed on the second terminal can present complete content of the object.

In another possible implementation, the second region of the object displayed on the display of the first terminal and the first region of the object displayed on the display of the second terminal dynamically change with a drag operation entered by the user on the first terminal or the second terminal.

It should be noted that, in this embodiment, the first corner may be any one of an upper left corner, a lower left corner, an upper right corner, and a lower right corner of the dragged object.

It may be understood that for beneficial effects that can be achieved by the cross-device object drag apparatus according to the third aspect and any possible implementation of the third aspect, the cross-device object drag apparatus according to the fourth aspect and any possible implementation of the fourth aspect, the cross-device object drag apparatus according to the fifth aspect, the computer-readable storage medium according to the sixth aspect, the terminal according to the seventh aspect, the computer program product according to the eighth aspect, and the cross-device object drag system according to the ninth aspect, refer to beneficial effects in the first aspect, the second aspect, or any possible implementations of the first aspect or the second aspect. Details are not described herein again.

DESCRIPTION OF EMBODIMENTS

Terms "first" and "second" below are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Drag (or referred to as drag and drop) mainly means data transmission. A user may specify, by using a mouse or another input device, an object (for example, a file, a character, or a UI element) that needs to be dragged and a target location to which the object needs to be dragged. A conventional drag scenario includes drag on a PC and drag on a touchscreen terminal such as a mobile phone. For drag on the PC, the user may move, by moving a mouse, a mouse pointer to an object that needs to be dragged, specify the to-be-dragged object by pressing a left mouse button (or another button for achieving the purpose), and subsequently, drag the object from one location to another location on a display of the PC by moving the mouse. For drag on the touchscreen terminal such as the mobile phone, the user may use a continuous screen touch gesture to specify a to-be-dragged object, and drag the object from one location to another location on a display of the mobile phone.

Currently, collaborative use of a plurality of terminals is a common office mode. When the plurality of terminals are collaboratively used, drag is also a function frequently used by the user. However, drag in a scenario in which the plurality of terminals are collaboratively used may be in cross-device drag for an object between the plurality of terminals.

Embodiments of this application provide a cross-device object drag method and a device. The method may be used in a scenario in which a plurality of terminals are collaboratively used. According to the method provided in embodiments of this application, a user is allowed to drag, by using an input device such as a mouse or a touchscreen, a UI element (or an object) such as an application window, a freeform (freeform) window, a video component, a floating window, a picture-in-picture, a widget, or a UI control from one terminal to another terminal collaboratively used with the terminal. This improves usage efficiency of collaborative use of the plurality of terminals, makes drag more direct and explicit, and improves user experience in drag.

The following describes the implementations of embodiments of this application in detail with reference to accompanying drawings.

Figure 1A:
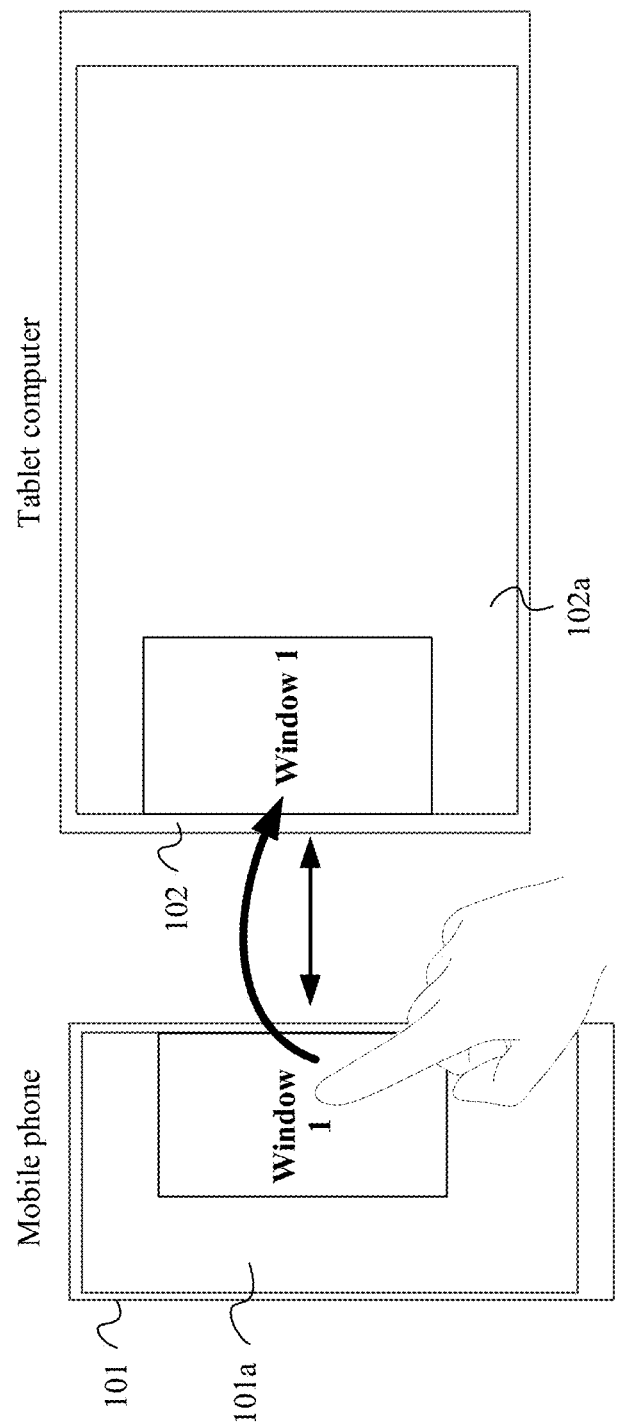
FIG. 1(a) and FIG. 1(b) are a simplified schematic diagram of a system architecture according to an embodiment of this application.
Figure 1B:
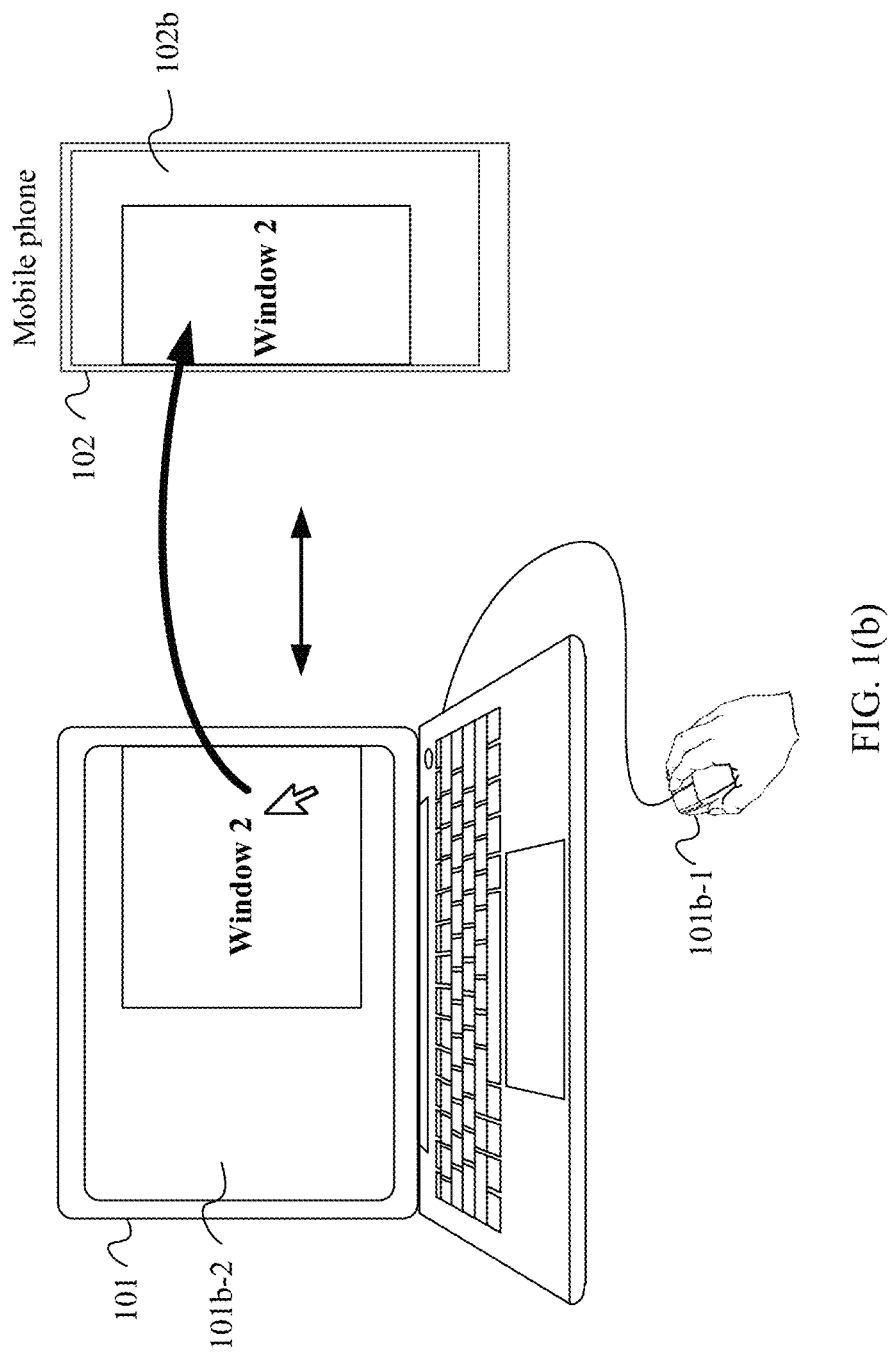

FIG. 1(a) and FIG. 1(b) are a simplified schematic diagram of a system architecture in which the method may be used according to an embodiment of this application. As shown in FIG. 1(a) and FIG. 1(b), the system architecture may include at least a first terminal 101 and a second terminal 102.

The first terminal 101 and the second terminal 102 may establish a connection in a wired or wireless manner. Based on the established connection, the first terminal 101 and the second terminal 102 may be collaboratively used together. In this embodiment, a wireless communication protocol used when the first terminal 101 and the second terminal 102 establish the connection in the wireless manner may be a wireless fidelity (wireless fidelity, Wi-Fi) protocol, a Bluetooth (Bluetooth) protocol, a ZigBee protocol, a near field communication (Near Field Communication, NFC) protocol, various cellular network protocols, or the like. This is not specifically limited herein.

In a specific implementation, the first terminal 101 and the second terminal 102 each may be a mobile phone, a tablet computer, a handheld computer, a PC, a cellular phone, a personal digital assistant (personal digital assistant, PDA), a wearable device (for example, a smartwatch), a smart home device (for example, a television), a vehicle-mounted computer, a game console, or an augmented reality (augmented reality, AR)/virtual reality (virtual reality, VR) device. Specific device forms of the first terminal 101 and the second terminal 102 are not specially limited in this embodiment. In addition, in this embodiment, device forms of the first terminal 101 and the second terminal 102 may be the same. For example, both the first terminal 101 and the second terminal 102 are mobile phones. Device forms of the first terminal 101 and the second terminal 102 may be alternatively different. For example, as shown in FIG. 1(a), the first terminal 101 is a mobile phone, and the second terminal 102 is a tablet computer. For another example, as shown in FIG. 1(b), the first terminal 101 is a PC, and the second terminal 102 is a mobile phone.

The first terminal 101 and the second terminal 102 each may be a touchscreen device or may be non-touchscreen device. In this embodiment, the first terminal 101 and the second terminal 102 each are a terminal that may run an operating system, on which an application may be installed, and that may have a display (or a display). A display that includes only a display processing module is not the first terminal 101 or the second terminal 102 described in this embodiment. The operating systems run on the first terminal 101 and the second terminal 102 each may be an Android system, an iOS system, a Windows system, a Mac system, a Linux system, or the like. This is not specifically limited in this embodiment. The operating systems run on the first terminal 101 and the second terminal 102 may be the same or different. In an example, the first terminal 101 and the second terminal 102 each may include a memory, a processor, and the display. The memory may be configured to store the operating system, and the processor may be configured to run the operating system stored in the memory.

In this embodiment of this application, when the first terminal 101 is connected to the second terminal 102, the user may drag, by using an input device (for example, a mouse, a touchpad, or a touchscreen) of the first terminal 101, a UI element such as an application window, a freeform window, a video component, a floating window, a picture-in-picture, a widget, or a UI control displayed on the display of the first terminal 101 to the display of the second terminal 102 for display.

For example, with reference to FIG. 1(a), the first terminal 101 is a mobile phone and the second terminal 102 is a tablet computer. A display of the mobile phone has a touch function, for example, is referred to as a touchscreen 101a.

The user may drag, by using the touchscreen 101a of the mobile phone, an application window displayed by the mobile phone, for example, referred to as a window 1, from the touchscreen 101a of the mobile phone to a display 102a of the tablet computer for display.

For another example, with reference to in FIG. 1(b), the first terminal 101 is a PC and the second terminal 102 is a mobile phone. The PC is connected to a mouse 101b-1. The user may drag, by using the mouse 101b-1 of the PC, an application window displayed by the PC, for example, referred to as a window 2, from a display 101b-2 of the PC to a display 102b of the mobile phone for display.

It should be noted that the foregoing content is described by using an example in which the user drags the UI element displayed on the first terminal 101 from the first terminal 101 to one second terminal 102. In some other embodiments, when the first terminal 101 establishes connections to a plurality of second terminals 102, the user may drag the UI element displayed by the first terminal 101 to one or more of the plurality of second terminals 102 in a drag manner. Device forms of different second terminals 102 may be the same or different. Connection manners between the first terminal 101 and the different second terminals 102 may be the same or different. This is not specifically limited in this embodiment.

Figure 2:
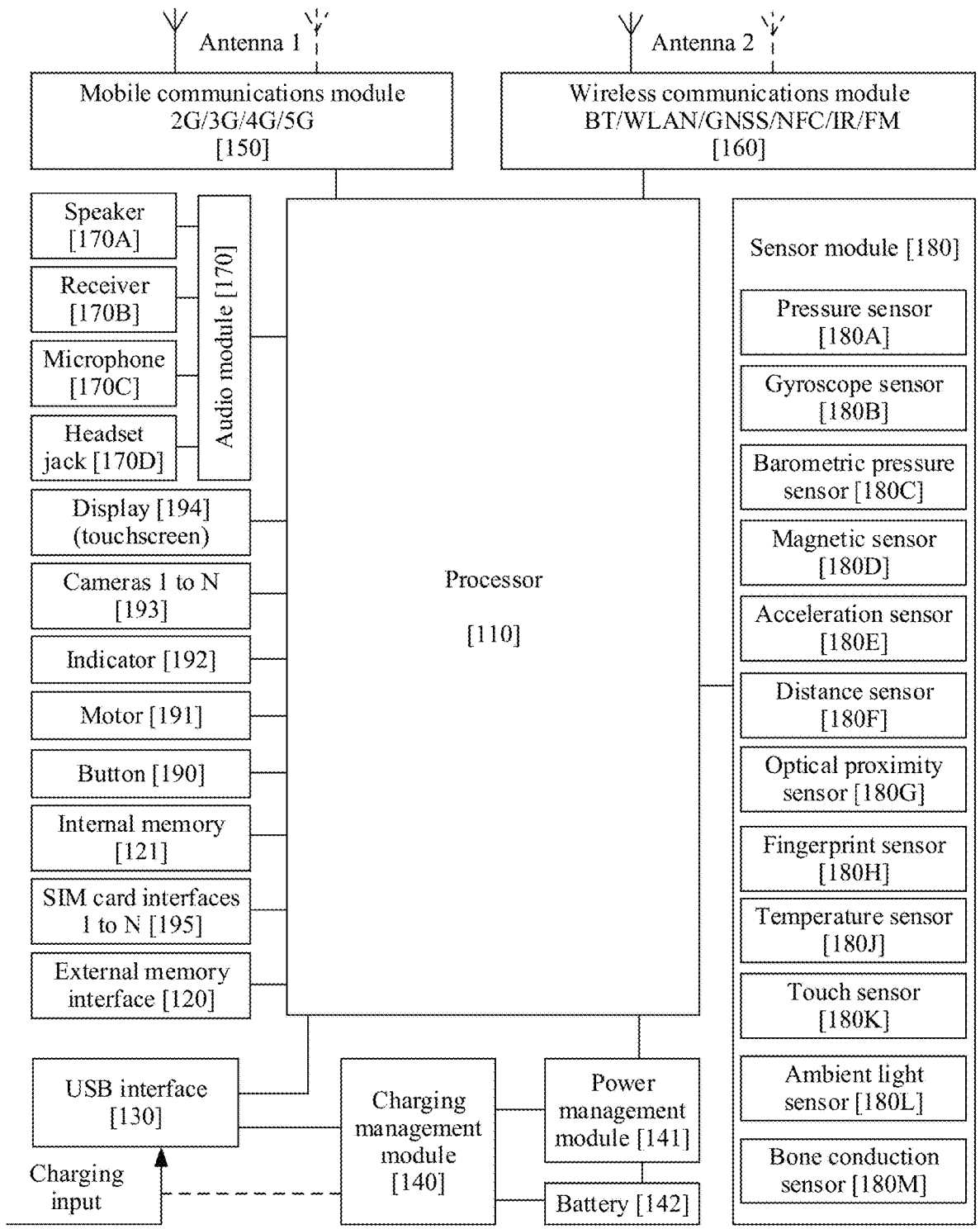
FIG. 2 is a schematic diagram of a structure of a mobile phone according to an embodiment of this application.

In this embodiment, an example in which the terminal is a mobile phone is used. FIG. 2 is a schematic diagram of a structure of a mobile phone according to an embodiment of this application. Methods in the following embodiments may be implemented in a mobile phone having the foregoing hardware structure.

As shown in FIG. 2, the mobile phone may include a processor 110, an external memory interface 120, an internal memory 121, a universal serial bus (universal serial bus, USB) interface 130, a charging management module 140, a power management module 141, a battery 142, an antenna 1, an antenna 2, a wireless communications module 160, an audio module 170, a speaker 170A, a receiver 170B, a microphone 170C, a headset jack 170D, a sensor module 180, a button 190, a motor 191, an indicator 192, a camera 193, a display 194, and the like. Optionally, the mobile phone may further include a mobile communications module 150, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment constitutes no specific limitation on the mobile phone. In some other embodiments, the mobile phone may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the mobile phone. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM interface, a USB interface, and/or the like.

The charging management module 140 is configured to receive a charging input from the charger. The charging management module 140 may further supply power to the mobile phone by using the power management module 141 while charging the battery 142. The power management module 141 is configured to connect to the battery 142 and the charging management module 140 to the processor 110. The power management module 141 may also receive an input of the battery 142 to supply power to the mobile phone.

A wireless communication function of the mobile phone may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the mobile phone may be configured to cover one or more communication frequency bands Different antennas may be further multiplexed, to improve antenna utilization. For example, the antenna 1 may be multiplexed as a diversity antenna of a wireless local area network. In some other embodiments, the antenna may be used in combination with a tuning switch.

When the mobile phone includes the mobile communications module 150, the mobile communications module 150 may provide a solution that includes wireless communication such as 2G, 3G, 4G, and 5G and that is applied to the mobile phone. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another functional module.

The wireless communications module 160 may provide a solution that includes wireless communication such as a wireless local area network (wireless local area network, WLAN) (for example, a Wi-Fi network), Bluetooth (Bluetooth, BT), a global navigation satellite system (global navigation satellite system, GNSS), frequency modulation (frequency modulation, FM), NFC, and an infrared (infrared, IR) technology and that is applied to the mobile phone. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the mobile phone, the antenna 1 and the mobile communications module 150 are coupled, and the antenna 2 and the wireless communications module 160 are coupled, so that the mobile phone can communicate with a network and another device by using a wireless communication technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The mobile phone implements a display function by using the GPU, the display 194, the application processor, and the like. The GPU is a microprocessor for image processing, and is connected to the display 194 and the application processor. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the mobile phone may include one or N displays 194, where N is a positive integer greater than 1.

The mobile phone may implement a photographing function by using the ISP, a camera 193, the video codec, the GPU, the display 194, the application processor, and the like. In some embodiments, the mobile phone may include one or N cameras 193, where N is a positive integer greater than 1.

The external memory interface 120 may be configured to connect to an external memory card, for example, a micro SD card, to extend a storage capability of the mobile phone. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the mobile phone and data processing. The internal memory 121 may include a program storage area and a data storage area. The program storage area may store an operating system, an application required by at least one function (for example, a sound playing function and an image playing function), and the like. The data storage region may store data (for example, audio data or a phone book) created when the mobile phone is used, and the like. In addition, the internal memory 121 may include a high-speed random access memory, or may include a nonvolatile memory, for example, at least one magnetic disk storage device, a flash memory, or a universal flash storage (universal flash storage, UFS).

The mobile phone may implement audio functions such as music playing and recording functions through the audio module 170, the speaker 170A, the receiver 170B, the microphone 170C, the headset jack 170D, and the application processor.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. When a touch operation is performed on the display 194, the mobile phone detects intensity of the touch operation by using the pressure sensor 180A. The mobile phone may also calculate a touch location based on a detection signal of the pressure sensor 180A.

The gyro sensor 180B may be configured to determine a motion posture of the mobile phone. The barometric pressure sensor 180C is configured to measure barometric pressure. The magnetic sensor 180D includes a Hall effect sensor. The mobile phone may detect opening and closing of a flip cover by using the magnetic sensor 180D. The acceleration sensor 180E may detect magnitude of accelerations of the mobile phone in various directions (generally on three axes). The distance sensor 180F is configured to measure a distance. The mobile phone may detect, by using the optical proximity sensor 180G, that a user holds the mobile phone close to an ear to make a call, to automatically turn off a screen for power saving. The optical proximity sensor 180G may also be used in a smart cover mode or a pocket mode to automatically perform screen unlocking or locking. The ambient light sensor 180L is configured to sense ambient light brightness. The fingerprint sensor 180H is configured to collect a fingerprint. The mobile phone may use a feature of the collected fingerprint to implement fingerprint-based unlocking, application lock access, fingerprint-based photographing, fingerprint-based call answering, and the like. The temperature sensor 180J is configured to detect a temperature.

The touch sensor 180K is also referred to as a touch panel. The touch sensor 180K may be disposed on the display 194, and the touch sensor 180K and the display 194 constitute a touchscreen, which is also referred to as a "touchscreen". The touch sensor 180K is configured to detect a touch operation acting on or near the touch sensor 180K. The touch sensor may transfer the detected touch operation to the application processor, to determine a type of a touch event. A visual output related to the touch operation may be provided through the display 194. In some other embodiments, the touch sensor 180K may be alternatively disposed on a surface of the mobile phone and is at a location different from that of the display 194.

The bone conduction sensor 180M may obtain a vibration signal. The button 190 includes a power button, a volume button, and the like. The button 190 may be a mechanical button, or may be a touch button. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like.

When the mobile phone includes the SIM card interface 195, the SIM card interface 195 is configured to connect to a SIM card. The SIM card may be inserted into the SIM card interface 195 or removed from the SIM card interface 195, to implement contact with or separation from the mobile phone. The mobile phone may support one or N SIM card interfaces, where N is a positive integer greater than 1. The mobile phone interacts with a network by using the SIM card, to implement functions such as calling and data communication. In some embodiments, the mobile phone uses an eSIM, namely, an embedded SIM card. The eSIM card may be embedded in the mobile phone, and cannot be separated from the mobile phone.

Figure 3:
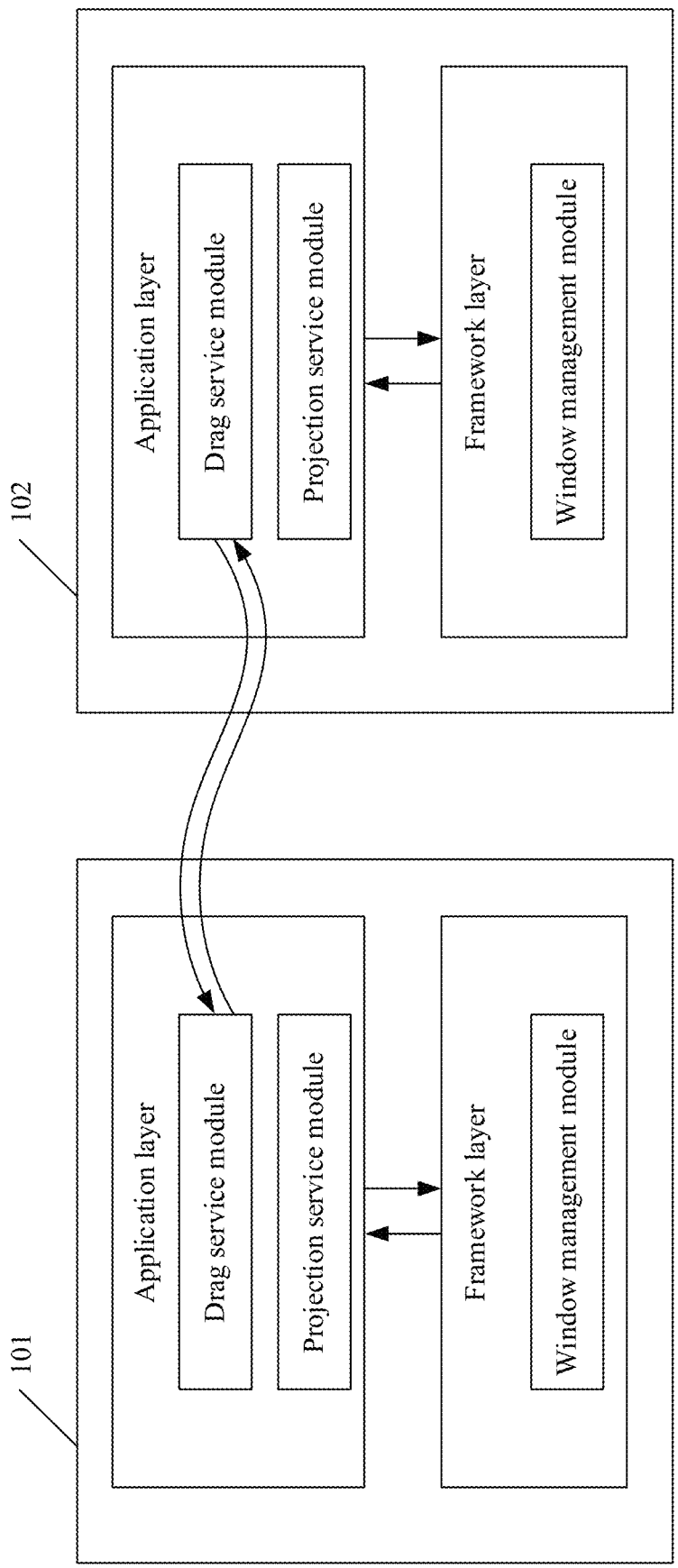
FIG. 3 is a schematic diagram of composition of a software architecture according to an embodiment of this application.

With reference to FIG. 1(*a*) and FIG. 1(*b*), FIG. 3 is a schematic diagram of composition of a software architecture according to an embodiment of this application. As shown in FIG. 3, software architectures of the first terminal 101 and the second terminal 102 each may include an application layer and a framework (framework, FWK) layer.

In some embodiments, an application layer may include applications installed on a terminal. For example, the applications installed on the terminal may include Settings, Calculator, Camera, Messages, Music player, File manager, Gallery, Browser, Notepad, News, Video player, Email, and the like. These applications may be system applications of the terminal, or may be third-party applications. This is not specifically limited in this embodiment of this application. For example, the application layer of the first terminal 101 may include applications installed on the first terminal 101, for example, File manager, Gallery, Notepad, and Video player. For another example, the application layer of the second terminal 102 may include applications installed on the first terminal 101, for example, Video player and Email. The application layer may further include a drag service module. The application layer may further include a launcher, a system UI, and the like (not shown in the figure).

In embodiments of this application, after a connection between the first terminal 101 and the second terminal 102 is established, based on the software architecture, a user may transfer, in a drag manner by using an input device (for example, a mouse, a touchpad, or a touchscreen) of the first terminal 101, a UI element displayed on the first terminal 101 to the second terminal 102. In other words, the user may drag the UI element from the first terminal 101 to the second terminal 102 by using the input device of the first terminal 101 in the drag manner, that is, implement cross-device drag.

It may be understood that, in cross-device drag, the first terminal 101 and the second terminal 102 may be respectively referred to as a source device (or referred to as a source end) and a target device (or referred to as a sink end) based on different functions implemented by the first terminal 101 and the second terminal 102. Specifically, the source device may be a device that provides drag-related data. The target device may be a device that receives the drag-related data.

For example, the first terminal 101 is a source device, and the second terminal 102 is a target device. With reference to FIG. 3, the application layer of the first terminal 101 may be used to provide drag-related data, to implement drag for the UI element. The framework layer of the first terminal 101 may be used to provide a drag function and a window management function of the source device. For example, the framework layer may include a window management module, used to implement windowing of a display interface. For another example, the framework layer may be used to provide basic drag logic to implement drag on the source device. A module at the application layer of the first terminal 101, for example, the launcher or the system UI, may be used to monitor drag initiated by the framework layer. The drag service module may be used to obtain the drag-related data and send the drag-related data to the second terminal 102 used as the target device.

A module at the application layer of the second terminal 102, for example, the drag service module, may be used to receive the drag-related data. The framework layer of the second terminal 102 is used to provide a drag function and a window management function of the target device. For example, the framework layer may include a window management module, used to cooperate with the drag service module of the second terminal 102 to implement drawing of a window on the target device based on the received data. For another example, when a user continues to perform drag on the target device, the framework layer may be used to provide basic drag logic to implement drag on the target device.

Further, the application layer may further include a projection service module. In this embodiment, the projection service modules of the first terminal 101 and the second terminal 102 may be used to cooperate to implement a projection processing function. For example, after the user stops a drag operation on the first terminal 101, the projection service module of the first terminal 101 may start a projection process, so that the drag service module of the first terminal 101 obtains related data, for example, screen recording data, and then sends the related data to the second terminal 102. The drag service module of the second terminal 102 may send the received screen recording data to the projection service module of the second terminal 102 to draw and display a corresponding UI element. In addition, after the first terminal 101 projects the UI element onto the second terminal 102 for display, the user may perform an operation on the UI element projected onto the second terminal 102. The projection service modules of the first terminal 101 and the second terminal 102 may cooperate to respond to the operation, to implement reverse control on the source device at a target device end.

It should be noted that the software architectures shown in this embodiment constitute no specific limitation on the first terminal 101 and the second terminal 102. In some other embodiments, the first terminal 101 and/or the second terminal 102 may include more or fewer layers than those shown in the figure or more or fewer modules, or some modules may be combined, or there may be a different module layout. This is not specifically limited in this embodiment. For example, in addition to the application layer and the framework layer, the software architectures shown above each may further include another layer, for example, a kernel layer (not shown in FIG. 3). The kernel layer is a layer between hardware and software. The kernel layer includes at least a display driver, a camera driver, an audio driver, a sensor driver, and the like.

As described in the foregoing embodiment, a dragged object in this embodiment may be a UI element (or an object) displayed on a display of the terminal. The UI element may be specifically an interface element, for example, an application window, a freeform window, a widget (widget, for example, a clock widget, a card widget, or a calendar widget), a video component, a floating window, a picture-in-picture, or a UI control. With reference to FIG. 1(*a*) and FIG. 1(*b*), FIG. 3, and other accompanying drawings, the following separately describes in detail, based on different dragged objects, the cross-device object drag method provided in embodiments of this application.

Figure 4:
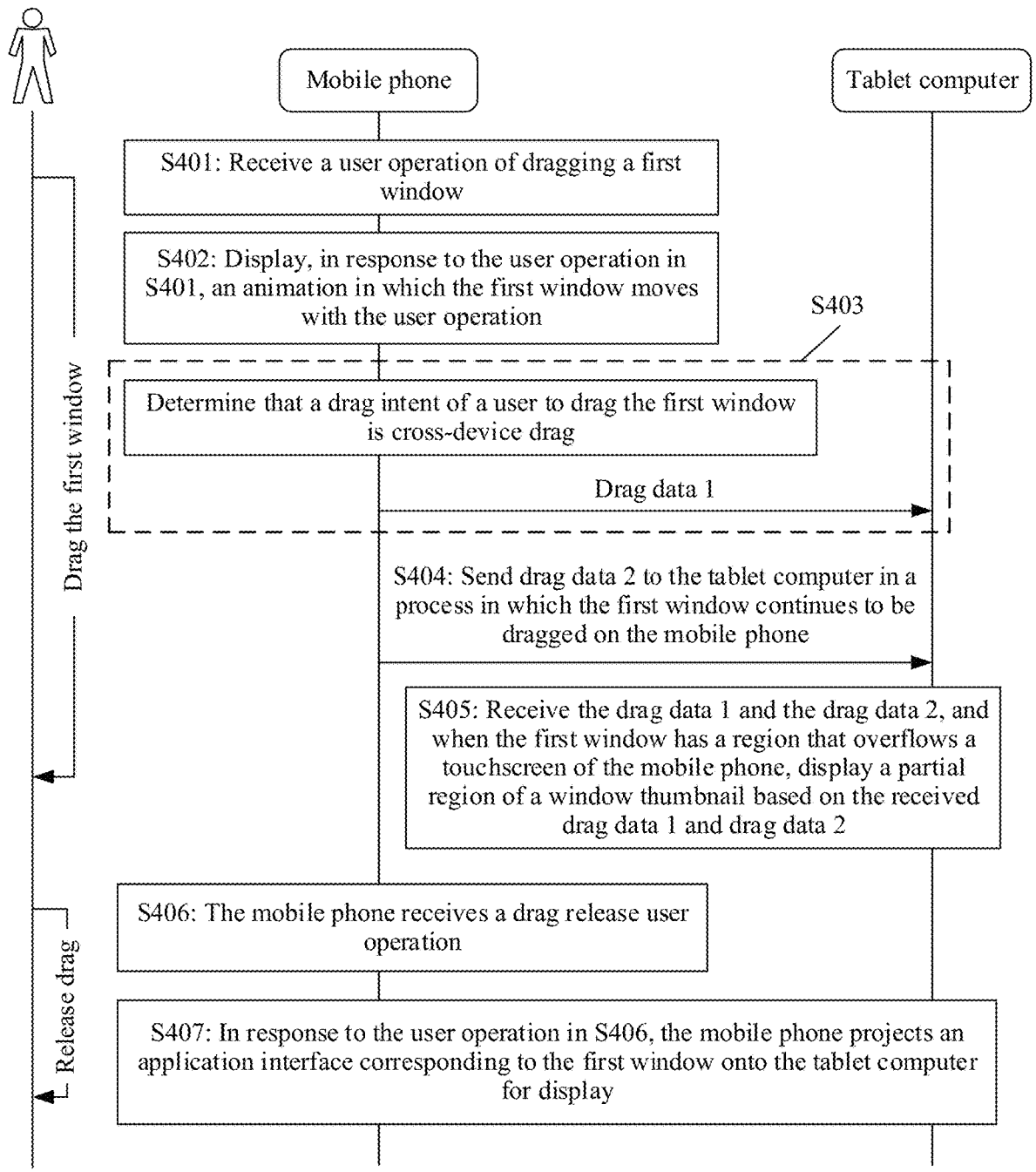
FIG. 4 is a schematic flowchart of a cross-device object drag method according to an embodiment of this application.

FIG. 4 is a schematic flowchart of a cross-device object drag method according to an embodiment of this application. In this embodiment, the method provided in this embodiment is described in detail by using an example in which the first terminal 101 is a mobile phone, the second terminal 102 is a tablet computer, the input device of the first terminal 101 is a touchscreen, and the dragged object is an application window or a freeform window. For example, the mobile phone is used as the source device, and the tablet computer is used as the target device.

As shown in FIG. 4, the method may include S401 to S407.

S401: The mobile phone receives a user operation of dragging a first window.

S402: The mobile phone displays, in response to the user operation in S401, an animation in which the first window moves with the user operation.

The first window in this embodiment may be an application window or a freeform window. The user operation is used to trigger the first window to move on the touchscreen with movement of a finger (or a stylus) of a user, or the user operation is used to initiate drag for the first window. In other words, by performing the user operation, the user may trigger the first window, for example, the application window or the freeform window, to move on the touchscreen of the mobile phone with movement of the finger (or the stylus) of the user, that is, trigger drag for the first window. It should be noted that the application window may be a window of any application installed on the mobile phone. The application may be a system application or a third-party application. This is not limited in this embodiment.

The user operation in S401 may be the drag operation in this application. In some embodiments, the user operation in S401 may include one or more operations. For example, the user operation may include an operation of triggering drag for the first window and an operation of triggering movement of the first window.

The operation of triggering drag for the first window may be a screen touch gesture operation. For example, the first window is an application window. The screen touch gesture operation of triggering drag for the first window may be any one of the following predetermined gesture operations: a gesture operation (for example, a touch and hold operation or a double-tap operation) on a title bar in the first window, a slide operation (for example, a slide operation that starts from the lower edge of the mobile phone and that points to the upper edge of the mobile phone when the terminal currently displays the first window) on the first window, a gesture operation (for example, a single-finger touch and hold operation, a single-finger double-tap operation, or a multi-finger touch and hold operation) on the first window, a 3D touch (3D touch) operation on the first window, a palm operation (for example, a palm touch and hold operation or a palm single-tap operation) on the first window, and the like. For example, the first window is a freeform window. The screen touch gesture operation of triggering drag for the first window may be any one of the following predetermined gesture operations: a tap operation on an application icon in a side dock bar and a slide operation of sliding up from the bottom of an application interface when the terminal currently displays the application interface. The operation of triggering drag for the first window may be alternatively an air gesture operation. The air gesture operation may be a static air gesture operation or a dynamic air gesture operation. The static air gesture operation means a hand posture at a moment, for example, finger bending or folding, for example, an OK gesture, a V gesture, or a five-finger stretching gesture. The dynamic air gesture operation means a hand motion situation in a period of time, including a motion direction, a speed, a hand posture change, and the like, for example, a sweep gesture, a pan gesture, a fisting gesture, and a press gesture. The air gesture operation of triggering drag for the first window may be the foregoing static air gesture operation or dynamic air gesture operation.

The operation of triggering movement of the first window may be a screen touch gesture operation. For example, the screen touch gesture operation of triggering movement of the first window may be an operation of pressing and moving the dragged first window. The operation of triggering movement of the first window may be alternatively an air gesture operation. For example, the air gesture operation of triggering movement of the first window is a press gesture and a pan gesture for the dragged first window. For another example, the air gesture operation of triggering movement of the first window is a fisting gesture and a pan gesture that are performed after the first window is dragged. For another example, the air gesture operation of triggering movement of the first window is the static air gesture operation and the pan gesture that are performed after the first window is dragged. The press described in this embodiment may also be described as press and hold, and is an operation of pressing by the user without uplifting the finger (or pressing the screen by the user with the stylus without uplifting the stylus).

It should be noted that the foregoing screen touch gesture operation may be performed by the user with a hand, or may be performed by the user with a stylus. This is not limited in this embodiment.

Figure 5A:
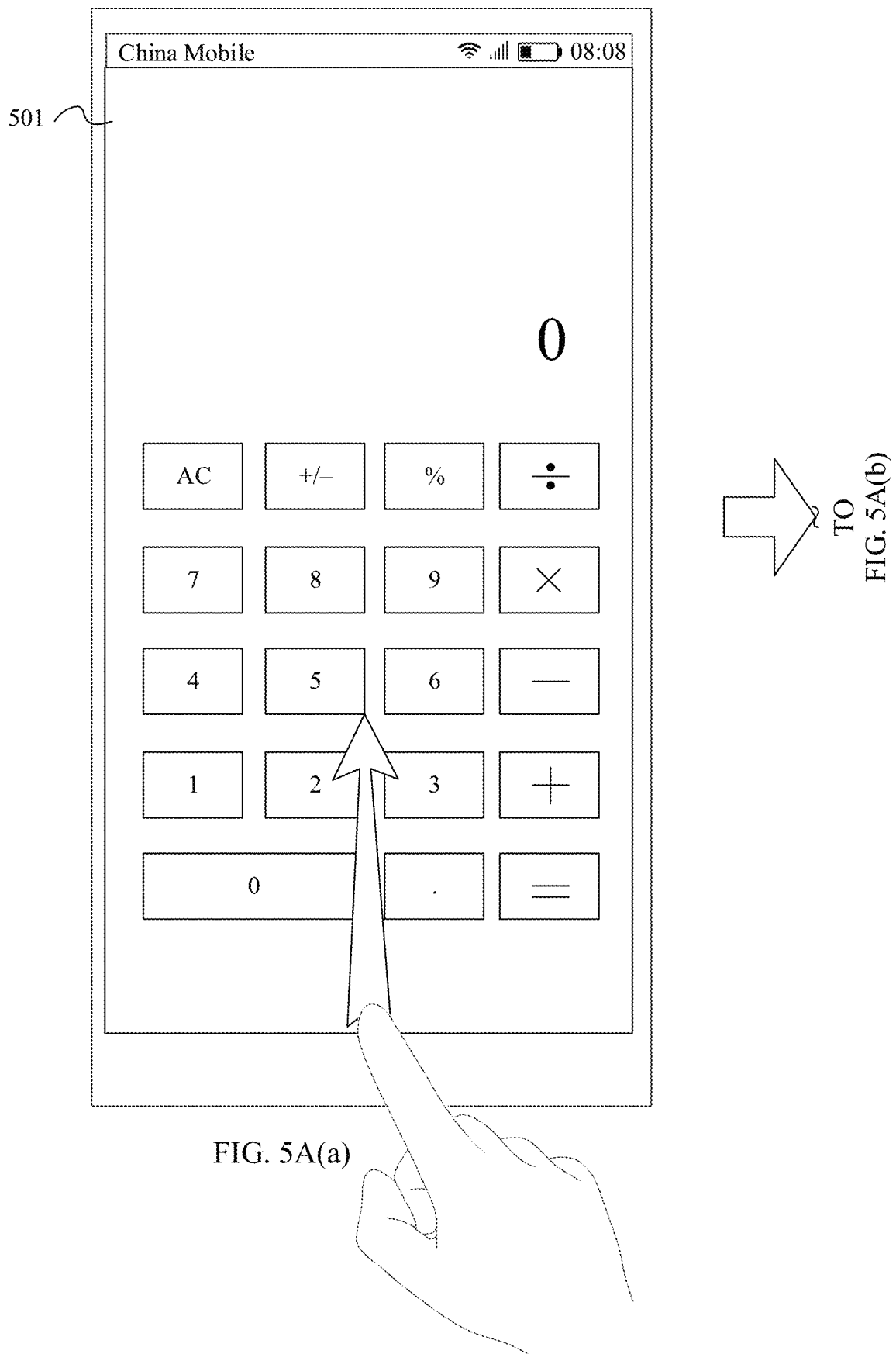
FIG. 5A(a) to FIG. 5A(c) are a schematic diagram of a cross-device object drag interface according to an embodiment of this application.
Figure 5A:
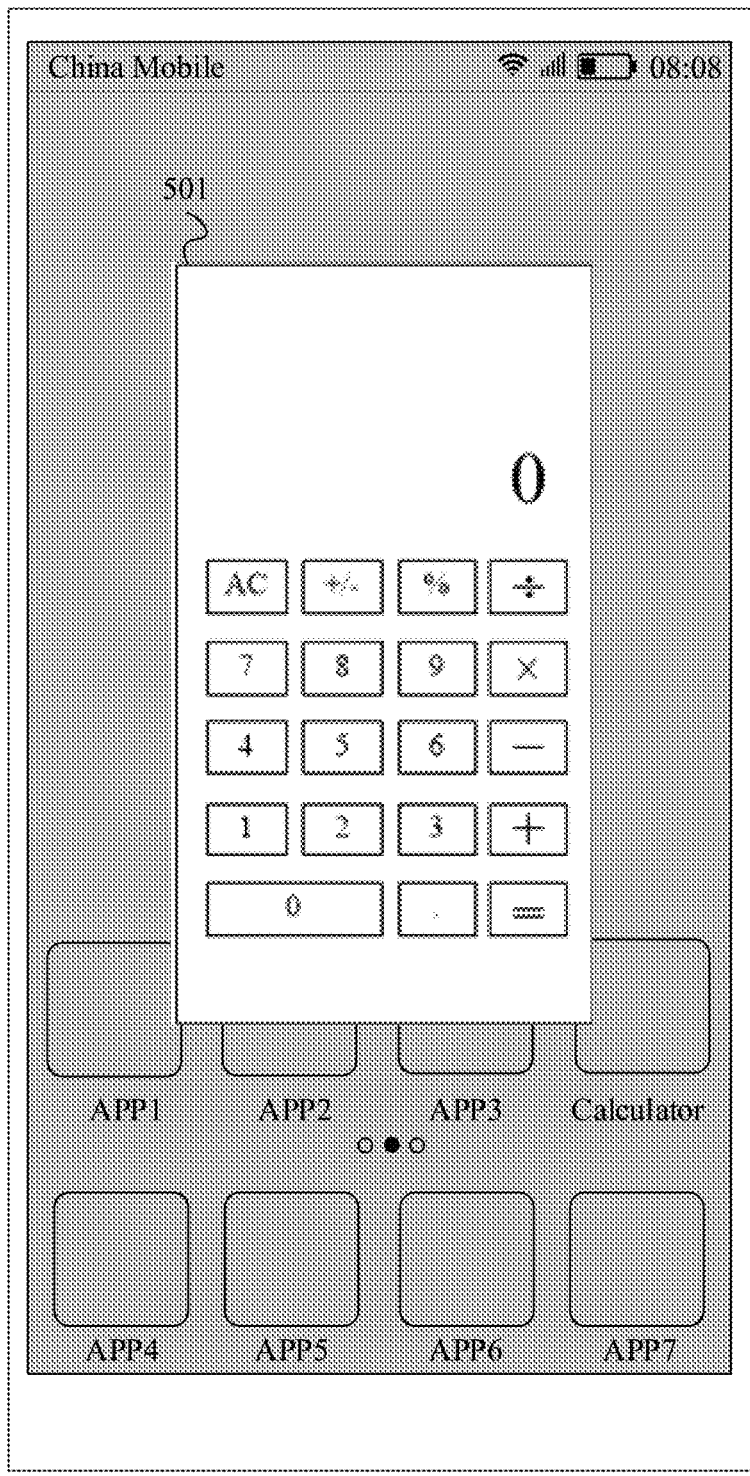
Figure 5A:
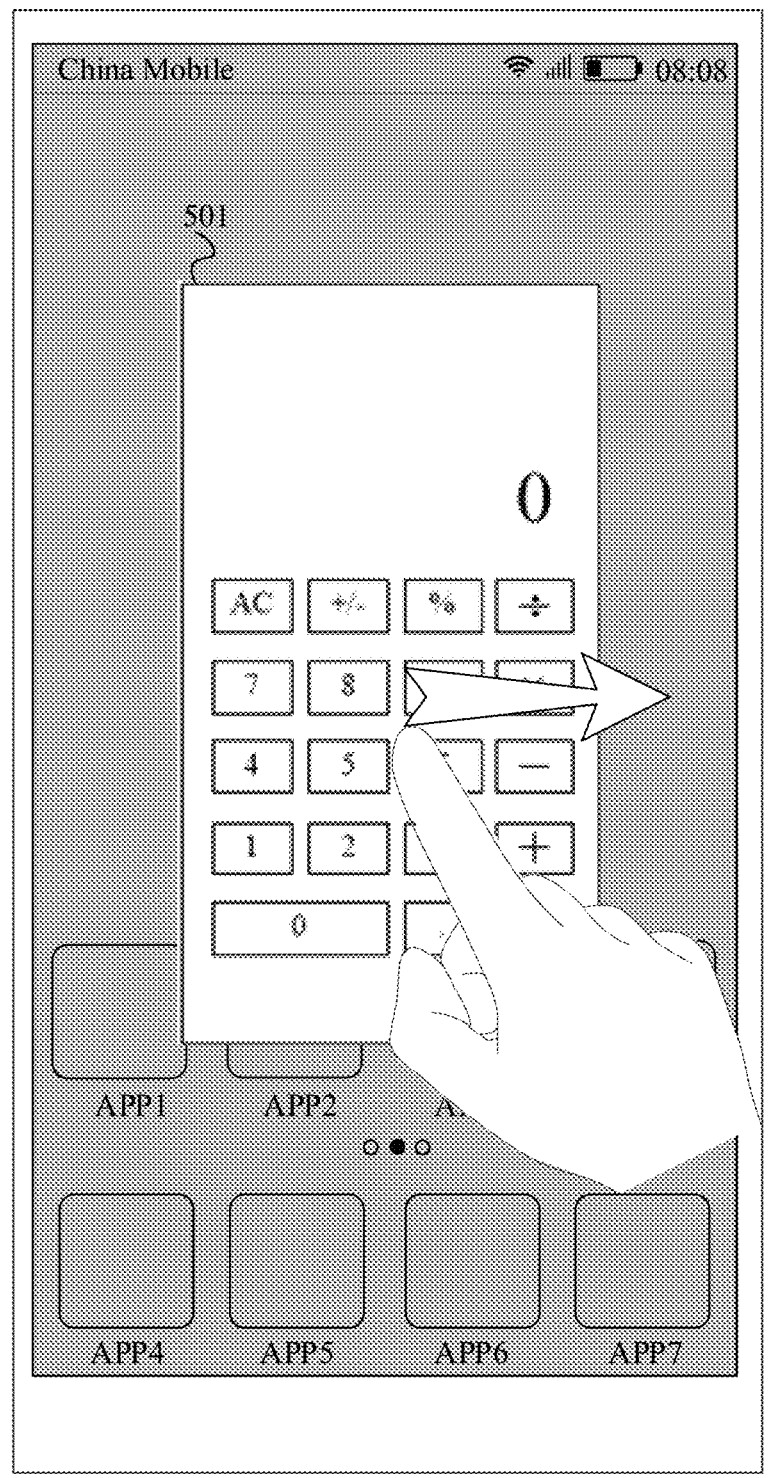

For example, with reference to FIG. 5A(a) to FIG. 5A(c), the first window is an application window, for example, a calculator window, and the user operation in S401 includes a slide operation on the calculator window and an operation of pressing and moving the dragged calculator window. As shown in FIG. 5A(a), a window, for example, referred to as a calculator window 501, is displayed on the touchscreen of the mobile phone. The calculator window 501 includes a calculator interface. When wanting to drag the calculator window 501, the user may perform a slide operation on the calculator window 501, for example, slide up the calculator window 501. As shown in FIG. 5A(b), in response to the operation, the mobile phone may display the calculator window 501 in a dragged state. For example, a window management module of the mobile phone may scale the calculator window 501 down, may further perform background blurring processing, and send a scaled-down calculator window 501 to a launcher at an application layer of the mobile phone to display the scaled-down calculator window 501.

Then, the user presses the calculator window 501 and moves the finger, so that the calculator window 501 moves on the touchscreen of the mobile phone as the finger of the user moves, to give the user a visual effect of dragging the calculator window 501 by the finger of the user. In this embodiment, a direction in which the window is dragged (or a drag direction) may be a direction pointing to the upper edge of the touchscreen of the mobile phone (for example, upward drag for short), a direction pointing to the left edge of the touchscreen of the mobile phone (for example, leftward drag for short), a direction pointing to the right edge of the touchscreen of the mobile phone (for example, rightward drag for short), or a direction pointing to the lower edge of the touchscreen of the mobile phone (for example, downward drag for short). For example, as shown in FIG. 5A(c), the user may perform a press operation on the dragged calculator window 501 with the finger and an operation of moving the finger rightward. As the finger of the user moves, the mobile phone, for example, a framework layer of the mobile phone, may draw an animation (or a drag animation) in which the calculator window 501 moves with the finger of the user, and send the animation to the application layer (for example, the launcher at the application layer) of the mobile phone to display, on the touchscreen of the mobile phone, the animation in which the calculator window 501 moves with the finger of the user, to give the user a visual effect of dragging the calculator window 501 rightward by the finger of the user.

Figure 5B:
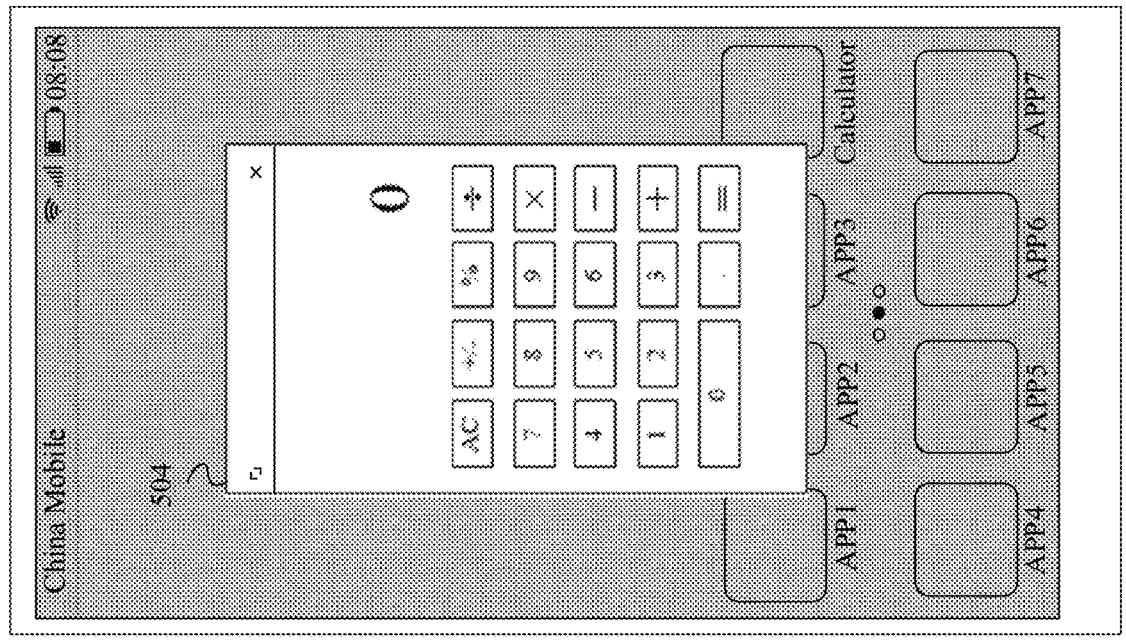
FIG. 5B is a schematic diagram of another cross-device object drag interface according to an embodiment of this application.
Figure 5B:
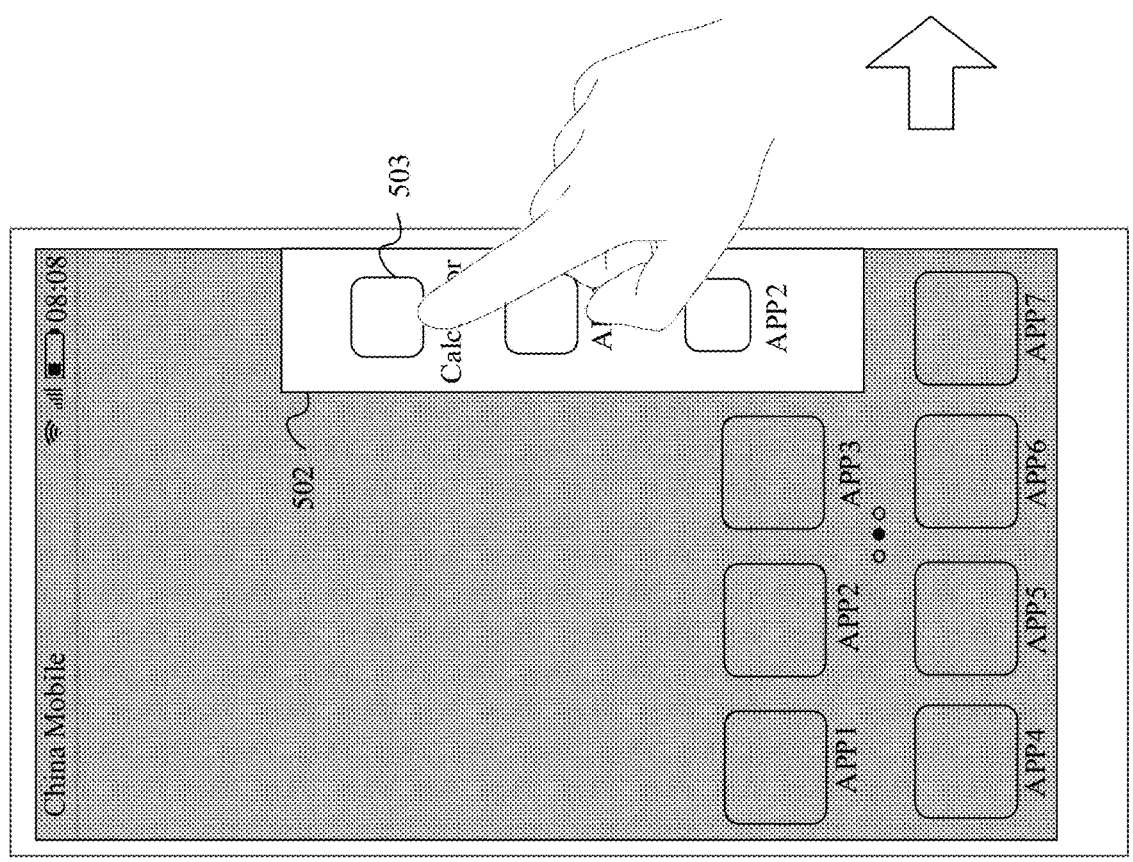

For another example, with reference to FIG. 5B, the first window is a freeform window, the freeform window includes a calculator interface, and the user operation in S401 includes a tap operation on a calculator icon in a side dock bar and an operation of pressing and moving the freeform window. As shown in (a) in FIG. 5B, a home screen is displayed on the touchscreen of the mobile phone, and the user may perform, on the touchscreen of the mobile phone, a leftward slide operation starting from the right edge of the touchscreen of the mobile phone. In response to the slide operation, the mobile phone may display a dock bar 502. The dock bar 502 includes icons of one or more applications.

After the user performs an operation on an icon in the dock bar 502, for example, a tap operation, the mobile phone may display an interface of a corresponding application in a form of a freeform window. The dock bar 502 includes a calculator icon 503. The user may perform a tap operation on the calculator icon 503 included in the dock bar 502. In response to the tap operation, as shown in (b) in FIG. 5B, the mobile phone (for example, a window management module of the mobile phone) may display a freeform window 504. The freeform window 504 includes a calculator interface. Then, the user presses the freeform window 504 and moves the finger, so that the freeform window 504 moves on the touchscreen of the mobile phone as the finger of the user moves, to give the user a visual effect of dragging the freeform window 504 by the finger of the user. Specific descriptions of dragging the freeform window 504 by the user are similar to the specific descriptions of dragging the calculator window 501 in FIG. 5A(a) to FIG. 5A(c) by the user. Details are not described herein again. In addition, in addition to the foregoing tap operation on the corresponding icon in the dock bar 502, a user operation of displaying an application interface in a form of a freeform window may be alternatively a slide operation of sliding up by the user from the bottom of the application interface when the terminal displays the application interface. An end point of the slide operation may be any location on the application interface, for example, may be at the top of the application interface. This is not specifically limited in this embodiment.

S403: The mobile phone sends drag data 1 to the tablet computer when determining that a drag intent of the user to drag the first window is cross-device drag.

The drag data 1 may be first drag data in this application.

It may be understood that drag may be classified into intra-device drag and cross-device drag (or inter-device drag). The intra-device drag may mean that a drag intent is to drag a dragged object from one location on a device to another location on the device. The cross-device drag may mean that a drag intent is to drag a dragged object from one location on a device to another device.

In this embodiment, after the first window is dragged by the user, the mobile phone may determine whether the drag intent of the user to drag the first window is cross-device drag. After it is determined that the drag intent of the user to drag the first window is cross-device drag, drag data, for example, referred to as the drag data 1, is sent to a target device for cross-device drag, and is used by the target device to draw a dragged window, to give the user a visual effect of dragging the first window from a source device to the target device. For example, with reference to FIG. 3, in a process of dragging the first window, the application layer (for example, the launcher at the application layer) of the mobile phone may monitor drag, to determine whether the intent of the user to drag the first window is cross-device drag.

In some embodiments, the mobile phone (for example, the launcher at the application layer of the mobile phone) may determine, by using a drag sensing region, whether the drag intent of the user to drag the first window is cross-device drag.

The drag sensing region may be a region on the touchscreen of the mobile phone at a predetermined distance from an edge of the touchscreen. The predetermined distance may be predefined, or a setting interface may be provided for the user to set the predetermined distance. This is not limited in this embodiment.

Figure 6A:
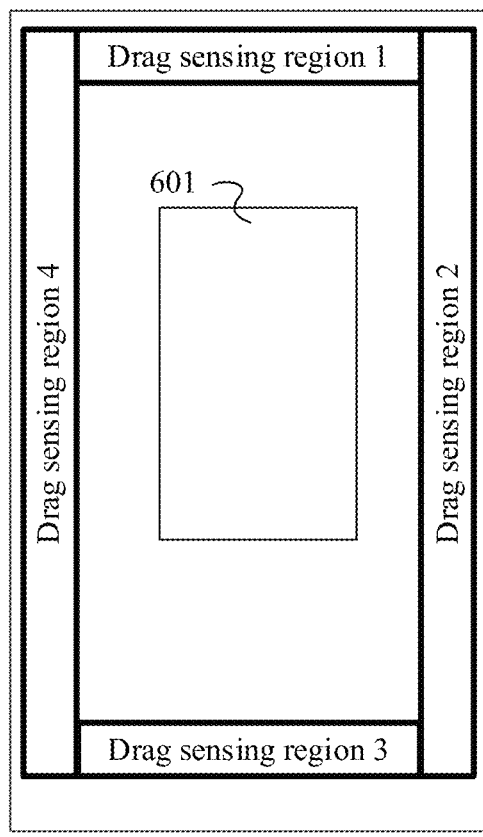
FIG. 6A is a schematic diagram of a drag sensing region according to an embodiment of this application.

For example, one terminal (for example, one mobile phone) may have one or more drag sensing regions. For example, FIG. 6A is a schematic diagram of locations of drag sensing regions according to this embodiment. As shown in FIG. 6A, the mobile phone may be provided with four drag sensing regions, which are respectively referred to as a drag sensing region 1, a drag sensing region 2, a drag sensing region 3, and a drag sensing region 4. These drag sensing regions each are provided with a transparent view (view) control. The drag sensing region 1 is at a location close to the upper edge of the touchscreen of the mobile phone. The drag sensing region 2 is at a location close to the right edge of the touchscreen of the mobile phone. The drag sensing region 3 is at a location close to the lower edge of the touchscreen of the mobile phone. The drag sensing region 4 is at a location on the left edge of the touchscreen of the mobile phone. In other words, locations close to four edges of the touchscreen of the mobile phone each are provided with a transparent view control. When the first window, for example, a first window 601 shown in FIG. 6A, is dragged to any one of the four drag sensing regions, a view control that is set in a corresponding region may monitor drag-in of the first window 601. When the view control monitors drag-in of the first window 601, the mobile phone may determine that the drag intent of the user is cross-device drag.

The drag sensing region may be further used by the mobile phone to determine a drag direction. As described in S402, the drag direction may be upward, rightward, downward, and leftward. The mobile phone may determine the drag direction based on a location, on the touchscreen, of the drag sensing region to which the first window is dragged. For example, still with reference to FIG. 6A, when the first window 601 is dragged to a drag sensing region located on the upper side of the touchscreen of the mobile phone, for example, the drag sensing region 1 in FIG. 6A, the view control that is set in the drag sensing region 1 may monitor drag-in of the first window 601, and the mobile phone may determine that the drag direction is upward. When the first window 601 is dragged to a drag sensing region located on the right side of the touchscreen of the mobile phone, for example, the drag sensing region 2 in FIG. 6A, the view control that is set in the drag sensing region 2 may monitor drag-in of the first window 601, and the mobile phone may determine that the drag direction is rightward. When the first window 601 is dragged to a drag sensing region located on the lower side of the touchscreen of the mobile phone, for example, the drag sensing region 3 in FIG. 6A, the view control that is set in the drag sensing region 3 may monitor drag-in of the first window 601, and the mobile phone may determine that the drag direction is downward. When the first window 601 is dragged to a drag sensing region located on the left side of the touchscreen of the mobile phone, the view control that is set in the drag sensing region 4 may monitor drag-in of the first window 601, for example, the drag sensing region 4 in FIG. 6A, and the mobile phone may determine that the drag direction is leftward.

In some other embodiments, the mobile phone (for example, the launcher at the application layer of the mobile phone) may determine, by determining a distance between the first window and an edge of the touchscreen, whether the drag intent of the user to drag the first window is cross-device drag.

For example, when it is determined that a distance between one of the upper left corner, the upper right corner, the lower left corner, and the lower right corner of the first window and the edge of the touchscreen is less than a predetermined distance, it may be determined that the drag intent of the user is cross-device drag. The drag direction may also be determined by determining a specific edge of the touchscreen whose distance to the first window is less than the predetermined distance.

Figure 6B:
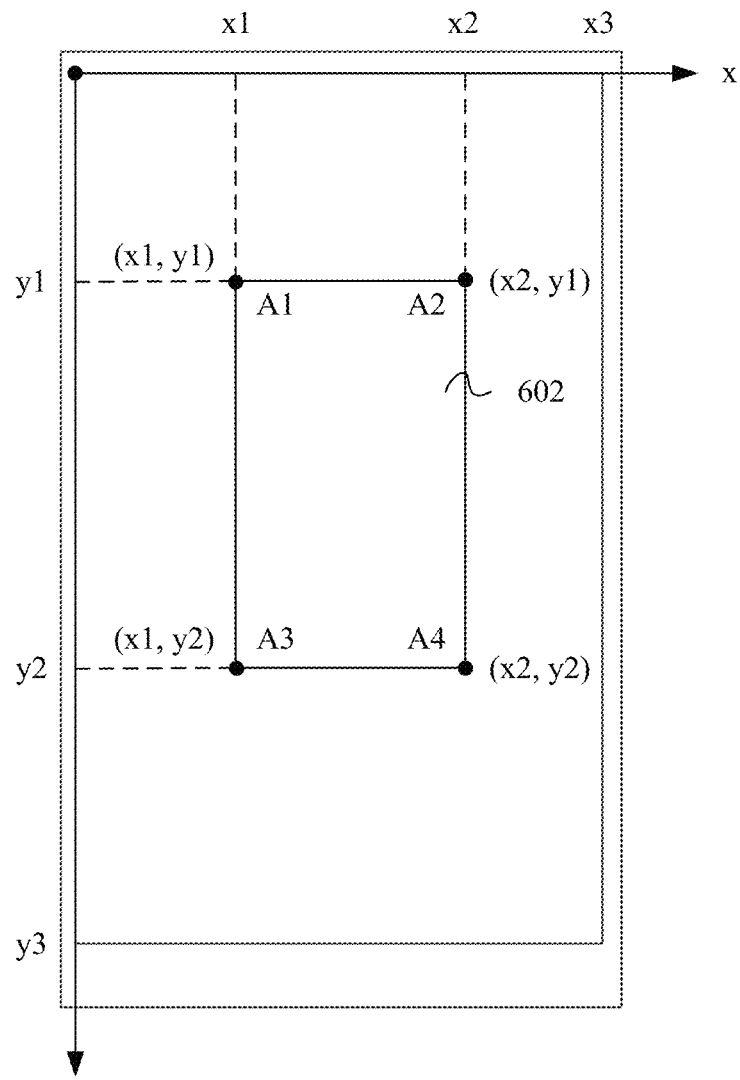
FIG. 6B is a schematic diagram of a display coordinate system according to an embodiment of this application.

For example, FIG. 6B is a schematic diagram of a display coordinate system according to this embodiment. As shown in FIG. 6B, a coordinate origin of the display coordinate system is the upper left corner of the touchscreen of the mobile phone, an x axis points from the coordinate origin to the right edge of the touchscreen of the mobile phone, and a y axis points from the coordinate origin to the lower edge of the touchscreen of the mobile phone. The mobile phone may determine coordinates of each edge of the mobile phone in the display coordinate system. For example, a coordinate of the right edge of the touchscreen of the mobile phone on the X axis is x3, a coordinate of the left edge of the touchscreen of the mobile phone on the X axis is 0, a coordinate of the upper edge of the touchscreen of the mobile phone on the Y axis is 0, and a coordinate of the lower edge of the touchscreen of the mobile phone on the Y axis is y3. In the process in which the first window, for example, a first window 602 shown in FIG. 6B, is dragged by the user on the touchscreen of the mobile phone, the mobile phone may monitor the upper left corner, the upper right corner, the lower left corner, and the lower right corner of the first window 602 in real time, for example, which respectively have coordinates of A1, A2, A3, and A4 shown in FIG. 6B in the display coordinate system. For example, the coordinates of the upper left corner A1 in the display coordinate system are (x1, y1), the coordinates of the upper right corner A2 in the display coordinate system are (x2, y1), the coordinates of the lower left corner A3 in the display coordinate system are (x1, y2), and the coordinates of the lower right corner A4 in the displayed coordinate system are (x2, y2). Based on the coordinates of four corners of the first window 602 and the coordinates of four edges of the touchscreen of the mobile phone, when determining that a distance between one of the four corners and an edge of the touchscreen is less than the predetermined distance, the mobile phone may determine that the drag intent of the user to drag the first window 602 is cross-device drag, and may further determine the drag direction. For example, if the mobile phone determines, based on the coordinate x2 of the upper right corner A2 on the X axis and the coordinate x3 of the right edge of the touchscreen, that a distance (for example, x3−x2) between the upper right corner A2 and the right edge of the touchscreen is less than the predetermined distance, the mobile phone may determine that the drag intent of the user to drag the first window 602 is cross-device drag, and may further determine that the drag direction is rightward. For another example, if the mobile phone determines, based on the coordinate x1 of the lower left corner A3 on the X axis and the coordinate 0 of the left edge of the touchscreen, that a distance (for example, x1−0 or x1) between the lower left corner A3 and the left edge of the touchscreen is less than the predetermined distance, the mobile phone may determine that the drag intent of the user to drag the first window 602 is cross-device drag, and may further determine that the drag direction is leftward.

As described above, after the mobile phone determines that the drag intent of the user to drag the first window is cross-device drag, to implement continuation of drag on the target device and give the user the visual effect of dragging the first window from the source device to the target device, the mobile phone may send the corresponding drag data, for example, referred to as the drag data 1, to the target device. For example, with reference to FIG. 3, the drag data 1 may be sent by a drag service module at the application layer of the mobile phone to the target device, and is used by the target device to draw a dragged window.

The drag service module at the application layer of the mobile phone may obtain the drag data 1 when the first window starts to be dragged. In an example, a specific implementation in which the drag service module at the application layer of the mobile phone obtains the drag data 1 may be as follows: After the mobile phone (for example, the launcher at the application layer of the mobile phone) initiates drag for the first window, the framework layer of the mobile phone generates a corresponding drag event, for example, a drag start event. The drag start event includes the drag data 1. The launcher at the application layer of the mobile phone may call back the drag start event generated by the framework layer, to extract the drag data 1 from the drag start event. After extracting the drag data 1, the launcher at the application layer of the mobile phone may send the drag data 1 to the drag service module at the application layer of the mobile phone. In this way, the drag service module at the application layer of the mobile phone can obtain the drag data 1. Then, the launcher at the application layer of the mobile phone monitors drag, and after determining that the drag intent of the user to drag the first window is cross-device drag, may notify the drag service module at the application layer of the mobile phone that the drag is cross-device drag. In this case, the drag service module at the application layer of the mobile phone may send the obtained drag data 1 to the target device for cross-device drag.

In some embodiments, the drag data 1 may include an interface of an application in the first window, for example, may be a screenshot of the first window (or a screenshot of the interface of the application in the first window) or rectangle (rectangle, rect) information of the first window. The drag data 1 may further include a type (for example, a window type) of the dragged object and/or an indication indicating that the drag data 1 is related data in the drag start event. The indication may identify a start of the drag, and may be used to notify the source device and the target device for cross-device drag to start a related service for cross-device drag, for example, a drag service or a projection service. The related service is used to implement cross-device drag.

The rect information of the first window includes coordinate information of the upper left corner, the upper right corner, the lower left corner, and the lower right corner of the first window when drag starts. Specifically, still refer to FIG. 6B. In the display coordinate system provided in this embodiment, the rect information of the first window may include the coordinates (x1, y1) of the upper left corner A1 in the display coordinate system, the coordinates (x2, y1) of the upper right corner A2 in the display coordinate system, the coordinates (x1, y2) of the lower left corner A3 in the display coordinate system, and the coordinates (x2, y2) of the lower right corner A4 in the display coordinate system.

As described above, the mobile phone used as the source device may send the obtained drag data 1 to the target device for cross-device drag, so that the target device draws the dragged window.

In some embodiments, a process in which the mobile phone used as the source device determines the target device may be as follows: The mobile phone obtains a device that establishes a connection to the mobile phone. If the mobile phone establishes a connection to only one device, the mobile phone may determine the device as the target device. For example, if the mobile phone establishes a connection to only the tablet computer, after determining that the drag intent of the user is cross-device drag, the mobile phone may determine the tablet computer as the target device, and send the obtained drag data (for example, the drag data 1) to the tablet computer.

If the mobile phone establishes connections to a plurality of devices at the same time, the mobile phone may display information about the plurality of devices (for example, referred to as candidate terminals). For example, the mobile phone may display a recommended device list. The recommended device list includes information such as a device identifier about each device (or each candidate terminal) that establishes the connection to the mobile phone, for selection by the user. The user may perform a selection operation on one or more device identifiers. After receiving the selection operation of the user, the mobile phone may determine, as the target device, a device corresponding to the device identifier selected by the user. For example, if the mobile phone establishes connections to the tablet computer and a PC at the same time, after determining that the drag intent of the user is cross-device drag, the mobile phone may display a recommended device list including an identifier of the tablet computer and an identifier of the PC. When wanting to drag the first window to the tablet computer, the user may perform a selection operation on the identifier of the tablet computer in the recommended device list. After receiving the selection operation, the mobile phone may determine the tablet computer as the target device, and send the obtained drag data (for example, the drag data 1) to the tablet computer.

If the mobile phone establishes no connection to another device, the mobile phone may obtain, by using a discovery technology, for example, Bluetooth discovery or Wi-Fi discovery, a device whose distance from the mobile phone is within a connectable range, and display information about the device (for example, referred to as a candidate terminal) whose distance from the mobile phone is within the connectable range. For example, the mobile phone may display information about these devices, for example, a recommended device list including a device identifier, for selection by the user. Similarly, the user may perform a selection operation on one or more device identifiers. After receiving the selection operation of the user, the mobile phone may determine, as the target device, a device corresponding to the device identifier selected by the user. Because the device currently establishes no connection to the mobile phone, after determining the target device, the mobile phone may send a request to the device, to request to establish a connection to the device. After the connection to the device is successfully established, the mobile phone may send the obtained drag data (for example, the drag data 1) to the device. For example, by using a positioning technology, the mobile phone obtains that both distances between the tablet computer and the mobile phone and between a PC and the mobile phone are within the connectable range. In this case, the mobile phone displays a recommended device list including an identifier of the tablet computer and an identifier of the PC. When wanting to drag the first window to the tablet computer, the user may perform a selection operation on the identifier of the tablet computer in the recommended device list. After receiving the selection operation, the mobile phone may determine the tablet computer as the target device, and the mobile phone may request to establish a connection to the tablet computer. After the connection is successfully established, the mobile phone may send the obtained drag data 1 to the tablet computer.

In some other embodiments, a process in which the mobile phone determines the target device may be as follows: The mobile phone obtains a device connected to the mobile phone, and obtains, by using a positioning technology, a device whose distance from the mobile phone is within a connectable range. The mobile phone may determine information about these devices (for example, referred to as candidate terminals) based on an obtaining result. For example, the mobile phone may display a recommended device list for selection by the user. It may be understood that the recommended device list may include information such as a device identifier about one or more devices that establish connections to the mobile phone, and/or information such as a device identifier about one or more devices that establish no connection to the mobile phone but whose distances from the mobile phone are within the connectable range. Then, the mobile phone may determine, as the target device based on a selection operation of the user, a device corresponding to a device identifier selected by the user, and send the obtained drag data (for example, the drag data 1) to the target device. Specific descriptions of implementation details in this implementation are similar to corresponding descriptions in the previous implementation. Details are not described herein again.

It should be noted that the device identifier included in the foregoing recommended device list may be an icon of a device, or may be a name of a device, or may be an icon and a name of a device. This is not specifically limited in this embodiment.

In addition, in this embodiment, the device identifier included in the drag device list displayed by the mobile phone may be displayed according to a predetermined rule. For ease of description, the device identifier of the device that establishes the connection to the mobile phone is referred to as a connected device identifier for short, and the device identifier of the device that establishes no connection to the mobile phone but whose distance from the mobile phone is within the connectable range is referred to as an unconnected device identifier for short.

For example, the predetermined rule may include one or more of the following rules.

Rule 1: A recommendation priority of the connected device identifier is higher than a recommendation priority of the unconnected device identifier. In other words, the device that is connected to the mobile phone is preferably recommended as the target device.

Rule 2: A recommendation priority of a device identifier of a device that is close to the mobile phone is higher than a recommendation priority of a device identifier of a device that is far away from the mobile phone. In other words, the device that is close to the mobile phone is preferably recommended as the target device.

Rule 3: A recommendation priority of a device identifier of a device located in the drag direction is higher than a recommendation priority of a device identifier of a device located in another direction. In other words, the device located in the drag direction is preferably recommended as the target device. For example, if the drag direction is upward, a device in a direction pointing to the upper edge of the mobile phone is preferably recommended. For another example, if the drag direction is leftward, a device in a direction pointing to the left edge of the mobile phone is preferably recommended. For another example, if the drag direction is downward, a device in a direction pointing to the lower edge of the mobile phone is preferably recommended. For another example, if the drag direction is rightward, a device in a direction pointing to the right edge of the mobile phone is preferably recommended.

Rule 4: Recommend the target device based on dragged content. For example, if content in the dragged window is a video, a PPT, or the like, a recommendation priority of a device identifier of a device having a large screen (for example, a television) is higher than a recommendation priority of a device identifier of a device having a smaller screen size (for example, a mobile phone). In other words, a large-screen device is preferably recommended as the target device. For another example, if the dragged window is a window of an editing application, for example, a picture editing window, a drawing window, or a character editing window, a recommendation priority of a device identifier of a device with a higher interaction capability (for example, a PC, a mobile phone, or a tablet computer) is higher than a recommendation priority of a device identifier of a device with a lower interaction capability (for example, a television). In other words, a device with a high interaction capability is preferably recommended as the target device.

Rule 5: Display a corresponding device identifier based on a direction of the device relative to the mobile phone. For example, a device identifier of the device located in the direction pointing to the upper edge of the mobile phone is displayed in a display region that is close to the upper edge and that is of the touchscreen of the mobile phone. A device identifier of the device located in the direction pointing to the right edge of the mobile phone is displayed in a display region that is close to the right edge and that is of the touchscreen of the mobile phone. A device identifier of the device located in the direction pointing to the lower edge of the mobile phone is displayed in a display region that is close to the lower edge and that is of the touchscreen of the mobile phone. A device identifier of the device located in the direction pointing to the left edge of the mobile phone is displayed in a display region that is close to the left edge and that is of the touchscreen of the mobile phone. Alternatively, a corresponding device identifier is displayed based on different classifications of device types. For example, a device identifier of a mobile device such as a mobile phone or a tablet computer is displayed in a display region that is close to the left edge or the right edge and that is of the touchscreen of the mobile phone. For example, a device identifier of a large-screen device (for example, a television or a PC) or a wearable device is displayed in a display region that is close to the upper edge and that is of the touchscreen of the mobile phone.

It should be noted that a distance between the mobile phone and the another device and a direction of the another device relative to the mobile phone may be obtained by the mobile phone by using a positioning technology such as Bluetooth, ultra-wideband (Ultra-wideband, UWB), or an ultrasonic wave. In addition, recommendation priorities may be presented in the recommended device list in a manner, for example, ranking (for example, a device identifier with a high recommendation priority is ranked before a device identifier with a low recommendation priority), highlighting (for example, a device identifier with a high recommendation priority is highlighted for display, and a device identifier with a low recommendation priority is normally displayed), or dynamic display (for example, a device identifier with a high recommendation priority is dynamically displayed, and a device identifier with a low recommendation priority is statically displayed). This is not specifically limited in this embodiment.

Figure 7:
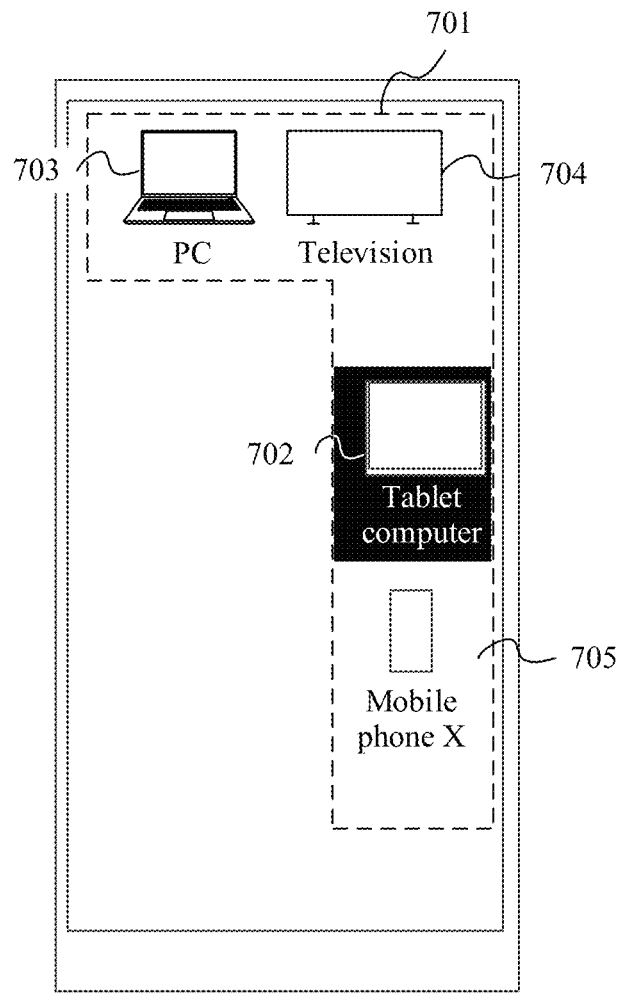
FIG. 7 is a schematic diagram of a recommended device list according to an embodiment of this application.

For example, with reference to FIG. 7, the target device is selected by the user from the recommended device list displayed on the mobile phone, the recommended device list is displayed according to Rule 1 and Rule 5 (a corresponding device identifier is displayed based on different classifications of device types), and the device identifier includes an icon and a name of the device. After determining that the drag intent of the user is cross-device drag, as shown in FIG. 7, the mobile phone may display a recommended device list 701. The recommended device list 701 includes a device identifier 702 of a tablet computer, a device identifier 703 of a PC, a device identifier 704 of a television, and a device identifier 705 of a mobile phone X. The tablet computer has established a connection to the mobile phone, and the PC, the mobile phone X, and the television establishes no connection to the mobile phone. As shown in FIG. 7, the device identifier 702 of the tablet computer and the device identifier 705 of the mobile phone X are displayed in the display region that is close to the right edge and that is of the touchscreen of the mobile phone, the device identifier 703 of the PC and the device identifier 704 of the television are displayed in the display region that is close to the upper edge and that is of the touchscreen of the mobile phone, and the device identifier 702 of the tablet computer in displayed in a highlighted manner, to prompt the user that the mobile phone establishes the connection to the tablet computer.

After the mobile phone displays the information about the candidate device, the recommended device list, the user may select, from the recommended list, the target device to which the user wants to drag the first window. The user may select one or more devices as the target devices. If the user selects one device as the target device, the mobile phone (for example, the drag service module at the application layer of the mobile phone) may send the obtained drag data (for example, the drag data 1) to the device, and the obtained drag data is used by the device to draw the dragged window. If the user selects a plurality of devices as the target devices, the mobile phone (for example, the drag service module at the application layer of the mobile phone) may send the obtained drag data (for example, the drag data 1) to the plurality of devices, and the obtained drag data is used by these devices to draw the dragged window. For example, still with reference to FIG. 7, the user wants to drag the first window to the tablet computer. The user may perform a selection operation (for example, a tap operation) on the device identifier 702 of the tablet computer in the recommended device list 701. In response to the operation, the mobile phone may determine the tablet computer as the target device. Then, the mobile phone may send the obtained drag data 1 to the tablet computer.

Figure 8A:
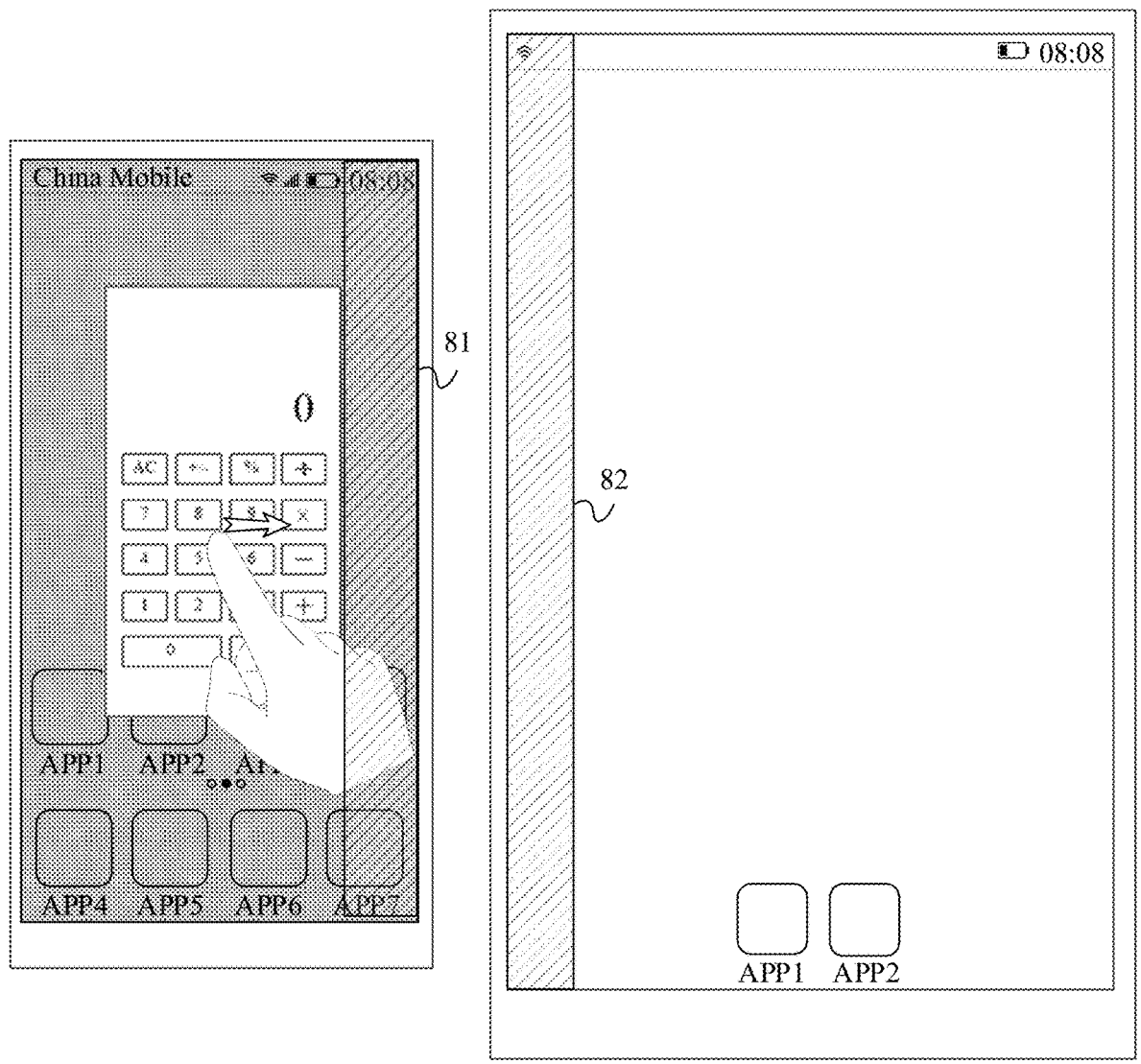
FIG. 8A(a) and FIG. 8A(b) are a schematic diagram of still another cross-device object drag interface according to an embodiment of this application.
Figure 8A:
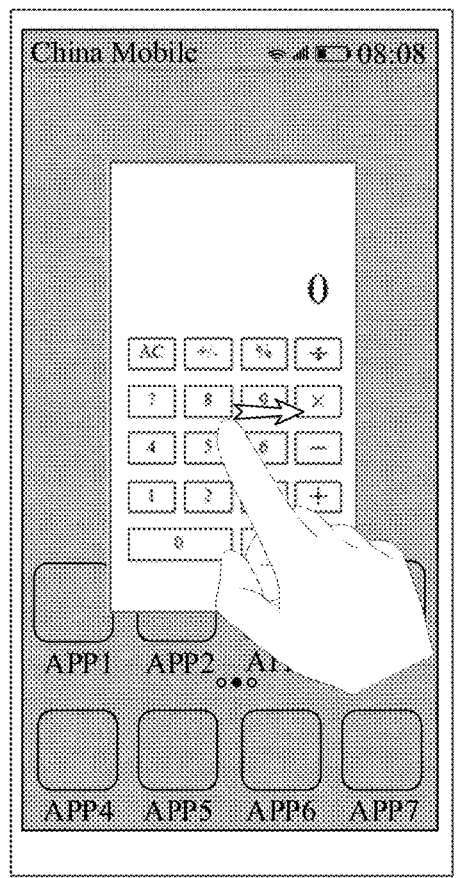
Figure 8A:
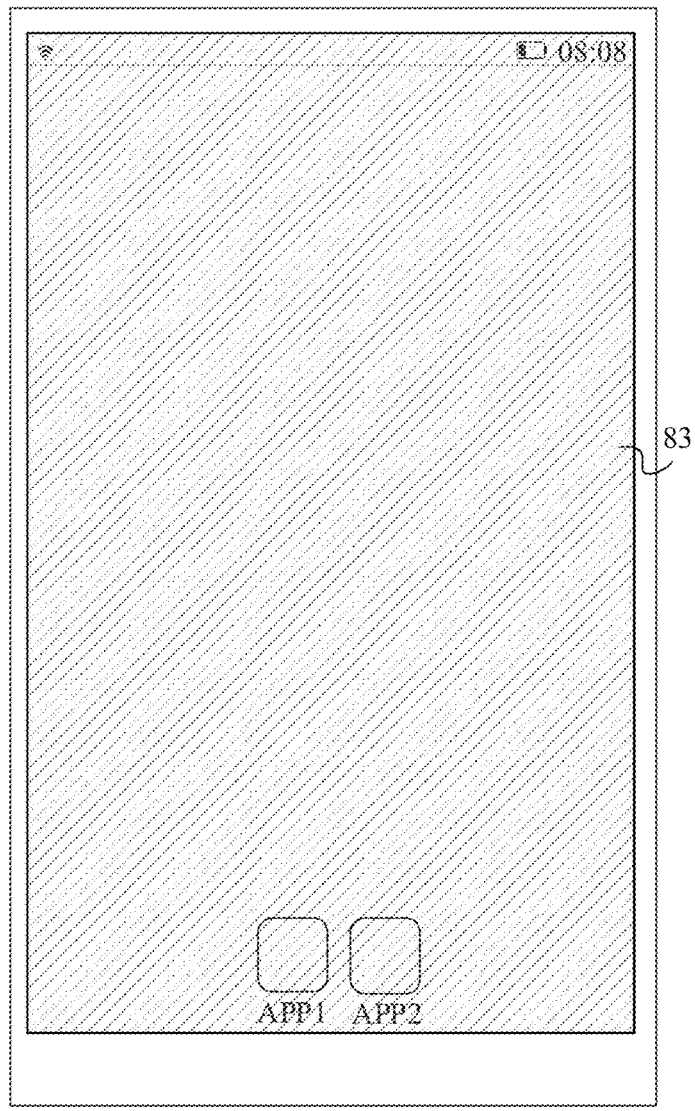

In addition, in some embodiments, when determining that the drag intent of the user is cross-device drag, the mobile phone used as the source device may display a related prompt (for example, referred to as prompt information), to prompt the user that the dragged object is to be dragged out of the mobile phone. Similarly, when receiving the drag data 1, the tablet computer used as the target device may also display a related prompt. For example, the tablet computer may display the related prompt based on an indication that is in the drag data 1 and that indicates that the drag data 1 is related data in the drag start event, to prompt the user that the object is to be dragged in. Certainly, during cross-device drag, it may be prompted only on the source device that the object is to be dragged out, or may be prompted only on the target device that the object is to be dragged in, or both the source device and the target device may provide the corresponding prompts. This is not specifically limited in this embodiment. For example, as shown in FIG. 8A(a), when the mobile phone determines that the drag intent of the user is cross-device drag, the mobile phone may display an interface element 81 on an edge that is of the screen and from which the object is to be dragged out, to prompt the user that the dragged object is to be dragged out of the mobile phone. For example, the mobile phone may determine, based on the drag direction, an edge on which the interface element 81 is specifically displayed. For example, if the drag direction is rightward, the interface element 81 is displayed on the right edge of the screen. If the drag direction is upward, the interface element 81 is displayed on the upper edge of the screen. In addition, when the tablet computer receives the drag data 1, the tablet computer may display an interface element 82 on an edge of a screen in which the object is to be dragged, to prompt the user that the object is to be dragged in. For another example, as shown in FIG. 8A(b), the mobile phone gives no prompt when determining that the drag intent of the user is cross-device drag. The tablet computer displays an interface element 83 on a display when receiving the drag data 1, to prompt the user that the object is to be dragged in. The interface element 81, the interface element 82, and the interface element 83 may be bar-shaped interface elements, for example, rectangular interface elements shown in the figures, or may be interface elements in another shape and another size, and may be further filled with a color, for example, blue, white, or multicolor. In addition, the interface element 81, the interface element 82, and the interface element 83 may be statically displayed on the screens, or may be dynamically displayed on the screens. This is not limited in this embodiment of this application either.

S404: Send drag data 2 to the tablet computer in a process in which the first window continues to be dragged on the mobile phone.

The drag data 2 may include coordinate information of a first corner of the first window. The first corner may be any one of the upper left corner, the lower left corner, the upper right corner, and the lower right corner of the first window. In some other embodiments, the drag data 2 may alternatively include coordinate information of a plurality of corners of the upper left corner, the lower left corner, the upper right corner, and the lower right corner of the first window. In the following embodiment, an example in which the drag data 2 includes the coordinate information of the first corner of the first window and the first corner is the upper left corner is used for description.

The drag data 2 may further include an indication indicating that the drag data 2 is related data in a drag movement event. The indication may indicate the target device for cross-device drag to continue to move, with the hand, the window displayed on the target device.

After triggering cross-device drag, for example, dragging the first window to the drag sensing region, the user may continue to move the finger (or the stylus). As the finger (or the stylus) of the user moves, the first window moves accordingly on the touchscreen of the mobile phone. It may be understood that, in a process in which the user drags the first window on the touchscreen of the mobile phone, one partial region of the first window may be displayed on the touchscreen of the mobile phone, and the other partial region may be hidden (or overflows the touchscreen). In some embodiments, during cross-device drag, to give the user the visual effect of dragging the first window from the source device to the target device, in the process of dragging the first window, if a partial region of the first window overflows the touchscreen, the first window may be displayed on the source device and the target device at the same time. Specifically, one partial region of the dragged first window is displayed on the source device, and the other partial region of the dragged first window (namely, the region overflowing the source device) is displayed on the target device. To achieve this effect, in the process of dragging the first window, the mobile phone may obtain corresponding drag data, for example, referred to as the drag data 2, in real time in the drag process, and send the drag data 2 to the target device for cross-device drag (for example, the tablet computer) in real time. The drag data 2 is used by the target device to draw the dragged window on the target device with reference to the drag data 1.

For example, with reference to FIG. 3, in a specific implementation, in the process of dragging the first window (or in a process of moving the first window), the drag service module at the application layer of the mobile phone may obtain the drag data 2 in real time, and send the drag data 2 to the target device for cross-device drag (for example, the tablet computer) in real time.

In an example, a specific implementation in which the drag service module at the application layer of the mobile phone obtains the drag data 2 may be as follows: In the process of dragging the first window, the framework layer of the mobile phone generates a corresponding drag event, for example, the drag movement event. The drag movement event includes the drag data 2. The launcher at the application layer of the mobile phone may call back the drag movement event generated by the framework layer, to extract the drag data 2 from the drag movement event. After extracting the drag data 2, the launcher at the application layer of the mobile phone may send the drag data 2 to the drag service module at the application layer of the mobile phone. In this way, the drag service module at the application layer of the mobile phone can obtain the drag data 2.

S405: The tablet computer receives the drag data 1 and the drag data 2. When the first window has a region that overflows the touchscreen of the mobile phone, the tablet computer displays a partial region of a window thumbnail based on the received drag data 1 and drag data 2.

The window thumbnail is drawn based on the screenshot of the first window included in the drag data 1, and has content the same as that of the screenshot of the first window. Content in the region that is displayed on the display of the tablet computer and that is in the window thumbnail is the same as content of the region that overflows the touchscreen of the mobile phone and that is of the first window.

As described in S404, to give the user the visual effect of dragging the first window from the mobile phone to the tablet computer, the tablet computer may determine, based on resolution of the mobile phone and the received drag data 1 and drag data 2, whether the dragged first window has the region that overflows the touchscreen of the mobile phone. When the tablet computer determines that the dragged first window has the region that overflows the touchscreen of the mobile phone, the tablet computer may correspondingly display the partial region of the window thumbnail (content in the region is the same as that in the region that overflows the touchscreen of the mobile phone and that is of the first window) on the display of the tablet computer. The resolution of the mobile phone may be sent by the mobile phone to the tablet computer in a process in which the tablet computer establishes the connection to the mobile phone, or after the connection is successfully established.

Figure 6C:
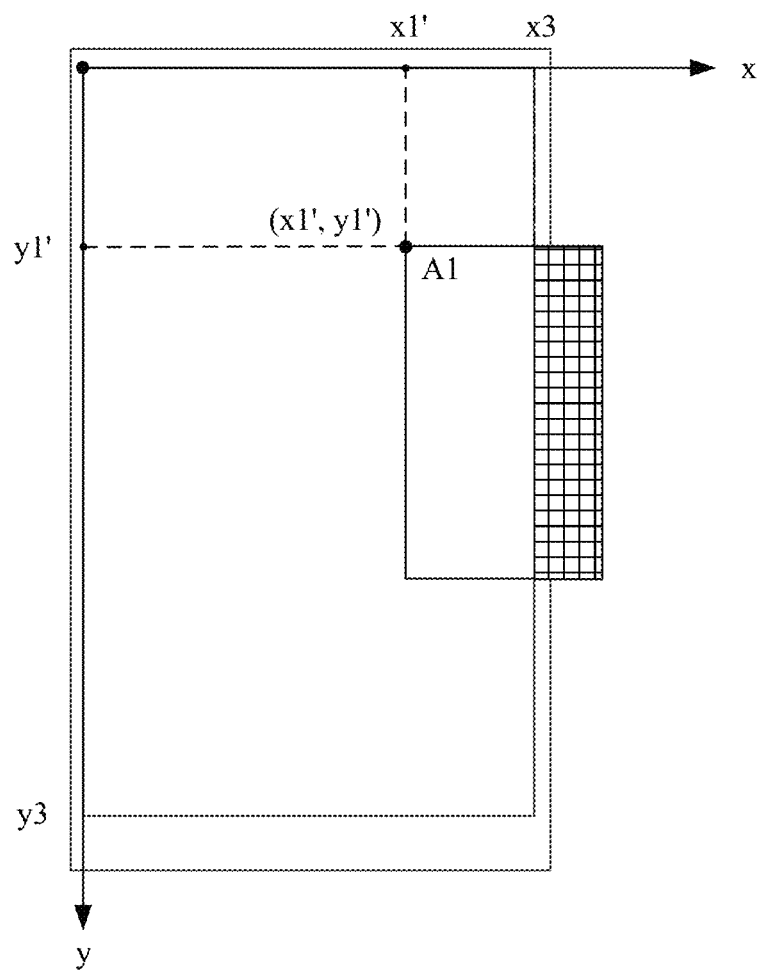
FIG. 6C is a schematic diagram in which a window overflows a device screen according to an embodiment of this application.

In an example, with reference to FIG. 6B, for example, the rect information of the first window included in the drag data 1 is as follows: the coordinates (x1, y1) of the upper left corner A1 of the first window, the coordinates (x2, y1) of the upper right corner A2 of the first window, the coordinates (x1, y2) of the lower left corner A3 of the first window, the coordinates (x2, y2) of the lower right corner A4 of the first window, and the drag data 2 includes coordinates (x1', y1') of the upper left corner A1 of the first window. As shown in FIG. 6C, a specific implementation in which the tablet computer determines, based on the resolution of the mobile phone and the received drag data 1 and drag data 2, whether the dragged first window has the region that overflows the touchscreen of the mobile phone may be as follows: The tablet computer may determine, based on the coordinates (x1, y1) of the upper left corner A1 of the first window and the coordinates (x2, y1) of the upper right corner A2 of the first window in the drag data 1, that the width of the first window is x2−x1. The tablet computer may determine, based on the coordinates (x1, y1) of the upper left corner A1 of the first window and the coordinates (x1, y2) of the lower left corner A3 of the first window in the drag data 1, that the length of the first window is y2−y1. The tablet computer may determine, based on the resolution of the mobile phone, the coordinate of the right edge of the touchscreen of the mobile phone on the x axis, for example, x3, and the coordinate of the lower edge of the touchscreen of the mobile phone on the y axis, for example, y3.

The tablet computer may determine, based on the width (x2−x1) and the length (y2−y1) of the first window, the coordinate x3 of the right edge of the touchscreen of the mobile phone, the coordinate y3 of the lower edge of the touchscreen of the mobile phone, and the coordinates (x1', y1') of the upper left corner of the first window in the drag data 2, whether the dragged first window has the region that overflows the touchscreen of the mobile phone. When x1' is less than 0, it may be determined that the first window has the region that overflows the touchscreen of the mobile phone. When y1' is less than 0, it may be determined that the first window has the region that overflows the touchscreen of the mobile phone. When a sum of x1' and the width (x2−x1) of the first window is greater than the coordinate x3 of the right edge of the touchscreen of the mobile phone, it may be determined that the first window has the region that overflows the touchscreen of the mobile phone. When a sum of y1' and the length (y2−y1) of the first window is greater than the coordinate y3 of the lower edge of the touchscreen of the mobile phone, it may be determined that the first window has the region that overflows the touchscreen of the mobile phone. For example, with reference to FIG. 6C and the example shown in FIG. 5A(a) to FIG. 5A(c), because the user drags the first window rightward, the right edge of the first window first slides out of the touchscreen of the mobile phone. After receiving the drag data 1 and the drag data 2, the tablet computer may determine that the sum of x1' and the width (x2−x1) of the first window is greater than the coordinate x3 of the right edge of the touchscreen of the mobile phone. In this case, the tablet computer may determine that the first window has the region that overflows the touchscreen of the mobile phone.

After determining that the first window has the region that overflows the touchscreen of the mobile phone, the tablet computer may determine, based on the drag data 1 and the drag data 2, a part that overflows the touchscreen of the mobile phone and that is of the first window, and display the corresponding region of the window thumbnail (the content in the region is the same as that in the region that overflows the touchscreen of the mobile phone and that is of the first window) on the display of the tablet computer.

For example, in a specific implementation, the tablet computer may generate the window thumbnail based on the screenshot of the first window in the drag data 1. The tablet computer may further determine the size of the first window based on the determined width (x2−x1) and length (y2−y1) of the first window, and may determine the size of the window thumbnail based on the size of the first window. A size of the window thumbnail may be the same as or different from a size of the first window. For example, the size of the window thumbnail is a size of the first window scaled by a ratio (the scale ratio may be adjusted based on a screen size of the target device).

The tablet computer may further determine, based on the rect information of the first window in the drag data 1 and the coordinates of the upper left corner of the first window in the drag data 2, which region of the window thumbnail is displayed on the display of the tablet computer. For example, the tablet computer may determine, based on the rect information of the first window in the drag data 1 and the coordinates of the upper left corner of the first window in the drag data 2, which of the left side, the right side, the upper side, and the lower side of the first window overflows the touchscreen of the mobile phone, and determine a ratio of the region that overflows the touchscreen of the mobile phone and that is of the first window to the first window, that is, may determine a specific region that overflows the touchscreen of the mobile phone and that is of the first window. Based on this, the tablet computer may determine which region of the window thumbnail is displayed on the display of the tablet computer. For example, when determining that the right one-third region of the first window overflows the touchscreen of the mobile phone, the tablet computer may determine to display the right one-third region of the window thumbnail on the display of the tablet computer. For another example, when determining that the upper one-fifth region of the first window overflows the touchscreen of the mobile phone, the tablet computer may determine to display the upper one-fifth region of the window thumbnail on the display of the tablet computer.

For example, still with reference to the foregoing example, a specific implementation in which the tablet computer determines the specific region that overflows the touchscreen of the mobile phone and that is of the first window may be as follows: When the tablet computer determines that x1' is less than 0, the tablet computer may determine that the left side of the first window overflows the touchscreen of the mobile phone. The tablet computer may further determine the ratio of the region that overflows the touchscreen of the mobile phone and that is of the first window to the first window, for example, specifically |x1'|/(x2−x1). When the tablet computer determines that y1' is less than 0, the tablet computer may determine that the upper side of the first window overflows the touchscreen of the mobile phone. The tablet computer may further determine the ratio of the region that overflows the touchscreen of the mobile phone and that is of the first window to the first window, for example, specifically |y1'|/(y2−y1). When the tablet computer determines that the sum of x1' and the width (x2−x1) of the first window is greater than the coordinate x3 of the right edge of the touchscreen of the mobile phone, the tablet computer may determine that the right side of the first window overflows the touchscreen of the mobile phone. The tablet computer may further determine the ratio of the region that overflows the touchscreen of the mobile phone and that is of the first window to the first window, for example, specifically 1−(x3−x1')/(x2−x1). When the tablet computer determines that the sum of y1' and the length (y2−y1) of the first window is greater than the coordinate y3 of the lower edge of the touchscreen of the mobile phone, the tablet computer may determine that the lower side of the first window overflows the touchscreen of the mobile phone. The tablet computer may further determine the ratio of the region that overflows the touchscreen of the mobile phone and that is of the first window to the first window, for example, specifically 1−(y3−y1')/(y2−y1).

In addition, in S405, a location (for example, referred to as a drag-in location) at which the partial region of the window thumbnail is displayed and that is of the tablet computer may correspond to a location (for example, a drag-out location for short) at which the first window is dragged out of the touchscreen of the mobile phone.

That the drag-in location corresponds to the drag-out location may include: An edge through which the window is dragged out of the source device corresponds to an edge through which the window is dragged to the target device. For example, if the drag-out location is on the left edge of the touchscreen of the mobile phone, the drag-in location is on the right edge of the display of the tablet computer. If the drag-out location is on the right edge of the touchscreen of the mobile phone, the drag-in location is on the left edge of the display of the tablet computer. If the drag-out location is on the upper edge of the touchscreen of the mobile phone, the drag-in location is on the lower edge of the display of the tablet computer. If the drag-out location is on the lower edge of the touchscreen of the mobile phone, the drag-in location is on the upper edge of the display of the tablet computer. In a specific implementation, the tablet computer may determine the drag-in location based on the drag direction of the first window on the touchscreen of the mobile phone. For example, if the drag direction is rightward, the drag-out location is on the right edge of the touchscreen of the mobile phone. Therefore, the tablet computer may determine that the drag-in location is on the left edge of the display of the tablet computer, to give the user a visual effect of dragging the window in from the left edge of the tablet computer. If the drag direction is leftward, the drag-out location is on the left edge of the touchscreen of the mobile phone. Therefore, the tablet computer may determine that the drag-in location is on the right edge of the display of the tablet computer, to give the user a visual effect of dragging the window in from the right edge of the tablet computer. If the drag direction is upward, the drag-out location is on the upper edge of the touchscreen of the mobile phone. Therefore, the tablet computer may determine that the drag-in location is on the lower edge of the display of the tablet computer, to give the user a visual effect of dragging the window in from the lower edge of the tablet computer. If the drag direction is downward, the drag-out location is on the lower edge of the touchscreen of the mobile phone. Therefore, the tablet computer may determine that the drag-in location is on the upper edge of the display of the tablet computer, to give the user a visual effect of dragging the window in from the upper edge of the tablet computer.

In an example, the tablet computer may determine the drag direction of the first window on the touchscreen of the mobile phone based on the drag data 2 received in real time. As described above, in the process in which the user drags the first window, the mobile phone obtains the drag data 2 in real time and sends the drag data 2 to the tablet computer in real time. The tablet computer may determine the drag direction of the first window on the touchscreen of the mobile phone based on a change of the coordinates of the upper left corner of the first window in the drag data 2 received in real time. For example, the coordinates of the upper left corner of the first window in the drag data 2 received by the tablet computer at a first moment are (x1_1', y1_1'), and the coordinates of the upper left corner of the first window in the drag data 2 received by the tablet computer at a second moment (where the second moment is later than the first moment) are (x1_2', y1_2'). If x1_2' is greater than x1_1' and y1_1' is equal to y1_2', the tablet computer may determine that the drag direction of the first window on the touchscreen of the mobile phone is rightward. If x1_2' is less than x1_1' and y1_1' is equal to y1_2', the tablet computer may determine that the drag direction of the first window on the touchscreen of the mobile phone is leftward. If x1_2' is equal to x1_1' and y1_1' is less than y1_2', the tablet computer may determine that the drag direction of the first window on the touchscreen of the mobile phone is downward. If x1_2' is equal to x1_1' and y1_1' is greater than y1_2', the tablet computer may determine that the drag direction of the first window on the touchscreen of the mobile phone is upward.

That the drag-in location corresponds to the drag-out location may further include: A specific location of the window on an edge of the source device corresponds to a specific location of the window on an edge of the target device. For example, if the drag-out location is a center location of an edge (for example, the right edge) of the touchscreen of the mobile phone, the drag-in location is also a center location of a corresponding edge (for example, the left edge) of the tablet computer. In a specific implementation, the tablet computer may determine a specific drag-in location on the corresponding edge of the tablet computer based on the coordinates of the upper left corner of the first window in the drag data 2. For example, with reference to FIG. 6C, the coordinates of the upper left corner of the first window are (x1', y1'). The tablet computer may determine, based on the coordinate y1' of the upper left corner of the first window on the Y axis of the display coordinate system of the mobile phone and the resolution of the mobile phone, a ratio of a distance between the top edge of the first window and the upper edge of the touchscreen of the mobile phone to the height of the mobile phone. For example, the determined ratio is one-fifth. The tablet computer may determine, based on the ratio and resolution of the tablet computer, a location that is at a distance from the upper edge of the tablet computer and that is of the top edge of the window thumbnail (for example, a product of the ratio and the height of the tablet computer is used as a coordinate of the top edge of the window thumbnail on a Y axis of a display coordinate system of the tablet computer), to achieve an effect that the specific location of the window on the edge of the source device corresponds to the specific location of the window on the edge of the target device.

Figure 8B:
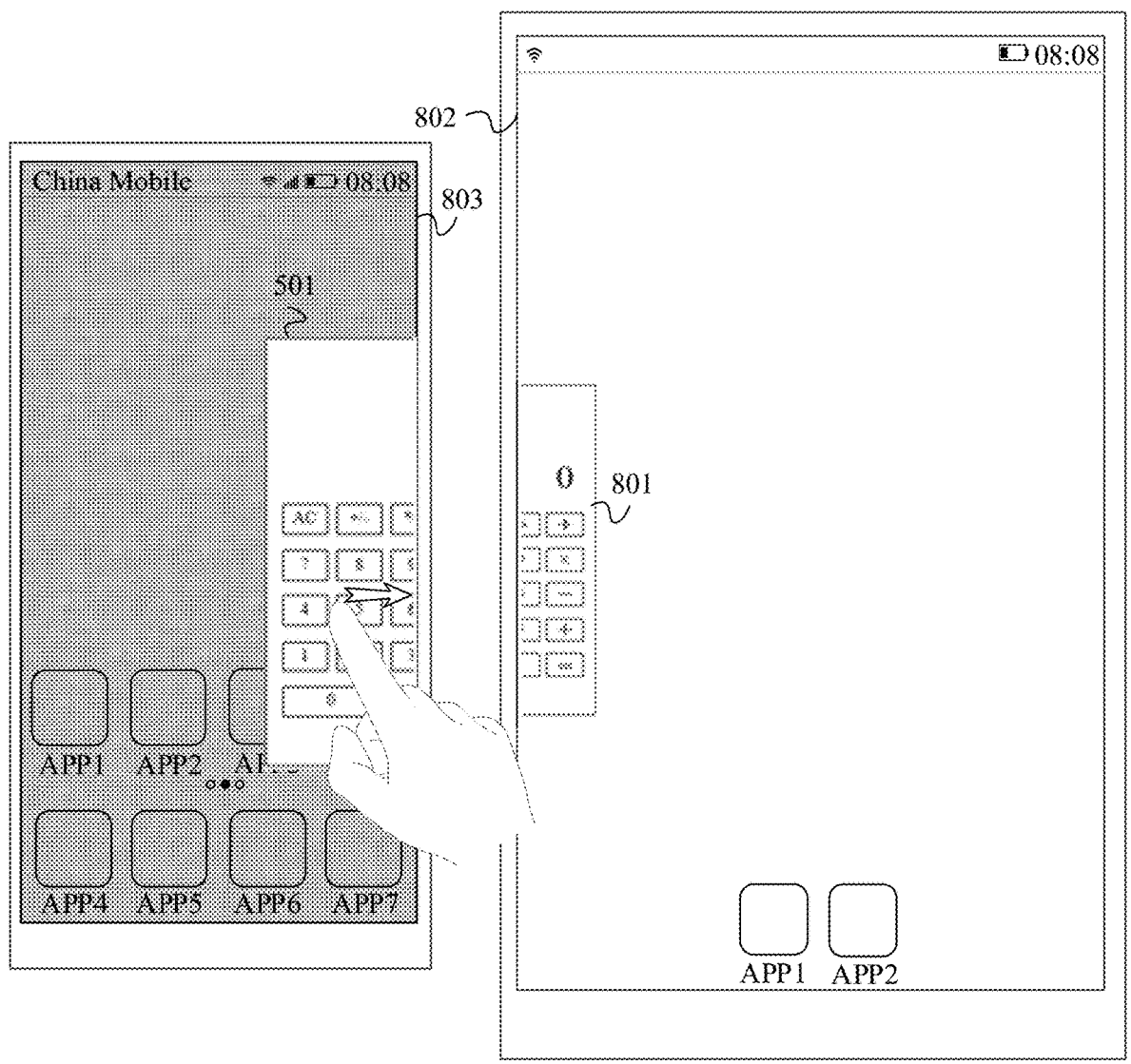
FIG. 8B is a schematic diagram of still another cross-device object drag interface according to an embodiment of this application.

For example, with reference to FIG. 3, FIG. 5A(a) to FIG. 5A(c), and FIG. 6C, the drag data 1 includes a screenshot of the calculator window and rect information of the calculator window (namely, the coordinate information of the upper left corner, the upper right corner, the lower left corner, and the lower right corner of the first window when drag starts), and the drag data 2 includes the coordinate information of the upper left corner of the first window in the drag process. After the mobile phone sends the drag data 1 and the drag data 2 to the tablet computer, a drag service module at an application layer of the tablet computer may receive the drag data 1 and the drag data 2. Then, the drag service module at the application layer of the tablet computer may send the drag data 1 and the drag data 2 to a framework layer of the tablet computer, and the framework layer draws and displays the partial region of the window thumbnail on the display of the tablet computer based on the drag data 1 and the drag data 2. For example, as shown in FIG. 8B, the window thumbnail displayed by the tablet computer is shown in 801. It can be seen that content in the window thumbnail 801 is the same as content in a part that overflows the mobile phone and that is of the calculator window 501, or the window thumbnail 801 and a part that is displayed on the mobile phone and that is of the calculator window 501 can present complete content in the computer window 501. In addition, the calculator window 501 is dragged rightward, and a drag-in location of the window thumbnail 801 is on the left edge 802 of the display of the tablet computer. In addition, a drag-out location is a center location of the right edge 803 of the touchscreen of the mobile phone, and the drag-in location also is specifically a center location of the left edge 802. In this way, a visual effect provided for the user is that the calculator window 501 is dragged from the mobile phone to a target device end for cross-device drag, namely, the tablet computer.

It may be understood that, as the first window continues to be dragged on the mobile phone, the mobile phone may dynamically adjust, based on the user operation, a size of the region that is displayed on the touchscreen of the mobile phone and that is of the first window. In addition, the mobile phone also obtains the drag data 2 in real time and sends the drag data 2 to the tablet computer in real time. The tablet computer may also dynamically adjust, based on the received drag data 2, a size of the region that is displayed on the display of the tablet computer and that is of the window thumbnail.

In other words, in the process in which the user drags the first window on the touchscreen of the mobile phone, as the finger (or the stylus) of the user moves, the region that is displayed on the touchscreen of the mobile phone and that is of the first window changes, and the region that overflows the touchscreen of the mobile phone and that is of the first window also changes. In this embodiment, to reflect touch sensitivity, as the finger (or the stylus) of the user moves, the source device (for example, the mobile phone) and the target device (for example, the tablet computer) may dynamically adjust, based on movement of the finger (or the stylus), sizes of display parts that display content and that are of the source device and the target device.

Figure 9A:
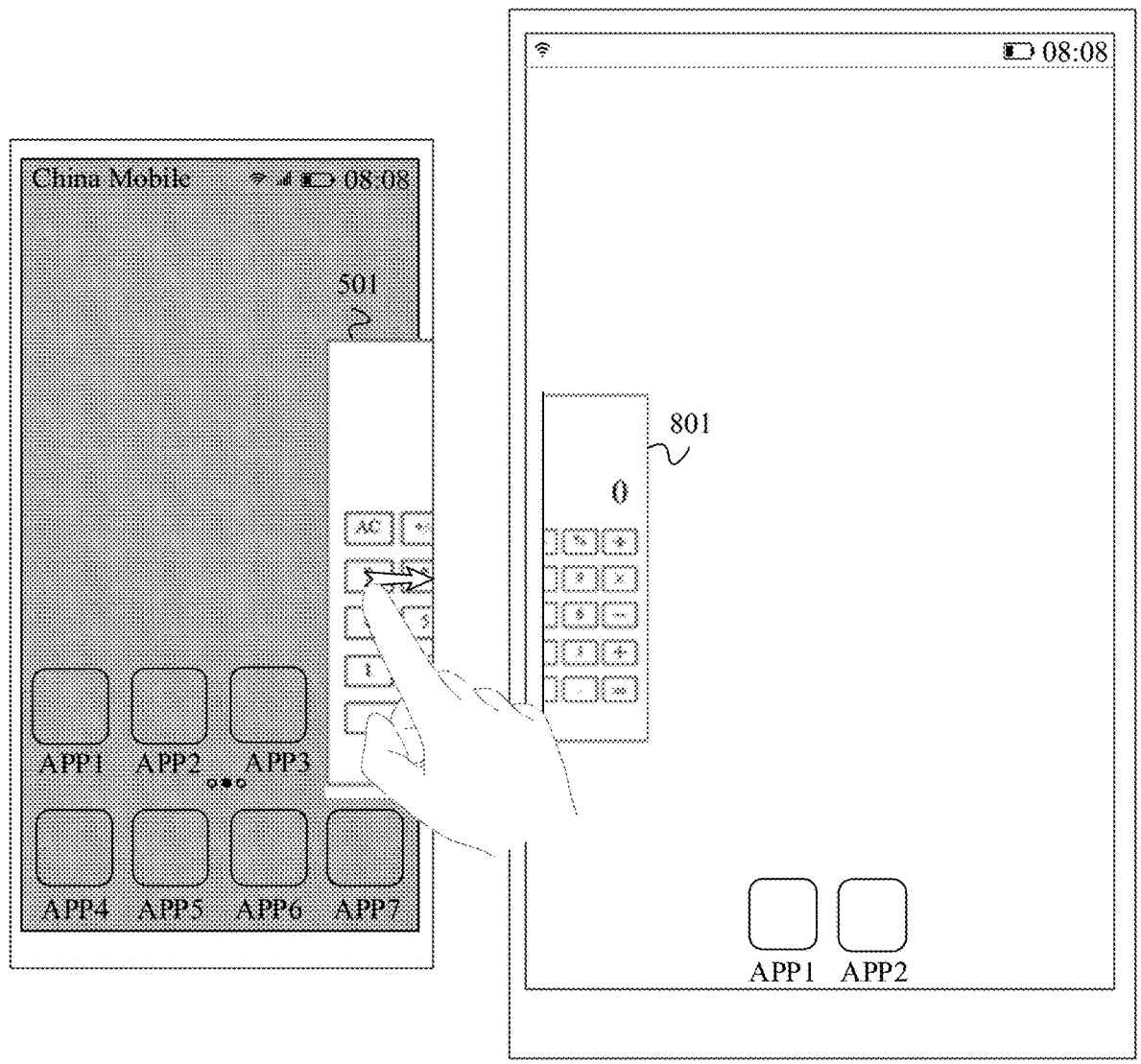
FIG. 9(a) and FIG. 9(b) are a schematic diagram of still another cross-device object drag interface according to an embodiment of this application.
Figure 9B:
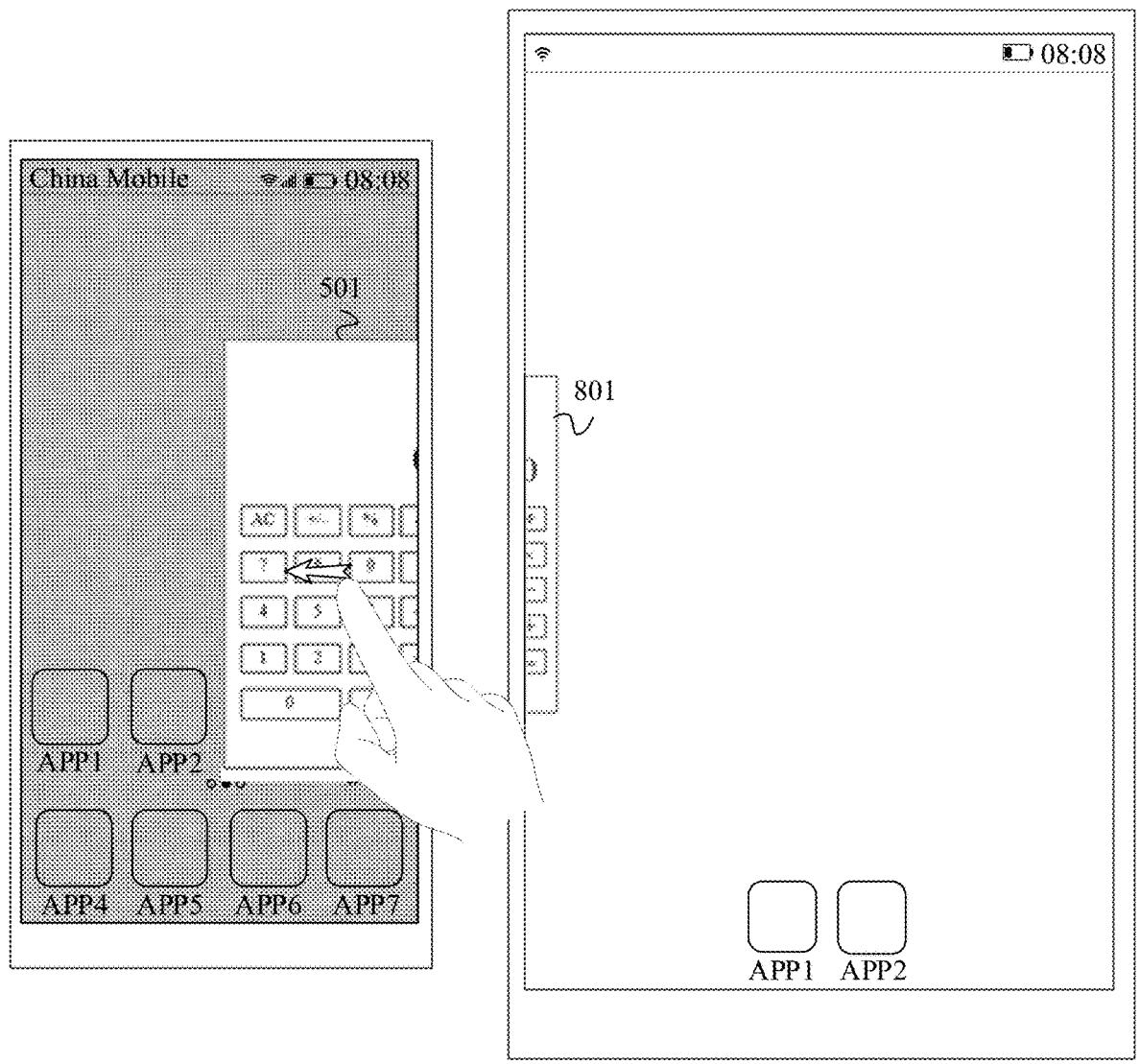

Specifically, the mobile phone may dynamically adjust, based on movement of the finger of the user, the size of the region that is displayed on the touchscreen of the mobile phone and that is of the first window. The tablet computer may dynamically adjust, based on a change of the part that is of overflows the touchscreen of the mobile phone and that is of the first window, the size of the region that is displayed on the display of the tablet computer and that is of the window thumbnail. For example, if the finger (or the stylus) of the user continues to move in a direction the same as that in S401, the region that is displayed on the touchscreen of the mobile phone and that is of the first window decreases, and the part that overflows the touchscreen and that is of the first window increases. Accordingly, the region that is displayed on the tablet computer and that is of the window thumbnail increases. If the finger (or the stylus) of the user moves in a direction opposite to that in S401, the region that is displayed on the touchscreen of the mobile phone and that is of the first window increases, and the part that overflows the touchscreen and that is of the first window decreases. Accordingly, the region that is displayed on the tablet computer and that is of the window thumbnail decreases. For example, with reference to FIG. 8B, as shown in FIG. 9(*a*), when the finger of the user continues to move rightward, the calculator window 501 moves rightward, a region displayed on the touchscreen of the mobile phone decreases, and the calculator window 501 continues to move rightward to overflow the touchscreen of the mobile phone. Correspondingly, a region that is displayed on the tablet computer and that is of the window thumbnail 801 increases. To be specific, a region that newly overflows the touchscreen of the mobile phone is displayed on the tablet computer. As shown in FIG. 9(*b*), when the finger of the user moves leftward, the calculator window 501 moves leftward, a region displayed on the touchscreen of the mobile phone increases, and a region that overflows the touchscreen of the mobile phone and that is of the calculator window 501 decreases. Correspondingly, a region that is displayed on the tablet computer and that is of the window thumbnail 801 decreases.

In a specific implementation, in the process in which the user drags the first window, the mobile phone used as the source device may obtain the drag data 2 in real time and send, in real time, the drag data 2 to the tablet computer used as the target device. The drag data 2 includes the coordinate information of the upper left corner of the first window. The tablet computer may obtain, in real time based on the coordinate information of the upper left corner of the first window in the drag data 2 received in real time, the part that overflows the touchscreen of the mobile phone and that is of the first window, to dynamically adjust, in real time based on the part, the size of the region that is displayed on the display of the tablet computer and that is of the window thumbnail. A specific implementation of obtaining the part that overflows the touchscreen of the mobile phone and that is of the first window is similar to a specific implementation of corresponding content in S405. Details are not described herein again.

It should be noted that, in the foregoing embodiment, an example in which the target device for cross-device drag determines the ratio of the region that overflows the touchscreen of the mobile phone and that is of the first window to the first window is used for description. In some other embodiments, the source device for cross-device drag may alternatively determine the ratio of the region that overflows the touchscreen of the mobile phone and that is of the first window to the first window, and may send the determined ratio to the target device. For example, when determining that the first window has the region that overflows the touchscreen of the mobile phone, the source device sends, to the target device, the drag data 2 carrying the ratio. In this way, the target device may determine, based on the received ratio and a determined specific side that overflows the touchscreen of the mobile phone and that is of the first window, a specific region in which the window thumbnail needs to be displayed on the display of the tablet computer. A specific implementation in which the source device determines the foregoing ratio is similar to a specific implementation in which the tablet computer determines the ratio. Details are not described herein again.

S406: The mobile phone receives a drag release user operation.

S407: In response to the user operation in S406, the mobile phone projects an application interface corresponding to the first window onto the tablet computer for display.

The drag release user operation may be an operation of stopping moving the finger (or the stylus) and uplifting the finger (or the stylus) by the user. After cross-device drag is triggered, for example, the first window is dragged to the drag sensing region, if the user wants to display the dragged first window on the tablet computer used as the target device, the user may stop moving the finger (or the stylus) and uplift the finger (or the stylus). In response to the user operation, the tablet computer may display the application interface corresponding to the first window. For example, the mobile phone may project the application interface corresponding to the first window onto the tablet computer for display. In an example, the application interface displayed by the tablet computer may be displayed on an edge or in the middle of the screen of the tablet computer in a window hovering manner. The application interface may be alternatively displayed in full screen. This is not specifically limited in this embodiment.

It should be noted that, in some embodiments, after cross-device drag is triggered, the mobile phone may perform S407 after receiving the drag release user operation. In some other embodiments, after cross-device drag is triggered, after receiving the drag release user operation, the mobile phone may first determine whether the size of the region that is displayed on the touchscreen of the mobile phone and that is of the first window is less than a preset threshold (or determine whether a size of the region that overflows the touchscreen of the mobile phone and that is of the first window is greater than a preset threshold, for example, the preset threshold is 50%). When it is determined that the size of the region that is displayed on the touchscreen of the mobile phone and that is of the first window is less than the preset threshold (or it is determined that the size of the region that overflows the touchscreen of the mobile phone and that is of the first window is greater than the preset threshold), S407 is performed. If it is determined that the size of the region that is displayed on the touchscreen of the mobile phone and that is of the first window is greater than the preset threshold (or it is determined that the size of the region that overflows the touchscreen of the mobile phone and that is of the first window is less than the preset threshold), the application interface may not be projected for display. To be specific, the application interface corresponding to the first window is not projected onto the tablet computer for display. For example, the mobile phone may normally display the application interface of the first window on the touchscreen of the mobile phone. The mobile phone may further send indication information to the tablet computer, and the indication information indicates that drag stops, so that the tablet computer normally displays an interface of the tablet computer. Alternatively, if it is determined that the size of the region that is displayed on the touchscreen of the mobile phone and that is of the first window is greater than the preset threshold (or it is determined that the size of the region that overflows the touchscreen of the mobile phone and that is of the first window is less than the preset threshold), the dragged first window is hovered, adsorbed, and displayed on the mobile phone and the tablet computer. For example, a display effect may be shown in FIG. 8B. To be specific, a part of the dragged first window is displayed on the mobile phone, and a part of the dragged first window is displayed on the tablet computer. It should be noted that, after the drag release user operation is received, when it is determined that the size of the region that is displayed on the touchscreen of the mobile phone and that is of the first window is greater than the preset threshold (or it is determined that the size of the region that overflows the touchscreen of the mobile phone and that is of the first window is less than the preset threshold), whether to perform an operation of hovering, adsorbing, and displaying the first window on the mobile phone and the tablet computer, or not to perform projection for display may be pre-configured.

Figure 10:
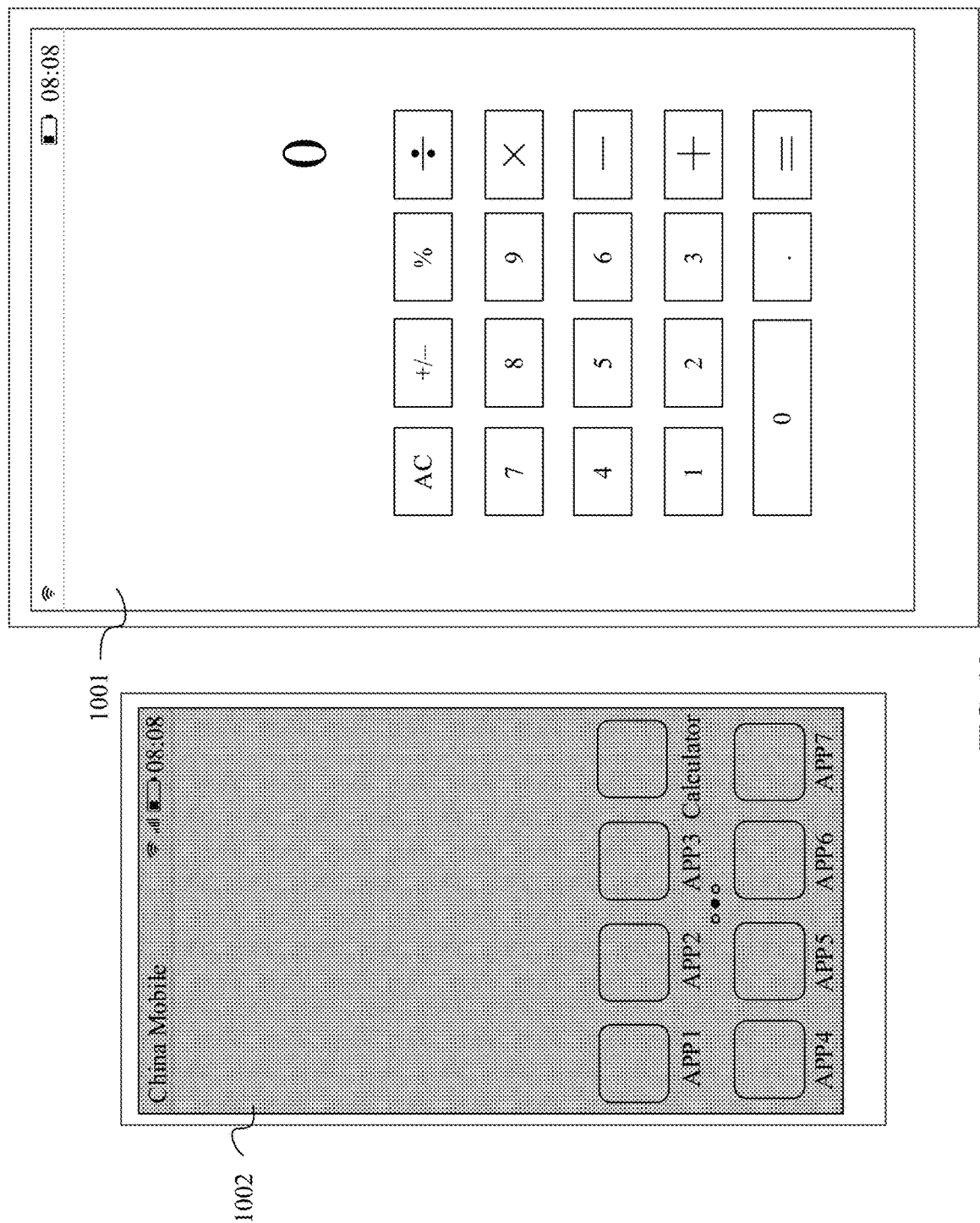
FIG. 10 is a schematic diagram of still another cross-device object drag interface according to an embodiment of this application.

For example, with reference to FIG. 3 and the examples shown in FIG. 5A(a) to FIG. 5A(c), FIG. 8B, and FIG. 9(*a*) and FIG. 9(*b*), after cross-device drag is triggered, for example, the calculator window is dragged to the drag sensing region and continues to be dragged, the user stops moving the finger and uplifts the finger. Correspondingly, the mobile phone may receive the drag release user operation. In response to the operation, a projection service module of the mobile phone may start a projection process. In response to the start of the projection process, the drag service module of the mobile phone may obtain corresponding data by using a display manager of the mobile phone (for example, the display manager is a module at the framework layer of the mobile phone), and send the corresponding data to the tablet computer. The tablet computer may display, on the tablet computer based on the received data, the application interface corresponding to the first window. For example, in response to the start of the projection process, the drag service module of the mobile phone may obtain the corresponding data, for example, screen recording data, by using the display manager of the mobile phone, and send the corresponding data to the tablet computer, that is, project the application interface corresponding to the first window onto the tablet computer for display. In some embodiments, a distributed multimedia protocol (Distributed Multi-media Protocol, DMP) may be used to project the application interface corresponding to the first window onto the tablet computer for display. For example, after the projection process is started, the drag service module of the mobile phone may create a virtual display (VirtualDisplay) by using the display manager (DisplayManager) of the mobile phone. For example, the drag service module of the mobile phone sends, to the display manager of the mobile phone, a request for creating the VirtualDisplay. After completing creating the VirtualDisplay, the display manager of the mobile phone may return the created VirtualDisplay to the drag service module of the mobile phone. Then, the drag service module of the mobile phone may draw the application interface corresponding to the first window, and move the application interface to the VirtualDisplay. In addition, the VirtualDisplay may be further bound to the projection service module of the mobile phone for screen recording. In this way, the drag service module of the mobile phone can obtain the screen recording data. After obtaining the screen recording data, the drag service module of the mobile phone may encode the screen recording data, and then send encoded screen recording data to the tablet computer. The drag service module of the tablet computer may receive the corresponding data, and obtain the screen recording data after decoding the data. The drag service module of the tablet computer sends, to a projection service module of the tablet computer, the screen recording data obtained after decoding. As shown in FIG. 10, the projection service module of the tablet computer cooperates with the framework layer of the tablet computer, to draw, based on the screen recording data, an application interface 1001 corresponding to the calculator window, and display the application interface 1001. For example, the framework layer of the tablet computer may provide a surface view to project the application interface 1001 onto the tablet computer for display. In addition, as shown in FIG. 10, after receiving the drag release user operation, the mobile phone may display a home screen 1002. In another embodiment, the mobile phone may alternatively display an application interface (not shown in the figure) of the calculator window. The calculator window may be displayed on an edge or in the middle of the screen of the mobile phone in a hovering manner, or may be displayed in full screen. This is not specifically limited in this embodiment. In some other embodiments, Miracast (Miracast) may be alternatively used to project the application interface corresponding to the first window onto the tablet computer for display. To be specific, the mobile phone may obtain all layers of the application interface, then integrate all the obtained layers into a video stream (or referred to as screen recording data), encode the video stream, and then send encoded video stream to the tablet computer by using a real time streaming protocol (real time streaming protocol, RTSP). After receiving the video stream, the tablet computer may decode the video stream and play the video stream, to project the application interface corresponding to the first window onto the tablet computer for display. Alternatively, the mobile phone may obtain an instruction stream after performing instruction extraction on the application interface corresponding to the first window, obtain layer information and the like of the application interface, and then send the instruction stream, the layer information, and the like to the tablet computer. The instruction stream, the layer information, and the like are used by the tablet computer to restore the application interface corresponding to the first window, to project the application interface corresponding to the first window onto the tablet computer for display.

In some embodiments, after the source device projects the application interface corresponding to the first window onto the target device for display, the application interface corresponding to the first window may be dragged back to the source device (or projection is exited) in the following manner.

Figure 11:
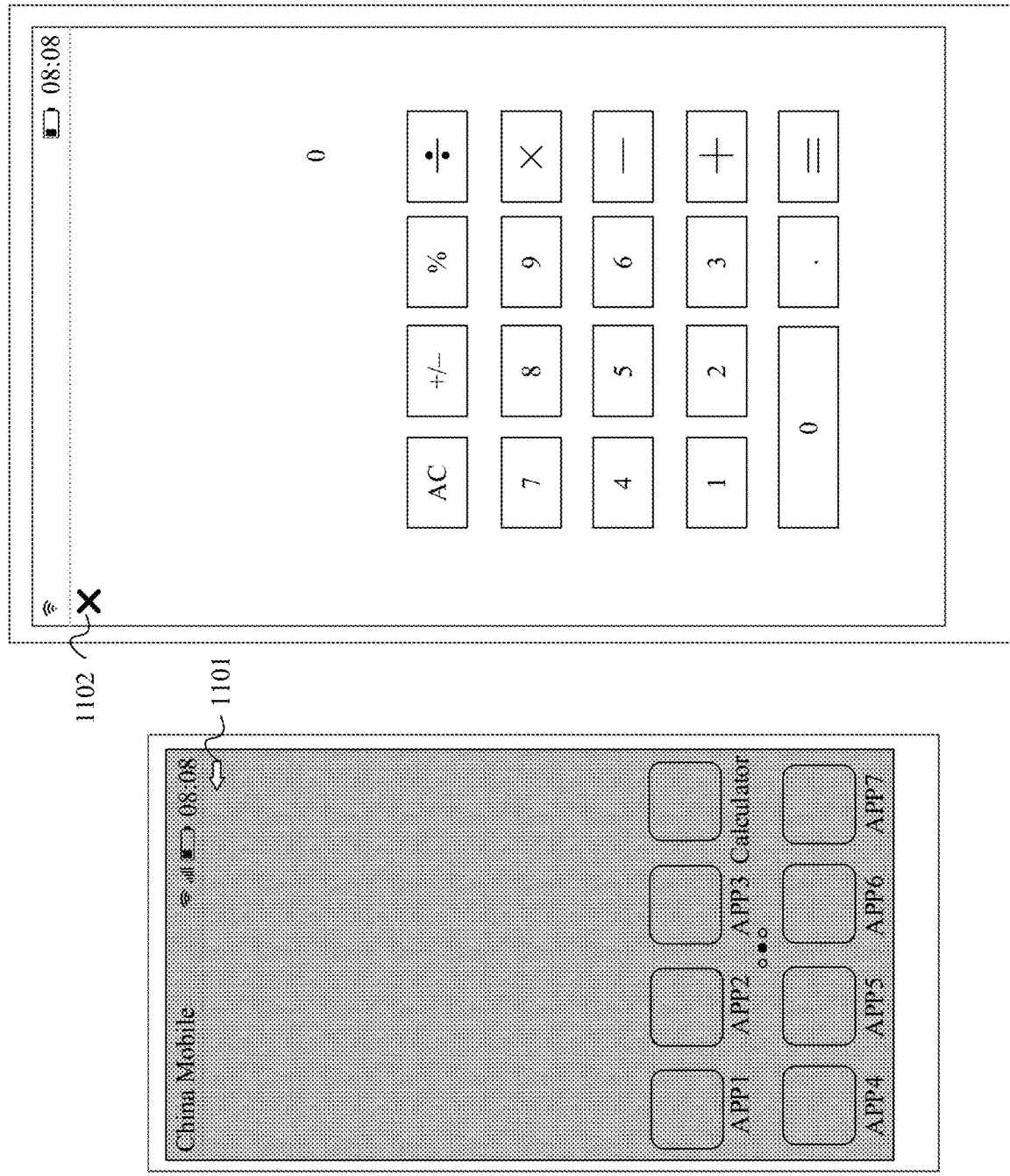
FIG. 11 is a schematic diagram of still another cross-device object drag interface according to an embodiment of this application.

Manner 1: As shown in FIG. 11, after the source device projects the application interface corresponding to the first window onto the target device for display, the application interface displayed by the target device may include a button used to drag the application interface corresponding to the first window back to the source device, for example, a button 1102. After receiving an operation of the user on the button 1102, the target device may exit projection, and the source device may continue to display the application interface corresponding to the first window, to give the user a visual effect of dragging the application interface from the target device back to the source device. For example, after receiving the operation of the user on the button 1102, the target device may send a projection exit request to the source device. After receiving the request, the source device stops projection, and displays the application interface of the first window on the source device.

Manner 2: The foregoing button used to drag the application interface corresponding to the first window back to the source device may be alternatively displayed on the source device. For example, still as shown in FIG. 11, after the source device projects the application interface corresponding to the first window onto the target device for display, the source device displays a button used to drag the application interface corresponding to the first window back to the source device, for example, a button 1101. After receiving an operation of the user on the button 1101, the source device may stop projection, and continue to display the application interface corresponding to the first window, to give the user a visual effect of dragging the application interface from the target device back to the source device.

It should be noted that, in a specific implementation, after the application interface corresponding to the first window is projected onto the target device for display, only one of the button 1101 and the button 1102 may be displayed, or both the button 1101 and the button 1102 may be displayed. This is not specifically limited in this embodiment.

Manner 3: After receiving an operation of disconnecting from the target device by the user on a status bar or a shortcut toolbar, the source device may stop projection, and continue to display the application interface corresponding to the first window, to give the user a visual effect of dragging the application interface from the target device back to the source device.

It should be noted that the steps in the foregoing embodiment and the corresponding descriptions thereof are merely a possible implementation of dragging the window from the source device to the target device. Implementation of drag in this application is not limited to the foregoing descriptions.

Figure 12:
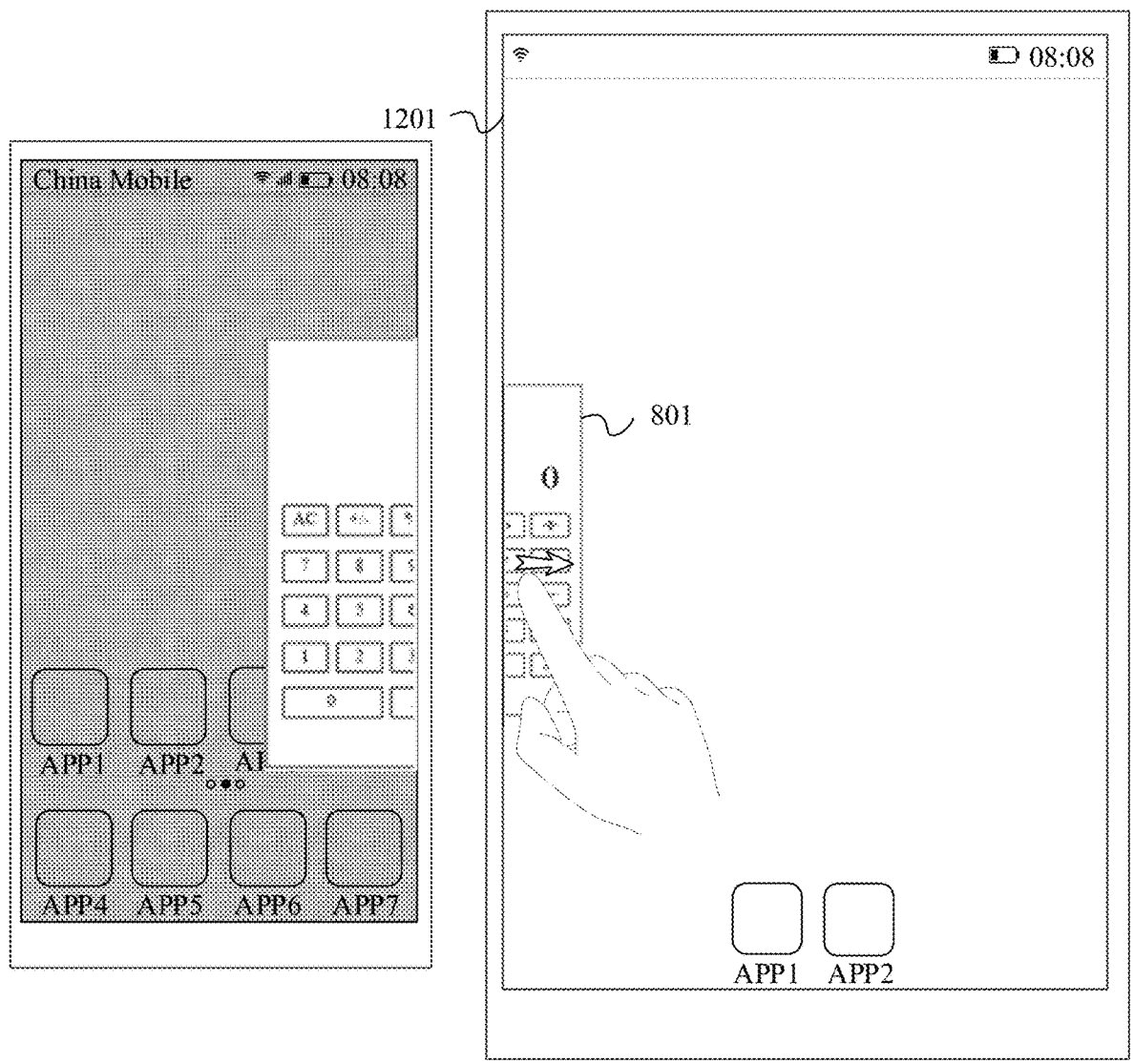
FIG. 12 is a schematic diagram of still another cross-device object drag interface according to an embodiment of this application.
Figure 13:
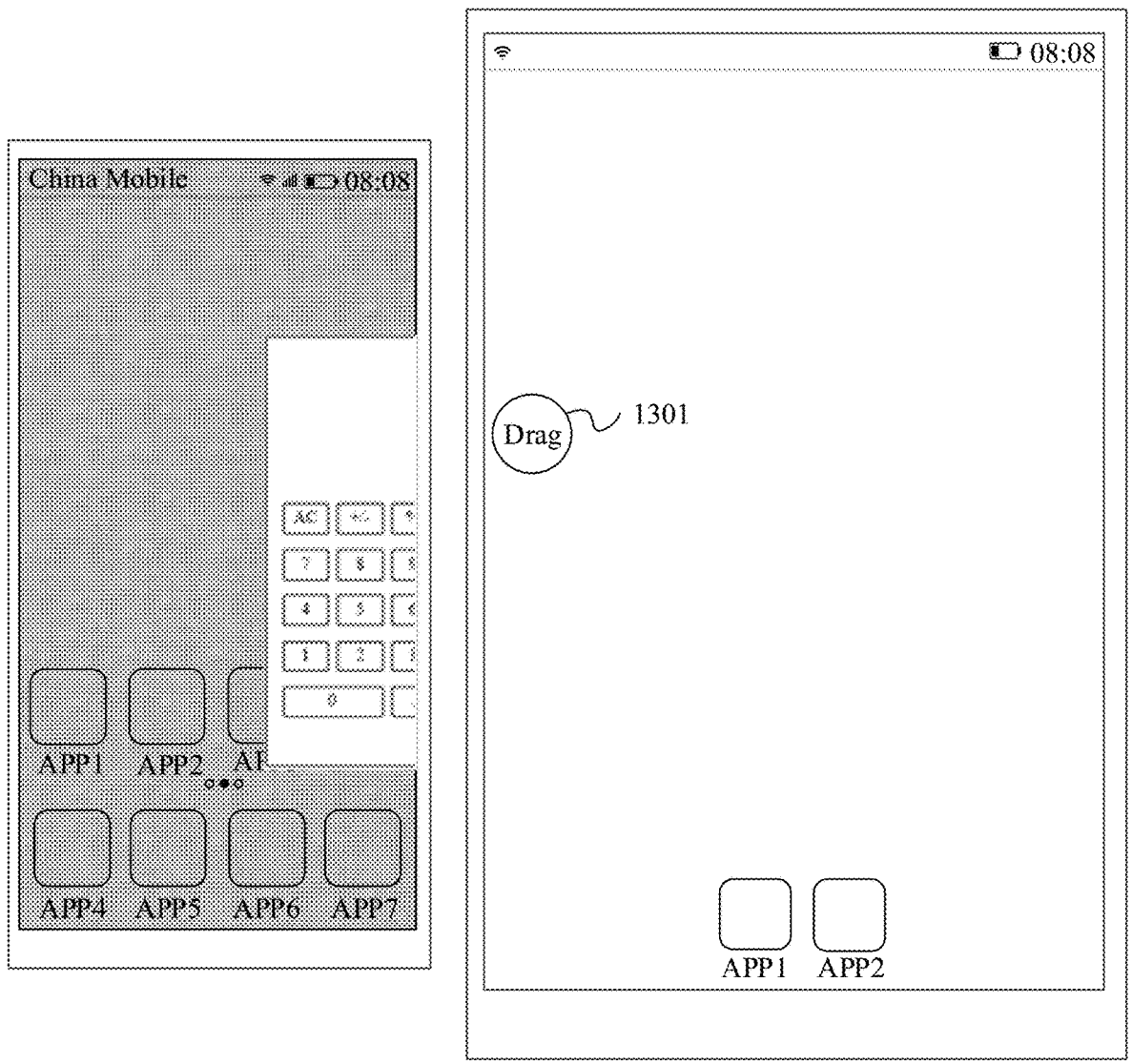
FIG. 13 is a schematic diagram of still another cross-device object drag interface according to an embodiment of this application.

For example, in the foregoing embodiment, an example in which the user drags the window out of the source device and then releases the finger to complete drag is used for description. Such drag may be considered as coherent drag. In some other embodiments, drag by the user may alternatively not be a coherent drag action. In other words, drag is a non-coherent process. For example, the window supports in being first dragged out of the source device and then being dragged in on the target device. This implementation is applicable to a scenario of two different users or a non-continuous drag task. This implementation is similar to implementation of S401 to S407 in the foregoing embodiment, and a difference lies in that, after receiving the screen recording data, the tablet computer used as the target device temporarily caches the screen recording data, that is, does not use the received screen recording data temporarily to draw and display the application interface corresponding to the first window. In this way, the display of the tablet computer displays the partial region of the window thumbnail. The user may drag, by using an input device of the tablet computer, the window thumbnail displayed on the display of the tablet computer, to implement drag in on the target device. For example, with reference to FIG. 8B, as shown in FIG. 12, the display of the tablet computer has a touch function. The user may enter a corresponding user operation (for example, a rightward slide) on a display 1201 of the tablet computer by using the finger (or the stylus), to trigger drag for the window thumbnail (for example, the window thumbnail 801) on the tablet computer. Then, the user may release drag on the tablet computer when wanting to display, on the tablet computer used as the target device, the application interface corresponding to the first window. Correspondingly, the tablet computer may receive the drag release user operation. In this case, in response to the operation, the tablet computer may draw, based on the cached screen recording data, the application interface corresponding to the first window and display the application interface on the display of the tablet computer. It should be noted that, in a process in which the user drags the window thumbnail by using the input device of the tablet computer, the tablet computer may dynamically adjust, based on the user operation, the size of the region that is displayed on the display of the tablet computer and that is of the window thumbnail, and the mobile phone may also correspondingly dynamically adjust the size of the region that is displayed on the touchscreen of the mobile phone and that is of the first window. For example, the tablet computer may send, to the mobile phone based on the user operation, drag data that includes coordinate information of the upper left corner of the window thumbnail (the drag data may be third drag data in this application), so that the mobile phone dynamically adjusts, based on the drag data, the size of the region that is displayed on the touchscreen of the mobile phone and that is of the first window. A specific implementation thereof is similar to descriptions of corresponding content in S405. Details are not described herein again. In addition, the user may alternatively choose not to perform drag on the target device. If the tablet computer receives no drag operation of the user on the window thumbnail within preset duration, as shown in FIG. 13, the tablet computer may collapse the displayed window thumbnail. Optionally, still with reference to FIG. 13, after collapsing the window thumbnail, the tablet computer may further support re-drag in, for example, display a floating ball 1301 (or a floating bar). The user may perform a corresponding operation, for example, a tap operation, on the floating ball 1301, to trigger the tablet computer to redisplay the window thumbnail (as shown in FIG. 12), so as to support the user in performing, on the tablet computer, a drag operation.

Figure 14:
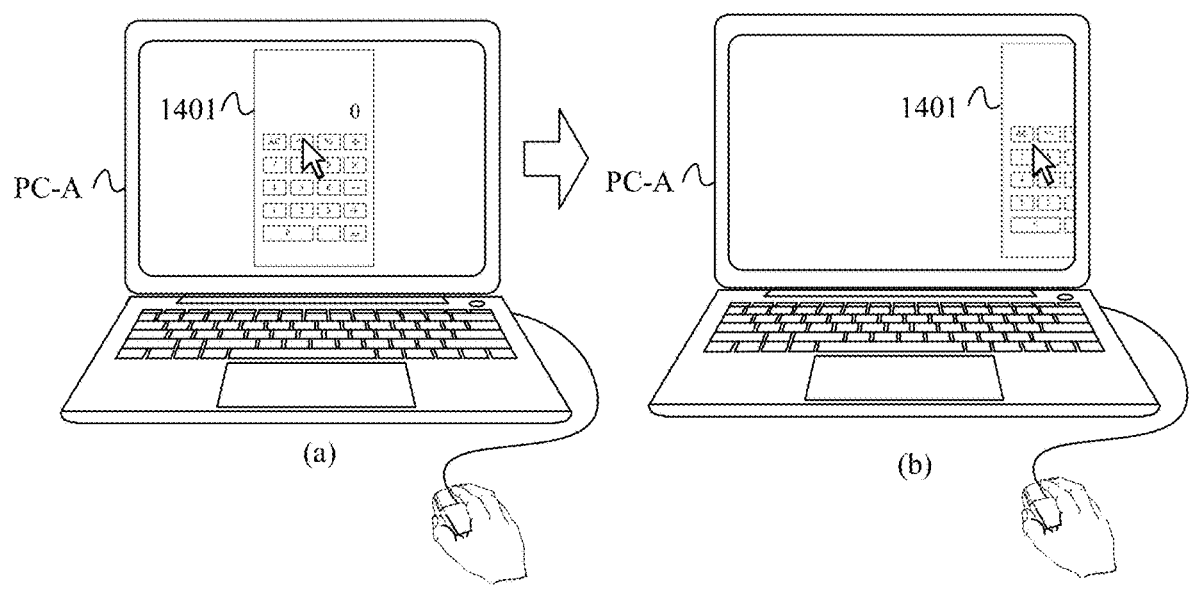
FIG. 14 is a schematic diagram of still another cross-device object drag interface according to an embodiment of this application.
Figure 15:
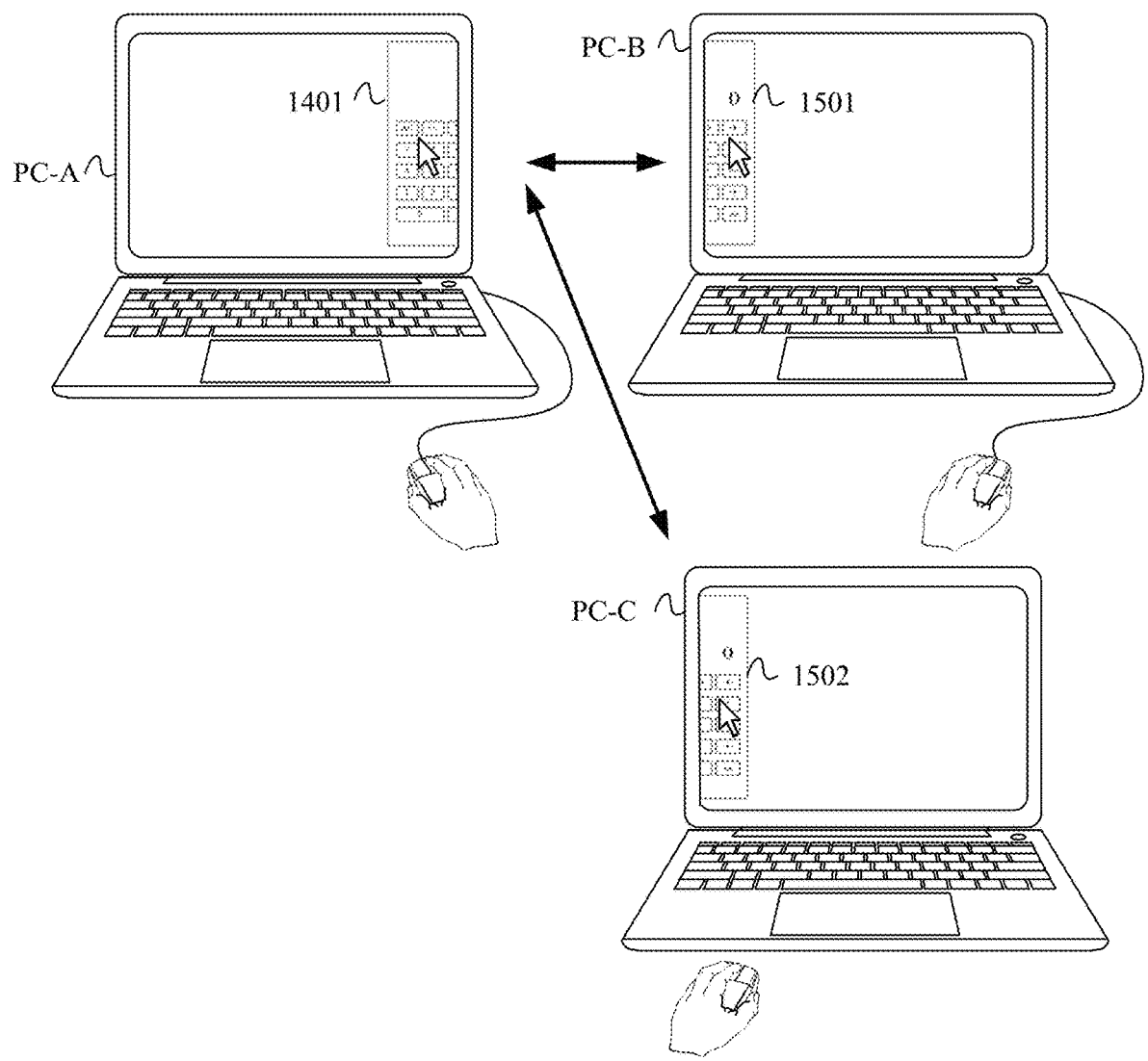
FIG. 15 is a schematic diagram of still another cross-device object drag interface according to an embodiment of this application.
Figure 16:
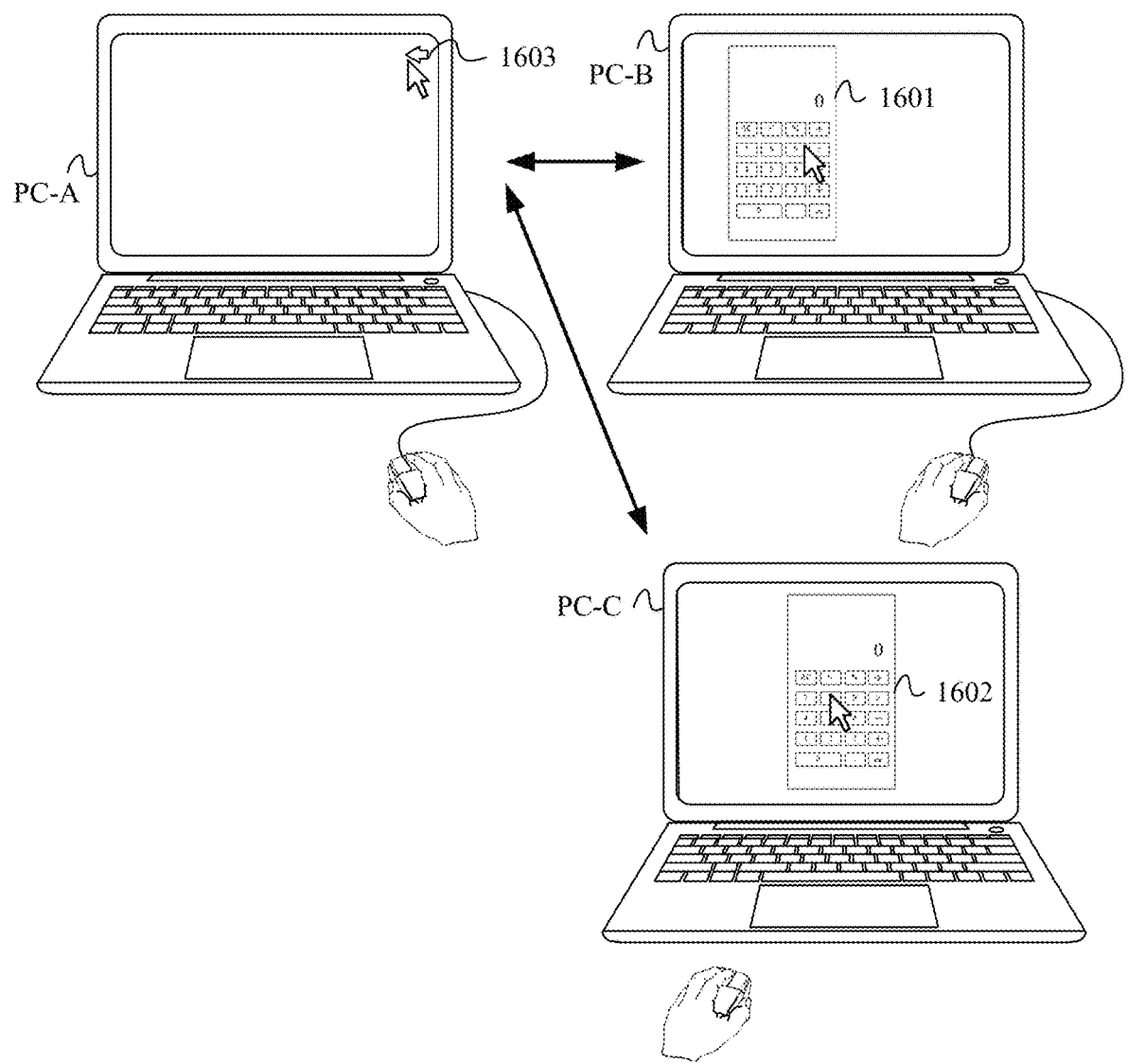
FIG. 16 is a schematic diagram of still another cross-device object drag interface according to an embodiment of this application.

For another example, in the foregoing embodiment, an example in which there is one target device is used for description. In some other embodiments, there may be alternatively a plurality of target devices. For example, if the user selects a plurality of device identifiers from the recommended device list displayed by the source device, devices corresponding to the plurality of device identifiers are all used as target devices. For another example, the source device establishes connections to a plurality of devices at the same time, and the source device automatically determines, as target devices, the plurality of devices that establish the connections to the mobile phone (where in this implementation, the source device may display no recommended device list). It should be noted that device forms of the plurality of devices used as the target devices may be the same (for example, be all tablet computers, or be all PCs), or may be different (for example, include a tablet computer and a PC, or include a tablet computer, a PC, and a television). This is not specifically limited in this embodiment. This implementation is similar to implementation of S401 to S407 in the foregoing embodiment, and a difference lies in that the source device separately sends the obtained drag data to the plurality of devices, for example, the drag data 1 and the drag data 2, so that the obtained drag data is used by the plurality of devices to respectively display window thumbnails based on the received drag data. In addition, after receiving the drag release user operation, the source device separately projects the application interface corresponding to the first window onto the plurality of devices for display. In an example, the source device is a PC, for example, referred to as a PC-A. For example, the PC-A establishes connections to two PCs (for example, respectively referred to as a PC-B and a PC-C) at the same time. With reference to FIG. 14, as shown in (a) in FIG. 14, the user initiates drag for a calculator window 1401 on the PC-A. As shown in (b) in FIG. 14, after the calculator window 1401 moves to a drag sensing region of the PC-A, the PC-A obtains the drag data 1 and sends the drag data 1 to the PC-B and the PC-C. In a process in which the user continues to drag the calculator window 1401, the PC-A obtains the drag data 2 in real time and sends the drag data 2 to the PC-B and the PC-C in real time. With reference to FIG. 14, as shown in FIG. 15, when the calculator window 1401 has a region that overflows a display of the PC-A, the PC-B and the PC-C may respectively display partial regions of window thumbnails based on the received drag data 1 and drag data 2. For example, the window thumbnail displayed by the PC-B is shown in 1501, and the window thumbnail displayed by the PC-C is shown in 1502. After the target devices display the window thumbnails, the user may continue to drag the first window out of the source device by using an input device (for example, a mouse) of the PC-A, or drag the first window to the target device by using an input device of the PC-B or the PC-C. Then, as shown in FIG. 16, if a drag release user operation is received, the application interface corresponding to the calculator window is projected onto the PC-B and the PC-C for display. For example, an application interface displayed by the PC-B is shown in 1601, and an application interface displayed by the PC-C is shown in 1602. After the application interface corresponding to the window is projected onto the plurality of target devices for display, if an application service of the application does not support multi-focus editing, the user is allowed to perform a corresponding editing operation on only one target device at a time. If an application service of the application supports multi-focus editing, the user is allowed to perform an editing operation on the plurality of target devices at the same time. In addition, after the application interface corresponding to the window is projected onto the plurality of target devices for display, the user may drag the application interfaces on the plurality of target devices back to the source device at a time by using the button that is configured to drag the application interface corresponding to the windows back to the source device and that is displayed on the source device. For example, still with reference to FIG. 16, the PC-A displays a button 1603, the user may perform an operation on the button 1603, to trigger the PC-A to stop projection, and the PC-A may further continue to display the application interface corresponding to the calculator window, to give the user the visual effect of dragging the application interface from the PC-B and the PC-C back to the PC-A.

For another example, in the foregoing embodiment, after receiving the drag release user operation, the source device projects the application interface corresponding to the first window onto the target device to display the window. In some other embodiments, the window may be alternatively displayed by starting a corresponding application on the target device. This implementation is similar to implementation of S401 to S407 in the foregoing embodiment, and a difference lies in that, after receiving the drag release user operation in S406, S407 is not performed, but the following is performed: The mobile phone may send indication information to the tablet computer, where the indication information indicates that drag for the window ends. After receiving the indication information, the tablet computer detects whether the tablet computer includes an application corresponding to an application label. The application label may include an identity (Identity, ID, for example, a package name) of the application or a name of the application. The application label may further include a class name of the application. The application label may be added to the drag data 1 by the mobile phone and sent to the tablet computer. The application corresponding to the application label may be an application the same as an application corresponding to the first window, or may be an application having a same function. If there is the application corresponding to the application label, the tablet computer starts the application and displays a corresponding application interface based on content information (where the content information is information about content that is displayed in the first window and that is sent by the mobile phone to the tablet computer). If no application corresponding to the application label exists on the tablet computer, the screen recording data may be requested from the mobile phone. To be specific, the window is displayed by projecting the application interface corresponding to the first window onto the tablet computer. In addition, if the target device displays the window in a manner of starting the corresponding application, the window service is run on the target device end. Therefore, no case in which the application interface corresponding to the first window is dragged back to the source device (or projection is exited) exits.

For another example, in the foregoing embodiment, an example in which the input device is the touchscreen is used for description. In some other embodiments, the input device may be alternatively a mouse, a touchpad, or the like. This is not limited in this embodiment. This implementation is similar to implementation of S401 to S407 in the foregoing embodiment, and a difference lies in that the input devices used by the user to enter a corresponding operation are different.

Figure 17:
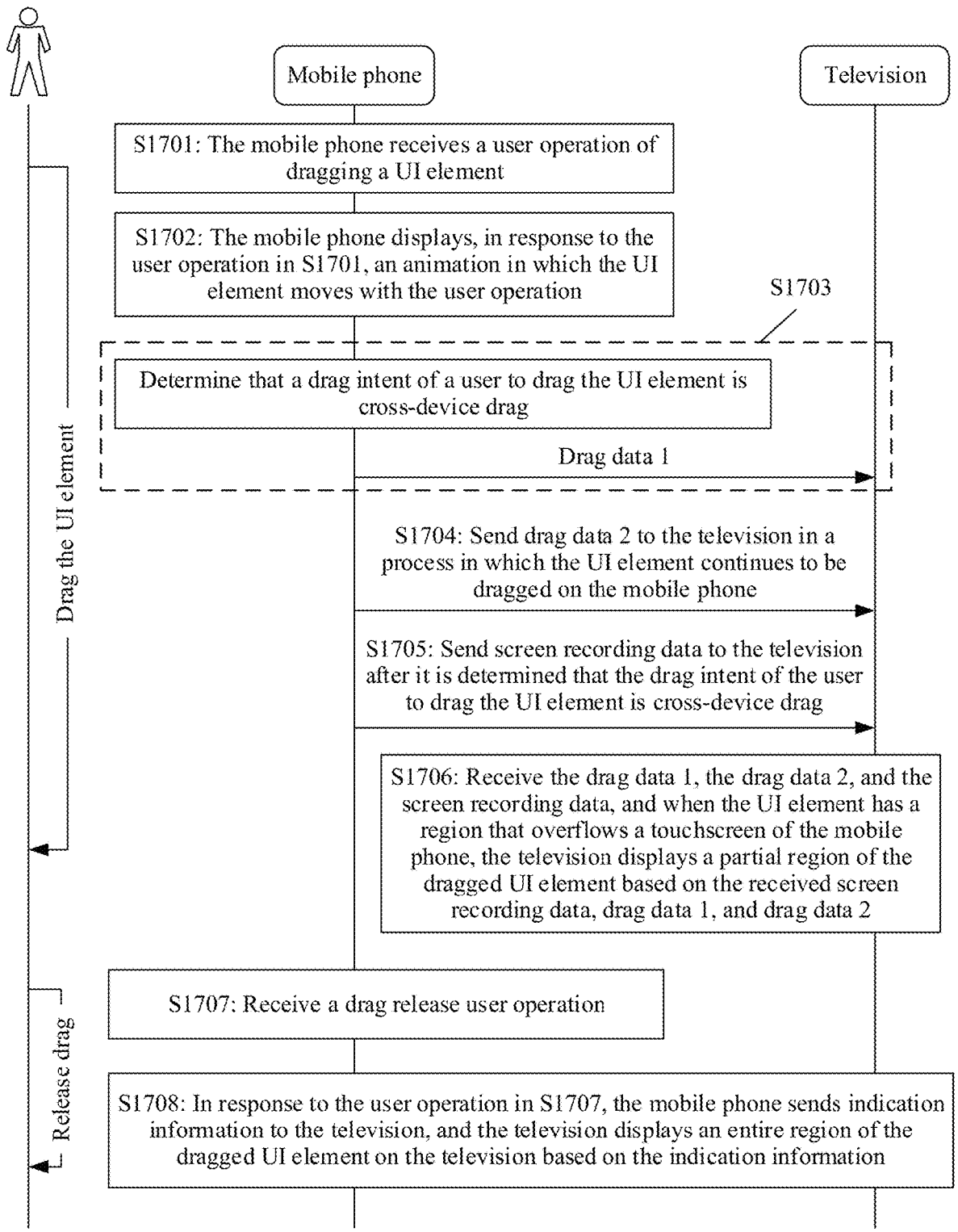
FIG. 17 is a schematic flowchart of another cross-device object drag method according to an embodiment of this application.

FIG. 17 is a schematic flowchart of a cross-device object drag method according to an embodiment of this application. In this embodiment, the method provided in this embodiment is described in detail by using an example in which the first terminal 101 is a mobile phone, the second terminal 102 is a television, the input device of the first terminal 101 is a touchscreen, and the dragged object is a UI element, for example, a video component (view), a floating window, or a picture-in-picture. For example, the mobile phone is used as the source device, and the television is used as the target device.

As shown in FIG. 17, the method may include S1701 to S1708.

S1701: The mobile phone receives a user operation of dragging the UI element.

S1702: The mobile phone displays, in response to the user operation in S1701, an animation in which the UI element moves with the user operation.

The UI element in this embodiment may be a video component (or referred to as a video element), a floating window (for example, a video chat window), a picture-in-picture, or the like. The user operation in S1701 may be the drag operation in this application.

It should be noted that descriptions of corresponding content in S1701 and S1702 are similar to descriptions of corresponding content in S401 and S402 in the embodiment shown in FIG. 4, and a difference lies in that the dragged object in S1701 and S1702 is the UI element, for example, the video component, the floating window (for example, the video chat window), or the picture-in-picture. Details are not described herein again in this embodiment.

For example, with reference to FIG. 3 and FIG. 18(*a*) to FIG. 18(*c*), the dragged object is the video component and the user operation in S1701 includes a touch and hold operation for the video component and an operation of pressing and moving the dragged video component. As shown in FIG. 18(*a*), an interface of a video application is displayed on the touchscreen of the mobile phone, and the interface includes a video component 1801. A video (for example, a video X) is being played on the video component 1801. When wanting to drag the video component 1801, a user may perform a touch and hold operation on the video component 1801. As shown in FIG. 18(*b*), in response to the operation, the mobile phone may trigger drag for the video component 1801. For example, a window management module of the mobile phone may scale the video component 1801 down, may further perform background blurring processing, and send a scaled-down video component 1801 to a launcher at an application layer of the mobile phone to display the scaled-down video component 1801. In addition, on the interface of the video application, the original video component may continue to be displayed to play the video (as shown in FIG. 18(*a*) to FIG. 18(*c*), that is, a dragged video component 1801 is a window copied by the mobile phone), or may not be displayed (not shown in the figure, that is, a dragged video component 1801 is the original video component).

Then, the user presses the video component 1801 and moves a finger, so that the video component 1801 moves on the touchscreen of the mobile phone as the finger of the user moves, to give the user a visual effect of dragging the video component 1801 by the finger of the user. In this embodiment, a drag direction of the video component 1801 may be upward, leftward, rightward, or downward. For example, as shown in FIG. 18(c), the user may perform a press operation on the dragged video component 1801 with the finger, and perform an operation of moving the finger rightward. As the finger of the user moves, the mobile phone, for example, a framework layer of the mobile phone, may draw an animation in which the video component 1801 moves with the finger of the user, and send the animation to the application layer (for example, the launcher at the application layer) of the mobile phone to display, on the touchscreen of the mobile phone, the animation in which the video component 1801 moves with the finger of the user.

It should be noted that, for these UI elements such as the video component, the floating window, and the picture-in-picture, the UI element may be in a dragged state on the touchscreen of the mobile phone. The user only needs to directly press the UI element and move the finger, to drag the UI element on the touchscreen of the mobile phone. Therefore, in some embodiments, the user operation in S1701 may include no operation of triggering drag for the UI element, but include only an operation of triggering movement of the UI element.

S1703: The mobile phone sends drag data 1 to the television when determining that a drag intent of the user to drag the UI element is cross-device drag.

The drag data 1 may be first drag data in this application. For example, the drag data 1 may include rect information of the UI element, and a layer name (layer Name) of the UI element on a current display interface. The drag data 1 may further include a type (for example, a video component, a picture-in-picture, or a floating window) of the dragged object and/or an indication indicating that the drag data 1 is related data in a drag start event.

S1704: Send drag data 2 to the television in a process in which the UI element continues to be dragged on the mobile phone.

The drag data 2 may be second drag data in this application. For example, the drag data 2 may include coordinate information of a first corner of the UI element. The first corner may be any one of the upper left corner, the lower left corner, the upper right corner, and the lower right corner of the UI element. In some other embodiments, the drag data 2 may alternatively include coordinate information of a plurality of corners of the upper left corner, the lower left corner, the upper right corner, and the lower right corner of the UI element. In the following embodiment, an example in which the drag data 2 includes the coordinate information of the first corner of the UI element and the first corner is the upper left corner is used for description.

The drag data 2 may further include an indication indicating that the drag data 2 is related data in a drag movement event.

S1705: Send screen recording data to the television after it is determined that the drag intent of the user to drag the UI element is cross-device drag.

In this embodiment, content in the dragged object changes in real time. Therefore, after determining that the drag intent of the user to drag the UI element is cross-device drag, the mobile phone used as the source device needs to obtain the screen recording data in real time and send, in real time, the screen recording data to the television used as the target device.

S1706: The television receives the drag data 1, the drag data 2, and the screen recording data. When the UI element has a region that overflows the touchscreen of the mobile phone, the television displays a partial region of the dragged UI element based on the received screen recording data, drag data 1, and drag data 2.

It should be noted that, in S1703 to S1706 in this embodiment, specific descriptions of determining whether the drag intent is cross-device drag, determining the drag direction, determining the target device, and displaying the partial region of the dragged UI element by the target device based on the drag data 1 and the drag data 2 are similar to descriptions of corresponding content in S403 to S405 in the embodiment shown in FIG. 4. Details are not described herein again. A difference lies in that in this embodiment, the mobile phone further needs to send the screen recording data to the target device in real time after determining that the drag intent of the user to drag the UI element is cross-device drag. In this embodiment, the screen recording data includes video data and audio data. The video data is used by the target device to display the corresponding UI element on a display of the target device. The audio data is used by the target device to play a corresponding sound. In addition, the drag data 1 further needs to include the layer name of the dragged UI element on the current display interface, so that the target device filters out the UI element from the received screen recording data and displays the UI element.

Figure 18A:
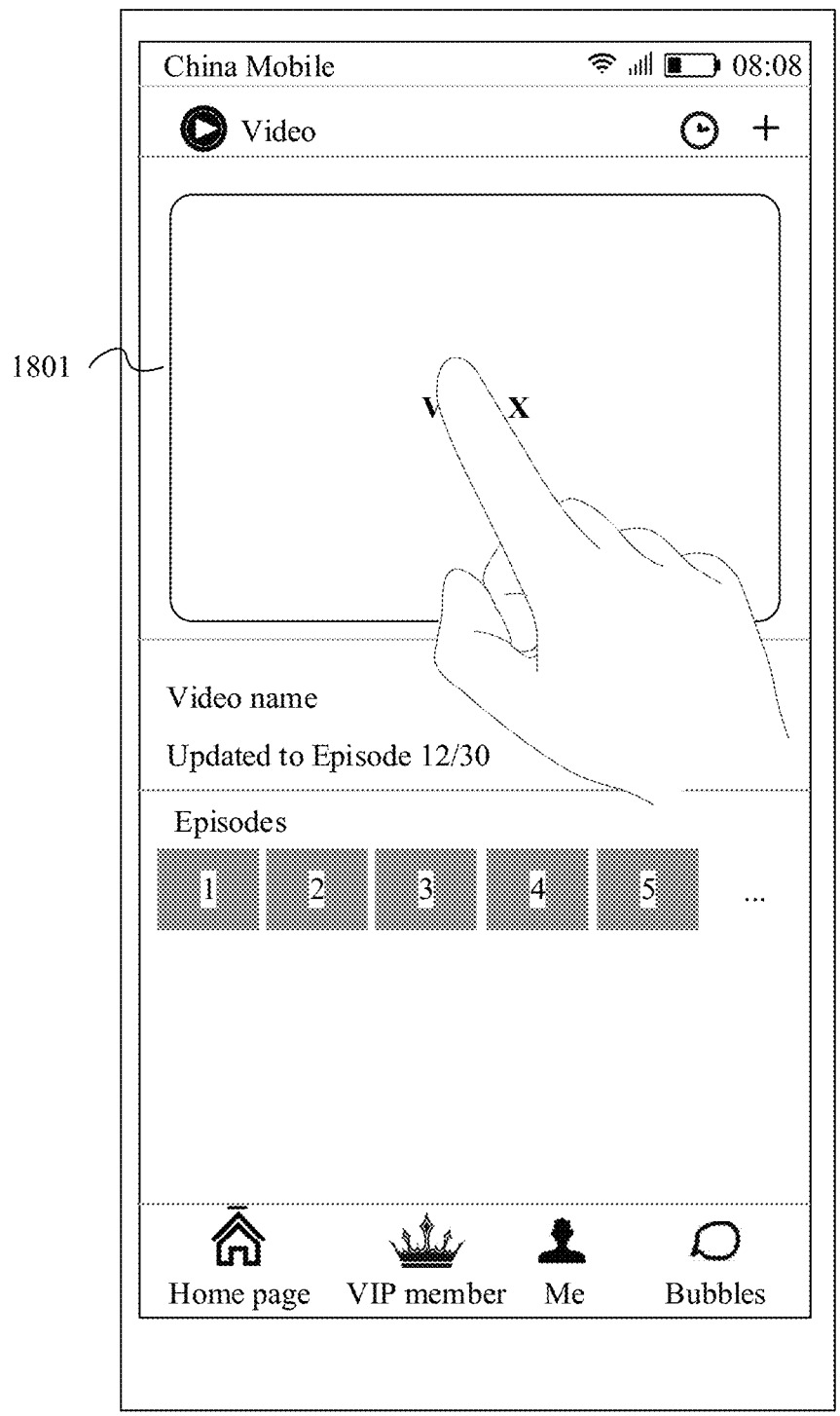
FIG. 18(a) to FIG. 18(c) are a schematic diagram of still another cross-device object drag interface according to an embodiment of this application.
Figure 18A:
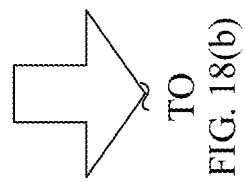
Figure 18B:
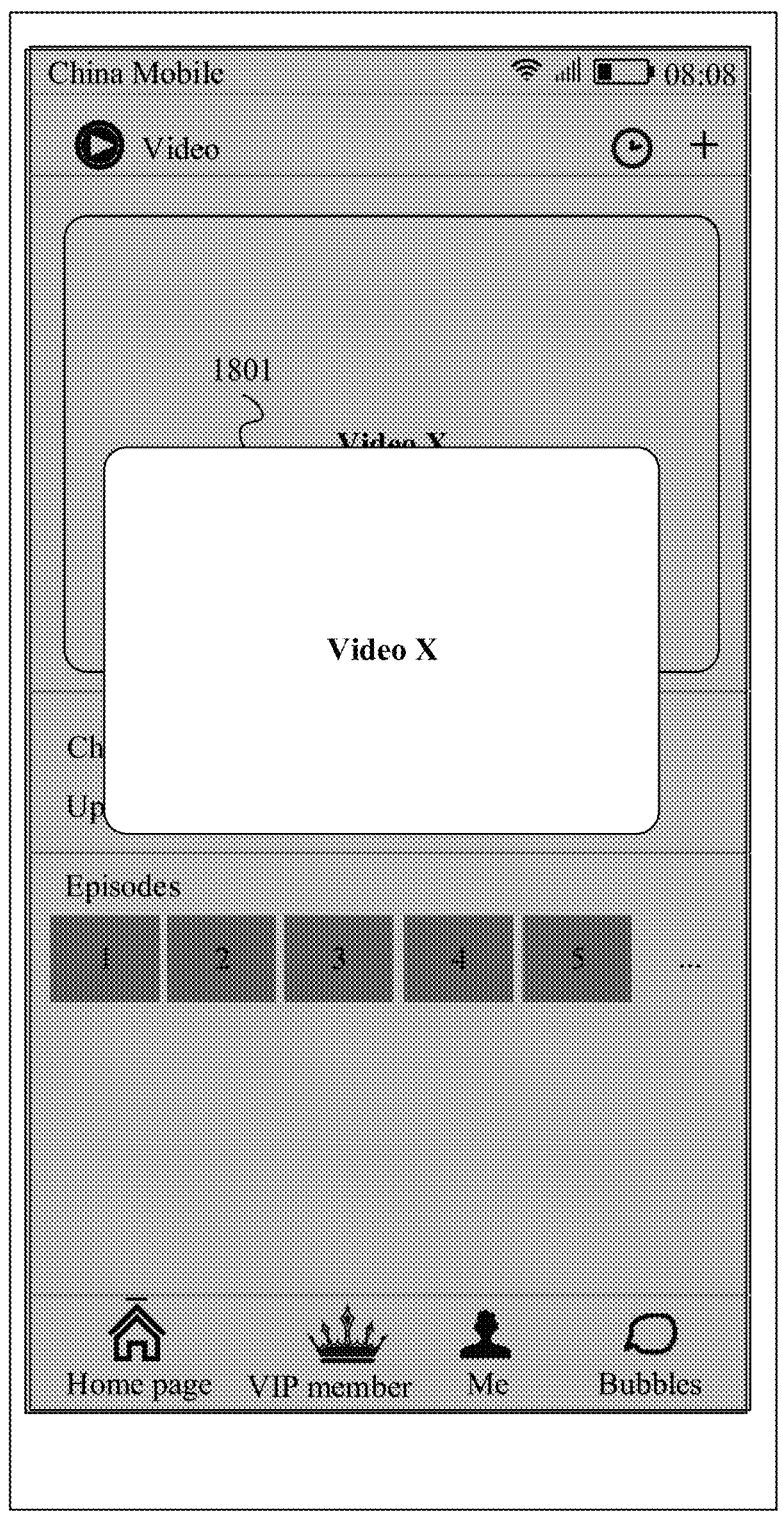
Figure 18C:
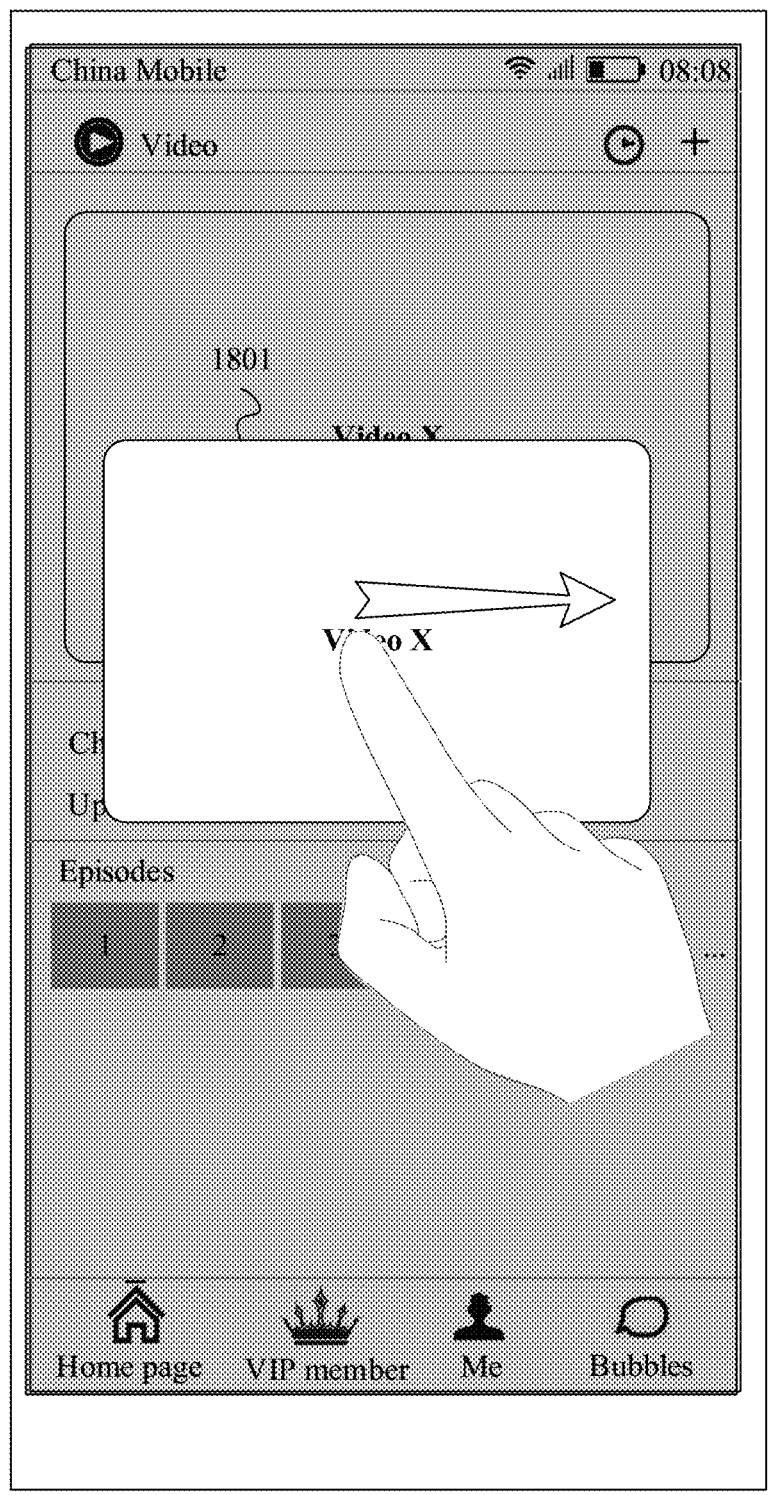

For example, with reference to FIG. 3 and the example shown in FIG. 18(a) to FIG. 18(c), after receiving the user operation in S1701, the mobile phone (for example, a third-party application at the application layer of the mobile phone, which is specifically a video application) triggers drag for the video component on the mobile phone. The framework layer of the mobile phone generates a corresponding drag event, for example, a drag start event. The drag start event includes the drag data 1. The third-party application at the application layer of the mobile phone may call back the drag start event generated by the framework layer, to extract the drag data 1 from the drag start event. After extracting the drag data 1, the third-party application at the application layer of the mobile phone may send the drag data 1 to the drag service module at the application layer of the mobile phone. In this way, the drag service module at the application layer of the mobile phone can obtain the drag data 1. Then, the third-party application at the application layer of the mobile phone monitors drag, and after determining that the drag intent of the user to drag the UI element is cross-device drag, may notify the drag service module at the application layer of the mobile phone that the drag is cross-device drag. In this case, the drag service module at the application layer of the mobile phone may send the obtained drag data 1 to the target device for cross-device drag.

After it is determined that the drag intent of the user is cross-device drag, in a process of dragging the video component, the framework layer of the mobile phone generates a corresponding drag event, for example, the drag movement event. The drag movement event includes the drag data 2. The third-party application at the application layer of the mobile phone may call back the drag movement event generated by the framework layer, to extract the drag data 2 from the drag movement event. After extracting the drag data 2, the third-party application at the application layer of the mobile phone may send the drag data 2 to the drag service module at the application layer of the mobile phone. The drag service module at the application layer of the mobile phone sends the drag data 2 to the target device.

In addition, after drag for the video component is triggered on the mobile phone, or after it is determined that the drag intent is cross-device drag, the mobile phone may start a projection process. For example, the drag service module at the application layer of the mobile phone notifies a projection service module at the application layer of the mobile phone to start projection, to perform screen recording on the mobile phone, so as to obtain the screen recording data. The mobile phone may further notify the target device, for example, a projection service module of the television, that projection starts. After determining that the drag intent is cross-device drag, the mobile phone may send the obtained screen recording data to the target device. It may be understood that, in this embodiment, the screen recording data includes the video data and the audio data. A process of obtaining the video data is similar to the manner of obtaining the screen recording data described in S407, and details are not described herein again. A process of obtaining the audio data may be as follows: The mobile phone may pre-create an audio record (AudioRecord) object, and create a buffer (buffer). After drag starts, the drag service module of the mobile phone may invoke the AudioRecord object. After the AudioRecord object is invoked, audio data in the mobile phone may be recorded. For example, if the dragged object is the video component, audio in the video played on the video component may be recorded, to obtain the audio data. The audio data is stored in the created buffer. In this way, after it is determined that the drag intent is cross-device drag, the drag service module of the mobile phone can obtain the audio data from the buffer. It should be noted that, during cross-device drag for the UI element, for example, the video component, both the video data and the audio data may be projected onto the target device, or only the video data may be projected onto the target device, and no audio data is projected onto the target device. This is not specifically limited in this embodiment.

After the television used as the target device receives the drag data 1, the drag data 2, and the screen recording data that are from the mobile phone, the television may determine, based on resolution of the mobile phone, the drag the data 1, and the drag data 2, whether the dragged UI element has the region that overflows the touchscreen of the mobile phone. When the television determines that the dragged UI element has the region that overflows the touchscreen of the mobile phone, the television may display the dragged UI element, for example, a partial region of the video component, based on the received screen recording data (for example, the video data in the screen recording data) and the layer name included in the drag data 1, and may further play sound based on the audio data in the screen recording data. Content in the region that is displayed on the display of the television and that is of the video component is the same as content in the region that overflows the touchscreen of the mobile phone and that is of the video component.

Figure 19:
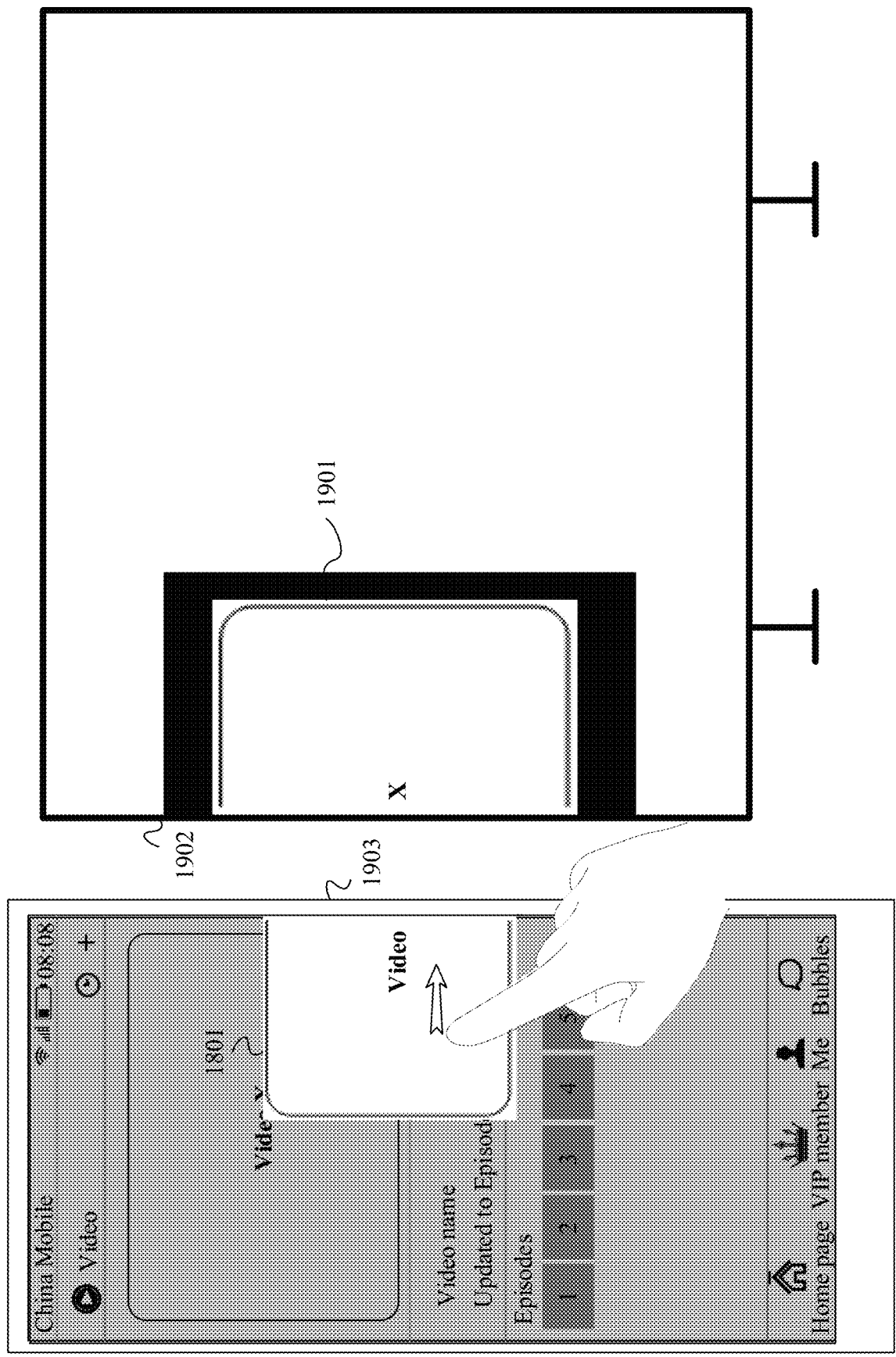
FIG. 19 is a schematic diagram of still another cross-device object drag interface according to an embodiment of this application.

For example, with reference to FIG. 3 and FIG. 18(*a*) to FIG. 18(*c*), after the mobile phone sends the drag data 1, the drag data 2, and the screen recording data to the television, a drag service module at an application layer of the television may receive the drag data 1, the drag data 2, and the screen recording data. Then, the drag service module at the application layer of the television may determine, based on the resolution of the mobile phone, the drag data 1, and the drag data 2, whether dragged video component has the region that overflows the touchscreen of the mobile phone. When it is determined that the dragged video component has the region that overflows the touchscreen of the mobile phone, the drag service module of the television may determine a specific region that overflows the touchscreen of the mobile phone and that is of the video component, and send a determined result, the screen recording data, and the layer name in the drag data 1 to the projection service module of the television. The projection service module of the television works with a framework layer of the television, may filter out the dragged video component (the video component is a complete video component) from the screen recording data (for example, the video data in the screen recording data) based on the layer name in the drag data 1, and draw and display a partial region of the video component on the display of the television according to a result of determining a specific region that overflows the touchscreen of the mobile phone and that is of the dragged video component. For example, the framework layer of the tablet computer (for example, a window management service included in the framework layer, and the window management service is configured with a related parameter that allows an object such as a video component to overflow a screen) may provide a surface view to implement display of the partial region of the video component on the television. For example, when drawing an interface, the television may traverse all layers of an interface corresponding to the screen recording data. If a layer does not correspond to (or does not match) the layer name in the drag data 1, the layer does not participate in drawing. In this way, the dragged UI element can be displayed only on the target device end for cross-device drag. For example, as shown in FIG. 19, the video component displayed by the television is shown in 1901. It can be seen that content on the video component 1901 is the same as content in a part that overflows the mobile phone and that is of the video component 1801, or the video component 1901 and a part that is displayed on the mobile phone and that is of the video component 1801 can present complete content in the computer window 1801. In addition, the video component 1801 is dragged rightward, and a drag-in location of the video component 1901 is the left edge 1902 of the display of the television. In addition, a drag-out location is the center location of the right edge 1903 of the touchscreen of the mobile phone, and the drag-in location also is specifically the center location of the left edge 1902. In this way, a visual effect provided for the user is that the video component 1801 is dragged from the mobile phone to a target device end for cross-device drag, namely, the television. The television may further play the sound based on the audio data in the screen recording data.

It may be understood that, as the UI element continues to be dragged on the mobile phone, the mobile phone may dynamically adjust, based on the user operation, a size of a region that is displayed on the touchscreen of the mobile phone and that is of the UI element. In addition, the mobile phone may obtain the screen recording data and the drag data 2 in real time and send the screen recording data and the drag data 2 to the television in real time. The television may dynamically adjust, based on the received screen recording data, the layer name in the drag data 1, and the drag data 2, a size of the region and displayed content of the UI element that are displayed on the display of the television. A specific implementation is similar to descriptions of corresponding content in the embodiment shown in FIG. 4. Details are not described herein again.

It should be noted that, in the foregoing example, an example in which the UI element dragged by the user is the video component is used for description. As described above, the UI element dragged by the user may be alternatively the floating window or the picture-in-picture. Specific implementations of dragging the floating window and the picture-in-picture are similar to a specific implementation of dragging the video component. Details are not described herein again. A difference lies in that, in the specific implementation of dragging the picture-in-picture, after a user operation of dragging the picture-in-picture is received, a system UI at the application layer of the mobile phone triggers drag for the picture-in-picture, and the system UI calls back a drag event generated by the framework layer, to send corresponding drag data, for example, the drag data 1 and the drag data 2, to the drag service module at the application layer of the mobile phone.

S1707: The mobile phone receives a drag release user operation.

S1708: In response to the user operation in S1707, the mobile phone sends indication information to the television. The television displays an entire region of the dragged UI element on the television based on the indication information.

Figure 20:
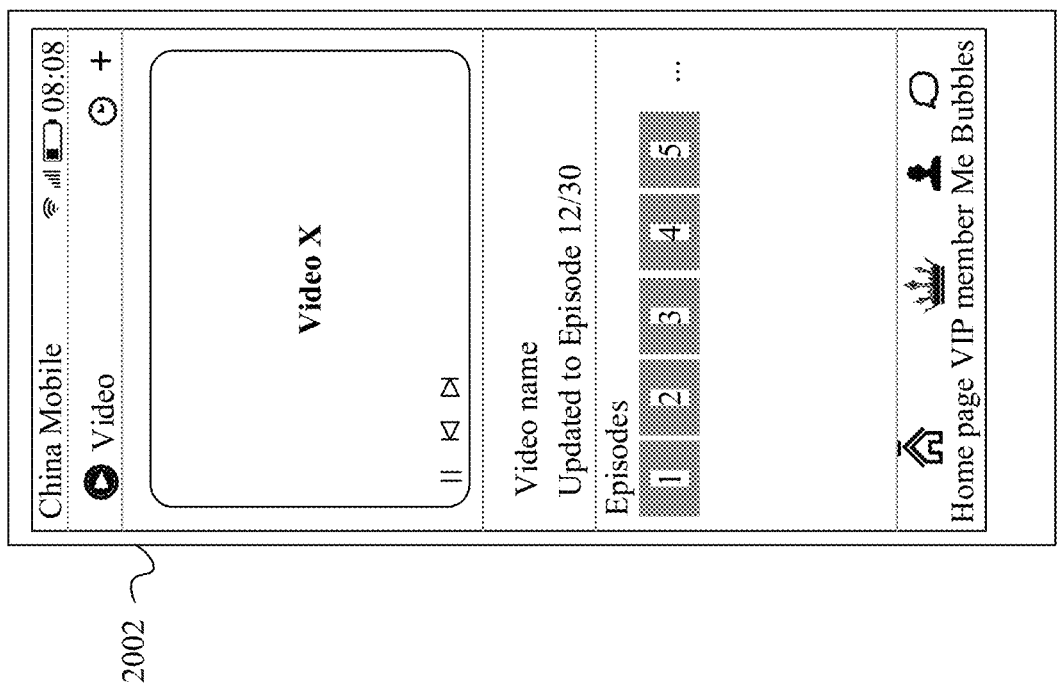
FIG. 20 is a schematic diagram of still another cross-device object drag interface according to an embodiment of this application.
Figure 20:
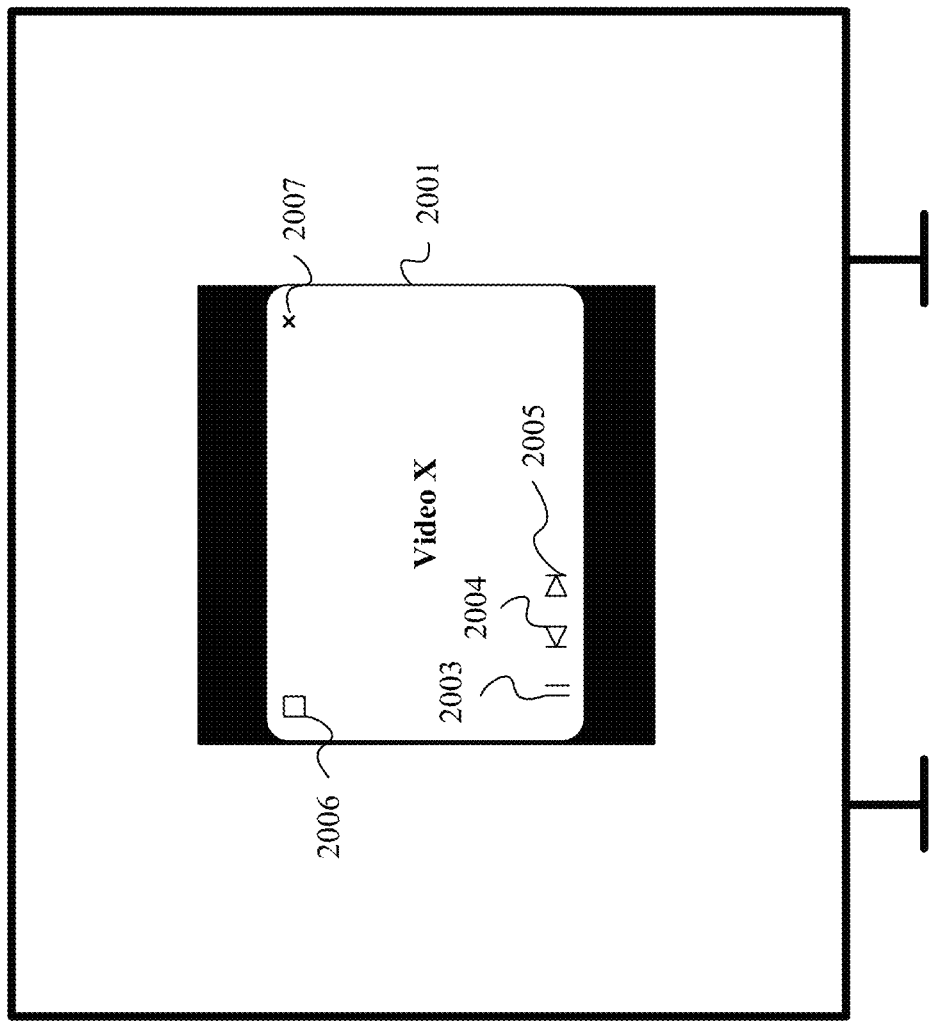

As described in S1706, the mobile phone sends the screen recording data to the television in real time. After the user releases drag on the mobile phone, the mobile phone may send, to the television, indication information indicating that the user stops drag. The television may learn, based on the indication information, that the user has stopped drag, and the television may display the entire region of the dragged UI element on the display of the television based on screen recording data (for example, video data in the screen recording data) received at a current moment. For example, with reference to FIG. 19, as shown in FIG. 20, after the user releases drag on the mobile phone, the television may display an entire region of a video component 2001 on the display of the television in a floating manner. The video component 2001 may be displayed on an edge or in the middle of a screen of the television in the floating manner, or may be displayed in full screen. In addition, as shown in FIG. 20, after receiving the drag release user operation, the mobile phone may display an interface 2002 of the video application including the video component. In another embodiment, the mobile phone may alternatively display the interface of the video application, but the interface includes no video component (not shown in the figure), or the mobile phone may display a home screen (not shown in the figure). This is not specifically limited in this embodiment. Alternatively, the mobile phone may display the video component in a floating manner, for example, display the video component in the middle or on an edge of the screen of the mobile phone in the floating manner.

It should be noted that, as described in S407, after receiving the drag release user operation, the source device may project, in an implementation (for example, referred to as an implementation 1), the entire region of the dragged object onto the target device end for display, or projects, in another implementation (for example, referred to as an implementation 2), the entire region of the dragged object onto the target device end for display only when a ratio in which the dragged object overflows the source device is greater than a preset threshold (or a ratio in which the dragged object is displayed on the source device is less than a preset threshold). In some embodiments, in the foregoing implementation 2, the dragged object may be hovered, adsorbed, and displayed on the source device and the target device if the ratio in which the dragged object overflows the source device is less than the preset threshold (or the ratio in which the dragged object is displayed on the source device is greater than the preset threshold) after the release operation is received. For example, in a process of dragging the UI element, for example, the video component, the floating window, or the picture-in-picture, if a ratio in which the dragged UI element overflows the source device is less than the preset threshold when the source device receives the drag release user operation, for example, when the user stops dragging the UI element on the source device, the dragged UI element is hovered, adsorbed, and displayed on the source device and the target device. For example, a display effect may be shown in FIG. 19. To be specific, a part of the dragged video component is displayed on the mobile phone, and a part of the dragged video component is displayed on the television. In some other embodiments, in the foregoing implementation 2, projection and display of the dragged object on the target device end may be stopped if the ratio in which the dragged object overflows the source device is less than the preset threshold (or the ratio in which the dragged object is displayed on the source device is greater than the preset threshold) after the release operation is received. For example, the mobile phone may normally display the video component on the touchscreen of the mobile phone. The mobile phone may further send the indication information to the television, and the indication information indicates that drag stops, so that the television normally displays an interface of the television. It should be noted that, whether to perform an operation of hovering, adsorbing, and displaying the dragged UI element on the source device and the target device, or stop projection and display may be pre-configured when the ratio in which the dragged object overflows the source device is less than the preset threshold (or the ratio in which the dragged object is displayed on the source device is greater than the preset threshold) after the release operation is received.

The user may further implement control, for example, a control operation such as scaling up or reverse control, on the video component 2001 by using an input device of the television. For example, reverse control may be control, for example, playing/pausing, fast forwarding, or rewinding the video played by the video component. For example, with reference to FIG. 20, the video component 2001 further includes a play/pause button 2003, a rewind button 2004, and a fast forward button 2005. The user may perform an operation on a button in the video component 2001 by using the input device of the television, for example, a remote control. For example, the user performs an operation on the fast forward button 2005. After the user performs the operation on the fast forward button 2005 by using the remote control, the projection service module of the television may obtain location information of the operation, and the television may determine, based on the location information and a video source region, a location that is of the fast forward button in the video component in the mobile phone and that corresponds to a location. The video source region is used to indicate a correspondence between each location in the video component 2001 and each location in the video component in the mobile phone. Then, the projection service module of the television may send, to the drag service module of the mobile phone by using the drag service module of the television, an instruction indicating that the user performs the operation on the fast forward button. The drag service module of the mobile phone forwards the instruction to the framework layer of the mobile phone. In response to the instruction, the framework layer of the mobile phone may perform fast forward processing on the video, and obtain corresponding screen recording data. The obtained screen recording data may be sent to the drag service module of the television by using the drag service module of the mobile phone. Then, the drag service module of the television may send the screen recording data to the projection service module of the television, and the projection service module of the television cooperates with the framework layer of the television, to draw a fast forwarded video and display the fast forwarded video on the display of the television, so as to implement reverse control on a mobile phone end at a television end. For another example, with reference to FIG. 20, the video component 2001 further includes a button 2006. The user may perform a tap operation on the button 2608 by using the remote control of the television, and in response to the tap operation, the television scales up the video component 2001. The video component 2001 further includes a button 2007. The user may perform a tap operation on the button 2007 by using the remote control of the television, and in response to the tap operation, the video stops being played on the television. For example, the television may send a projection exit request to the mobile phone, and after receiving the request, the mobile phone stops projection of the video component.

By using the method in the embodiment shown in FIG. 17, the UI element, for example, the video component, the floating window, or the picture-in-picture, can be dragged from the source device to the target device. For example, the user watches a variety show video or makes a video call with a friend on the mobile phone by using the floating window. After arriving at home, the user may drag the floating window to the television and continue to watch the variety show video or make the video call on the television by using the floating window.

It should be noted that descriptions of other content in this embodiment are similar to descriptions of corresponding content in FIG. 4. Details are not described herein again. In addition, when the dragged object is a freeform window, drag from the source device to the target device may be implemented based on the solution in the embodiment shown in FIG. 4, or drag from the source device to the target device may be implemented based on the solution in the embodiment shown in FIG. 11. This is not specifically limited in this embodiment.

Figure 21:
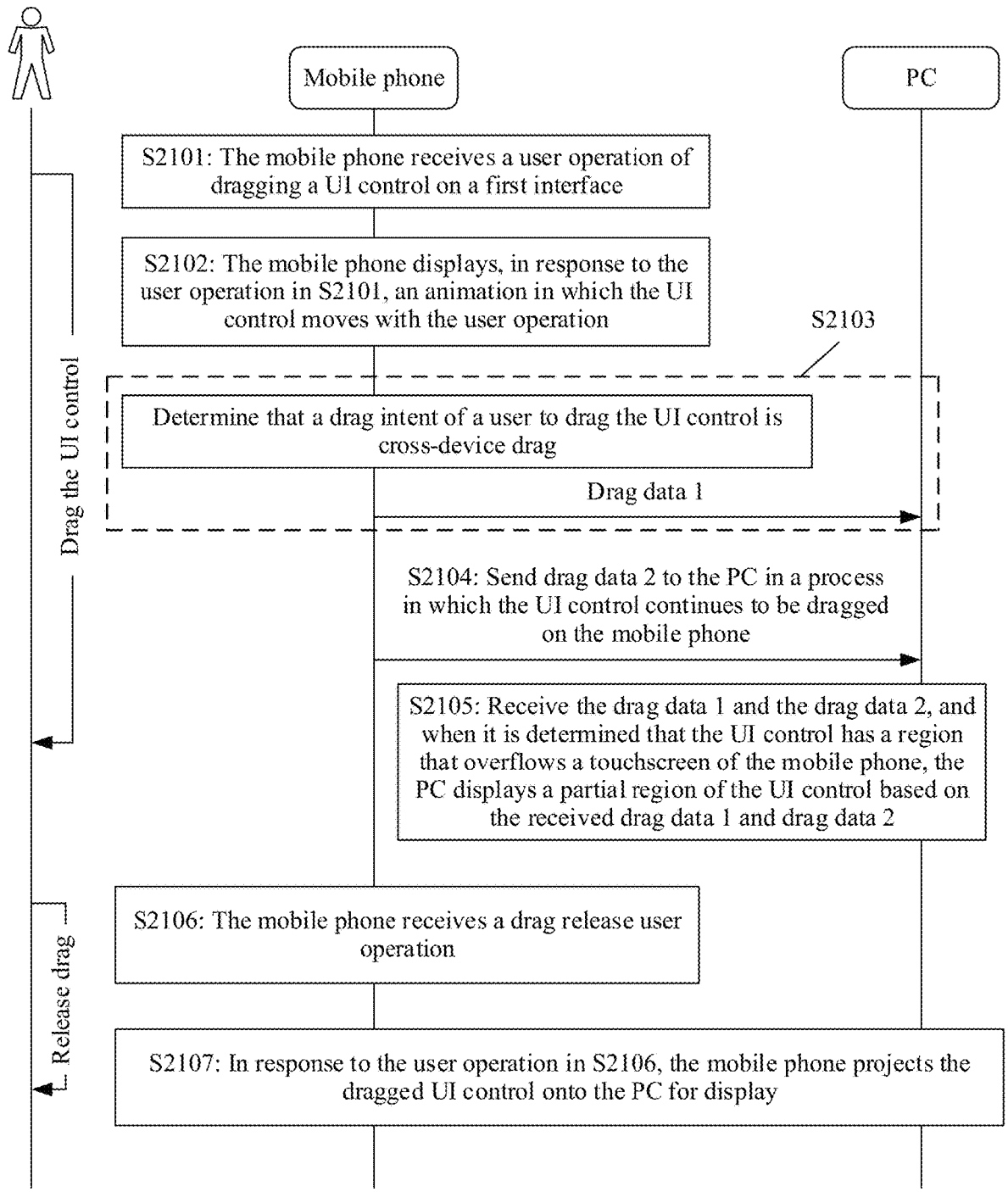
FIG. 21 is a schematic flowchart of a cross-device object drag method according to an embodiment of this application.

FIG. 21 is a schematic flowchart of a cross-device object drag method according to an embodiment of this application. In this embodiment, the method provided in this embodiment is described in detail by using an example in which the first terminal 101 is a mobile phone, the second terminal 102 is a PC, the input device of the first terminal 101 is a touchscreen, and the dragged object is a UI control on an interface. For example, the mobile phone is used as the source device, and the PC is used as the target device.

As shown in FIG. 21, the method may include S2101 to S2107.

S2101: The mobile phone receives a user operation of dragging a UI control on a first interface.

S2102: The mobile phone displays, in response to the user operation in S2101, an animation in which the UI control moves with the user operation.

The UI control is an interface element, and is included in an application. A user may interact with the UI control through direct manipulation (direct manipulation), to read or edit related information of the application. Generally, the UI control may include visual interface elements such as an icon, a button, a menu, a tab, a text box, a dialog box, a status bar, and a navigation bar.

It may be understood that different interfaces include different UI controls. In this embodiment, UI controls that are allowed to be dragged and that are on different interfaces may be all or some of UI controls included in the interface. A UI control that is allowed to be dragged and that is on the interface may be predefined. For example, a corresponding configuration file may be pre-configured on the mobile phone. The configuration file includes configuration information of UI controls that are allowed to be dragged and that are on interfaces of different applications. For example, the configuration file includes an identifier of a UI control that is allowed to be dragged and that is on each interface. In other words, only the UI control whose identifier is included in the configuration file is a UI control that is allowed to be dragged. In an actual application, there may be one or more UI controls dragged by the user. This is not specifically limited in this embodiment.

In this embodiment, the user operation in S2101 may be the drag operation in this application. The user operation in S2101 may include one or more operations. For example, the user operation may include an operation of selecting the UI control and an operation of triggering movement of the selected UI control.

The operation of selecting the UI control may be used by the mobile phone to determine a UI control that the user wants to drag. In some embodiments, the operation of selecting the UI control may include a gesture operation, and the gesture operation may be a screen touch gesture operation. In other words, the UI control that the user wants to drag may be selected by performing the screen touch gesture operation.

Figure 22A:
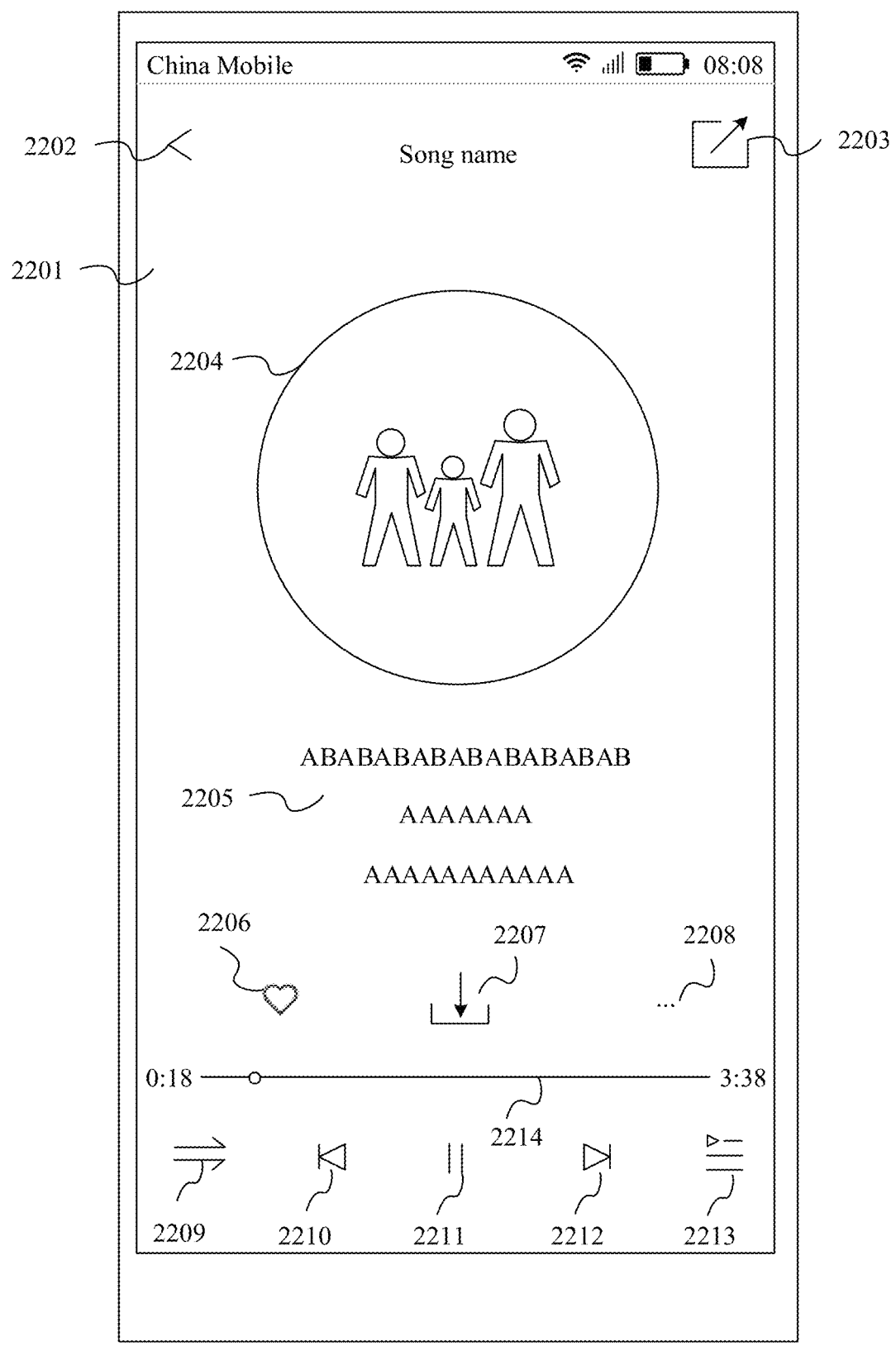
FIG. 22(a) to FIG. 22(d) are a schematic diagram of still another cross-device object drag interface according to an embodiment of this application.
Figure 22B:
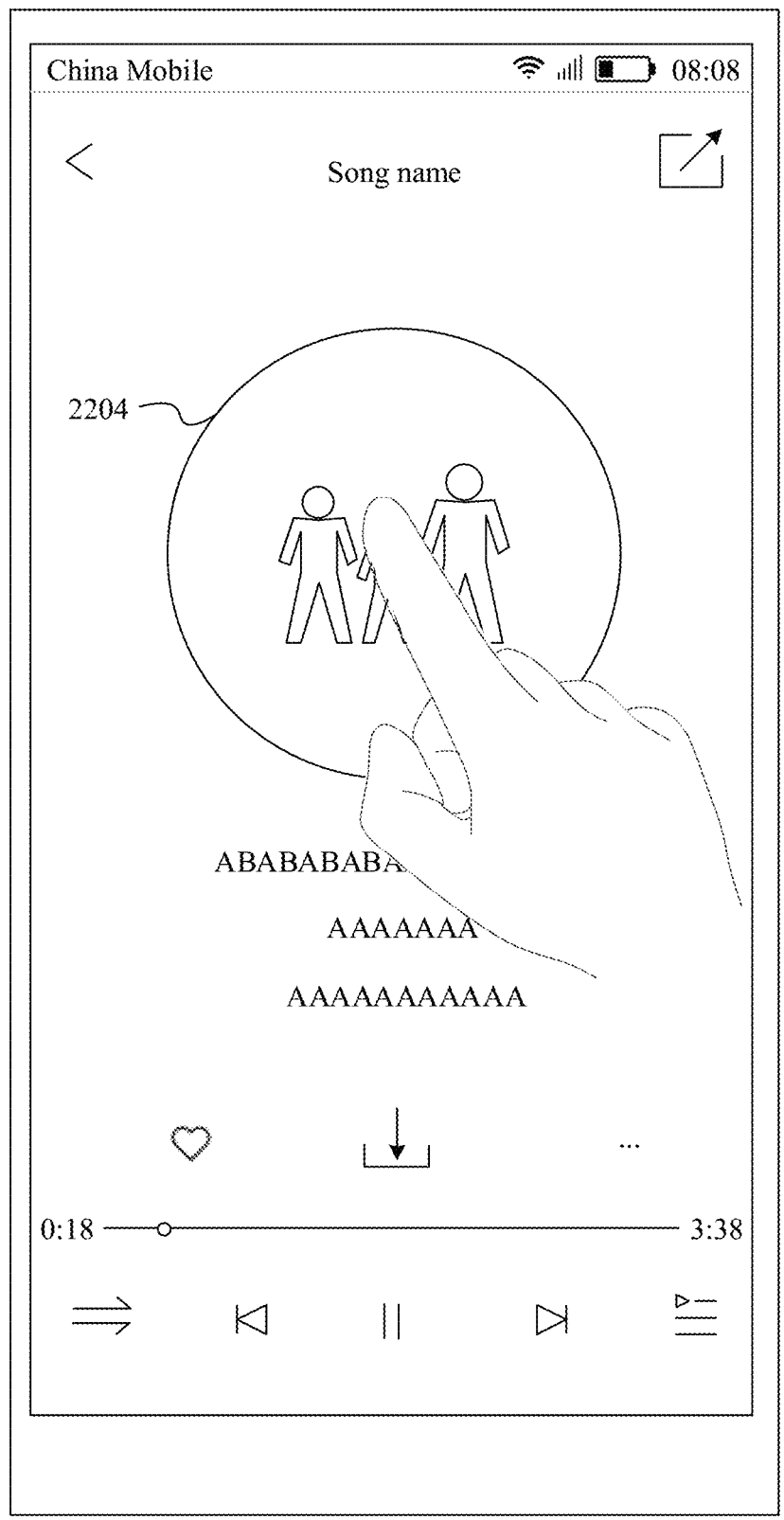

For example, there is one UI control that the user wants to drag. The operation of selecting the UI control may be a single-finger operation for the UI control, for example, a single-finger touch and hold operation or a single-finger double-tap operation, or may be a 3D touch (3D touch) operation for the UI control, or may be a palm operation for the UI control, for example, a palm touch and hold operation or a palm single-tap operation. For example, as shown in FIG. 22(a), the mobile phone currently displays a first interface 2201, and the first interface 2201 is a music playing interface. All UI controls on the first interface 2201, for example, a back button 2202, a share button 2203, an album button 2204, a lyric 2205, a favorites button 2206, a download button 2207, another button 2208, a play mode button 2209, a previous button 2210, a play/pause button 2211, a next button 2212, a menu button 2213, and a progress bar 2214 are allowed to be dragged. With reference to FIG. 22(a), for example, the operation of selecting the UI control is the single-finger touch and hold operation. When wanting to drag the album button 2204, as shown in FIG. 22(b), the user may perform a single-finger touch and hold operation on the album button 2204. After receiving the operation, the mobile phone may determine that the album button 2204 is the UI control that the user selects and wants to drag.

Figure 22C:
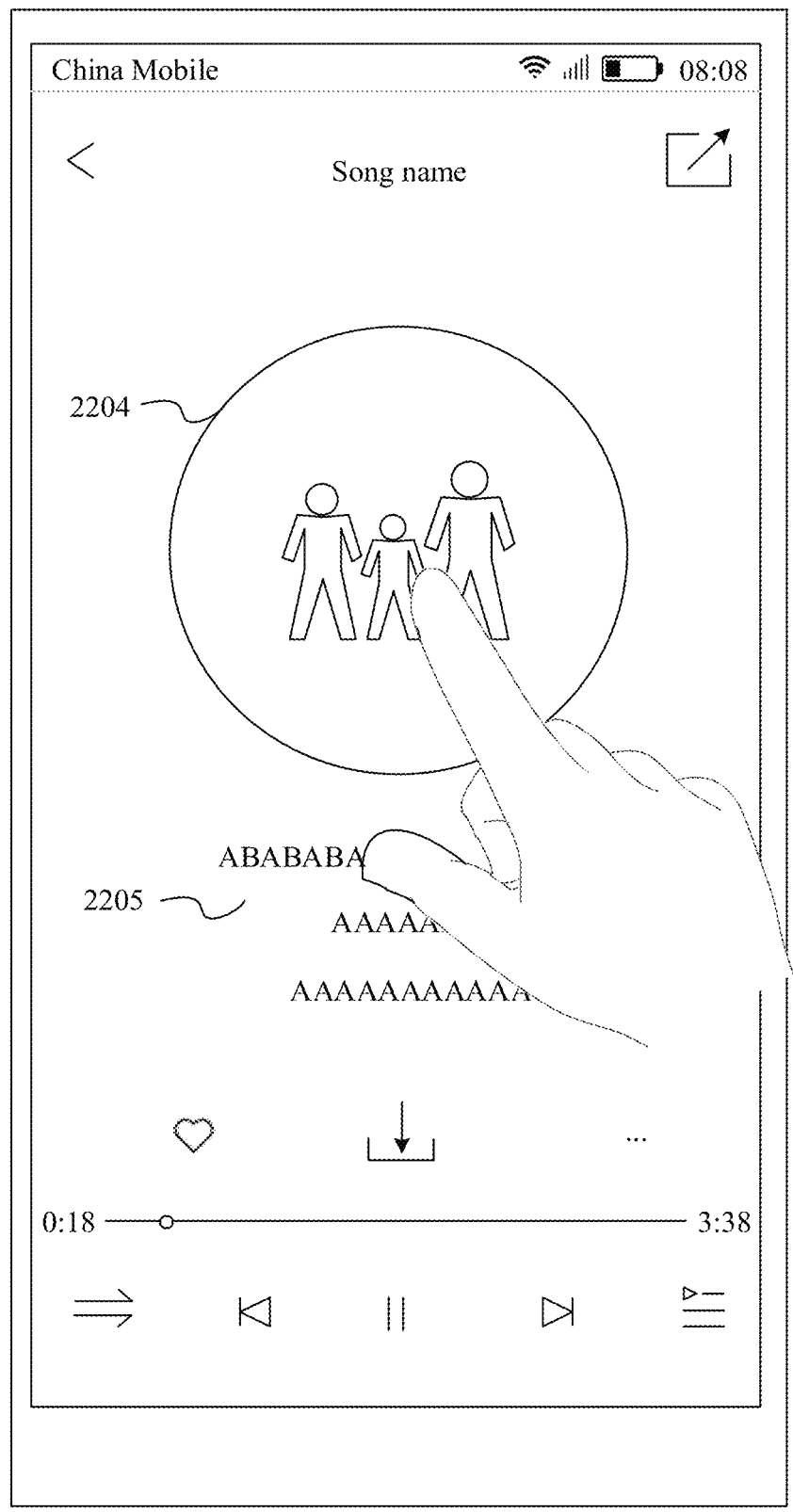

For another example, there are a plurality of UI controls that the user wants to drag. The operation of selecting the UI control may be a two-finger pinch operation. All UI controls that are allowed to be dragged and that are in a two-finger pinch region are to be determined by the mobile phone as UI controls that the user wants to drag. For example, with reference to FIG. 22(a), when the user wants to drag the album button 2204 and the lyric 2205, as shown in FIG. 22(c), the user may perform a two-finger pinch operation. After receiving the operation, the mobile phone may determine that UI controls in a two-finger pinch region, for example, the album button 2204 and the lyric 2205, are the UI controls that the user selects and wants to drag.

Figure 22D:
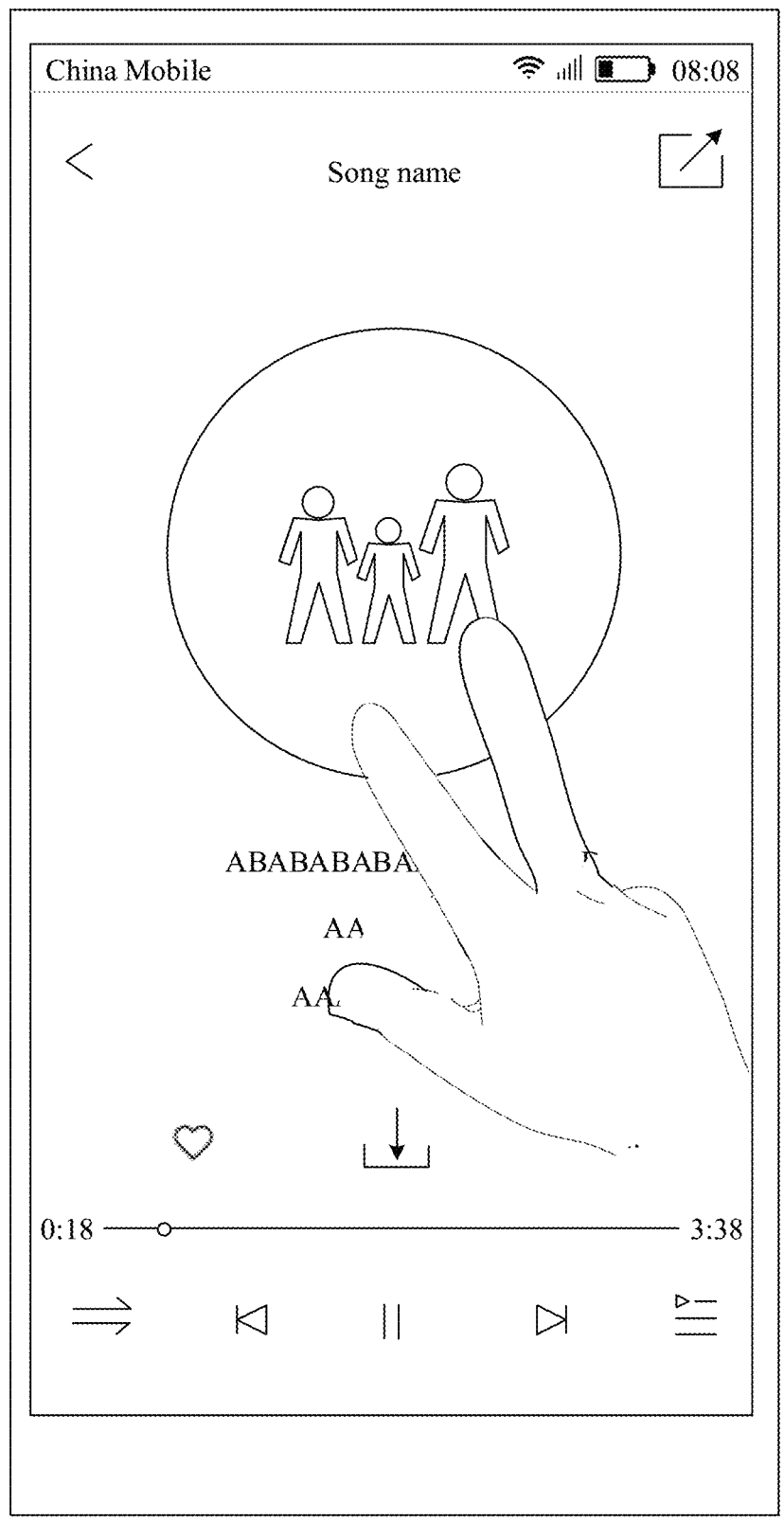

For another example, the user wants to drag all UI controls that are allowed to be dragged and that are on the first interface. The operation of selecting the UI control may be a three-finger pinch operation. For example, with reference to FIG. 22(a), when the user wants to drag all the UI controls that are allowed to be dragged and that are on the first interface 2201, as shown in FIG. 22(d), the user may perform a three-finger pinch operation on the first interface 2201. After receiving the operation, the mobile phone may determine that all the UI controls (namely, the controls 2202 to 2214 shown in FIG. 22(a)) on the first interface 2201 are the UI controls that the user selects and wants to drag.

Figure 23A:
FIG. 23(a) and FIG. 23(b) are a schematic diagram of still another cross-device object drag interface according to an embodiment of this application.
Figure 23B:
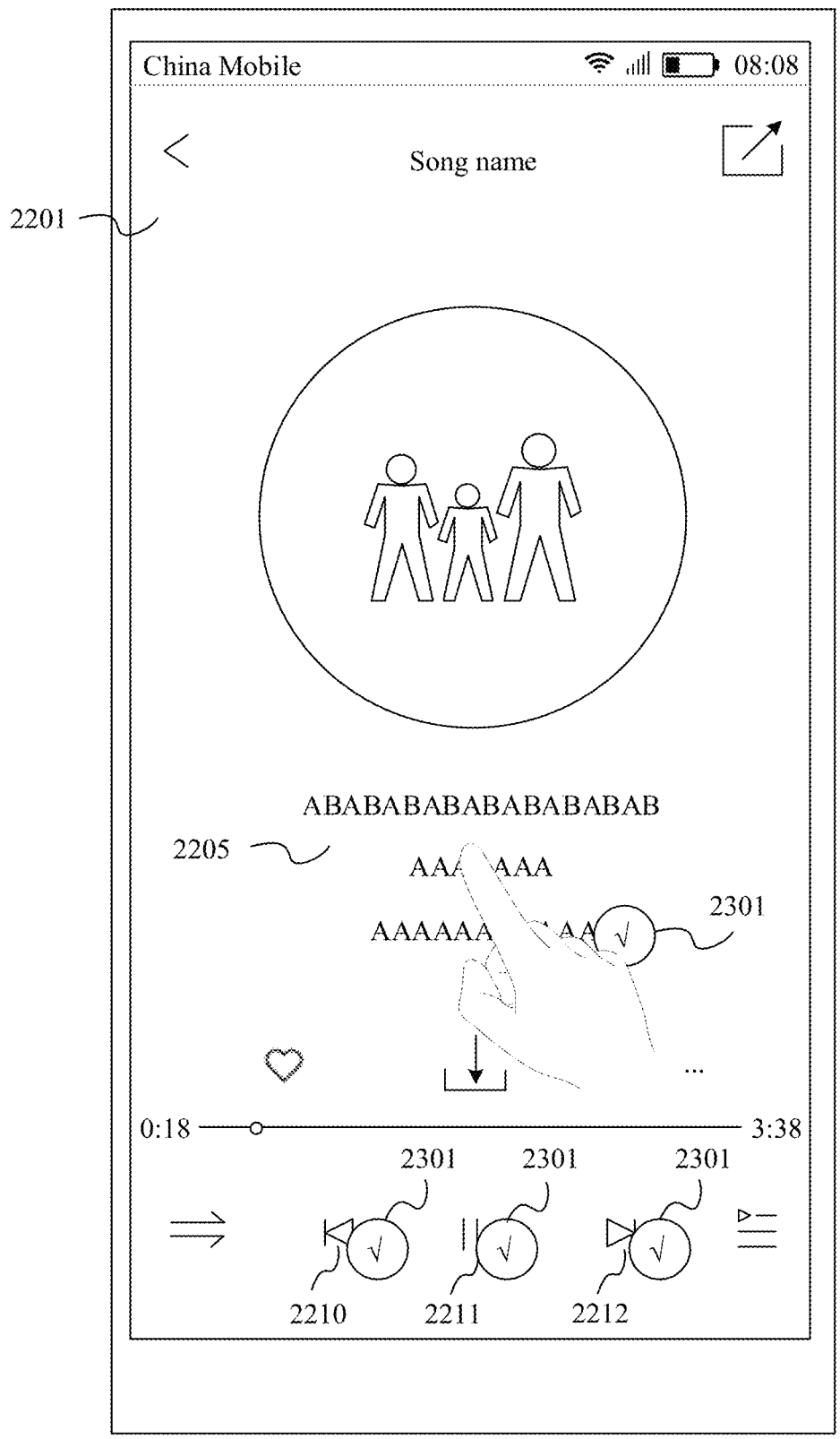

In some other embodiments, the operation of selecting the UI control may include two gesture operations. In other words, the UI control that the user wants to drag may be selected by performing the two gesture operations. For example, the two gesture operations include a gesture operation 1 and a gesture operation 2. The gesture operation 1 may be a screen touch gesture operation, or may be an air gesture operation. The operation is similar to the operation of triggering drag for the first window in S401. Details are not described herein again. A difference lies in that a function of the gesture operation 1 is used to trigger the mobile phone to enable a multi-element drag mode. After the multi-element drag mode is enabled, the mobile phone may display, in a to-be-dragged state, a UI control that is allowed to be dragged and that is on the first interface. The drag state of the UI control may be presented in a manner, for example, jittering or displaying a selection box on the UI control that is allowed to be dragged. The gesture operation 2 may be a screen touch gesture operation. For example, the gesture operation 2 may be specifically a tap operation for the UI control displayed in the to-be-dragged state. The mobile phone may determine, based on the gesture operation 1 and the gesture operation 2, the UI control that the user wants to drag. For example, with reference to FIG. 22(a), an example in which UI controls that are allowed to be dragged and that are on the first interface 2201 include the album button 2204, the lyric 2205, the play mode button 2209, the previous button 2210, the play/pause button 2211, the next button 2212, and the menu button 2213, the gesture operation 1 is a single-finger double-tap operation for the first interface 2201, and the gesture operation 2 is a tap operation for the UI control. As shown in FIG. 23(a), the user performs the single-finger double-tap operation on the first interface 2201. In response to the operation, the album button 2204, the lyric 2205, the play mode button 2209, the previous button 2210, the play/pause button 2211, the next button 2212, and the menu button 2213 start to jitter. The user may perform a tap operation on one or more of these UI controls, to select the UI control that the user wants to drag. For example, the UI controls that the user wants to drag include the lyric 2205, the previous button 2210, the play/pause button 2211, and the next button 2212. The user may separately perform a tap operation on the lyric 2205, the previous button 2210, the play/pause button 2211, and the next button 2212. As shown in FIG. 23(b), to help the user learn which UI controls are selected, selection identifiers 2301 may be displayed on the selected UI controls. In this way, the mobile phone may determine, based on the gesture operation 1 and the gesture operation 2 that are performed by the user, that the lyric 2205, the previous button 2210, the play/pause button 2211, and the next button 2212 are the UI controls that the user selects and wants to drag.

The foregoing operation of triggering movement of the UI control may be a screen touch gesture operation. For example, the screen touch gesture operation of triggering movement of the UI control may be an operation of pressing and moving the selected UI control. The operation of triggering movement of the UI control may be alternatively an air gesture operation. For example, the air gesture operation of triggering movement of the UI control is a press gesture and a pan gesture for the selected UI control. For another example, the air gesture operation of triggering movement of the UI control is a fisting gesture and a pan gesture that are performed after the UI control is selected. The operation of triggering movement of the UI control may be performed on any one or more of the foregoing selected UI controls. For example, the operation of triggering movement of the UI control is the operation of pressing and moving the selected UI control. With reference to the example shown in FIG. 23(a) and FIG. 23(b), the user may perform a press and movement operation on the lyric 2205.

Figure 24A:
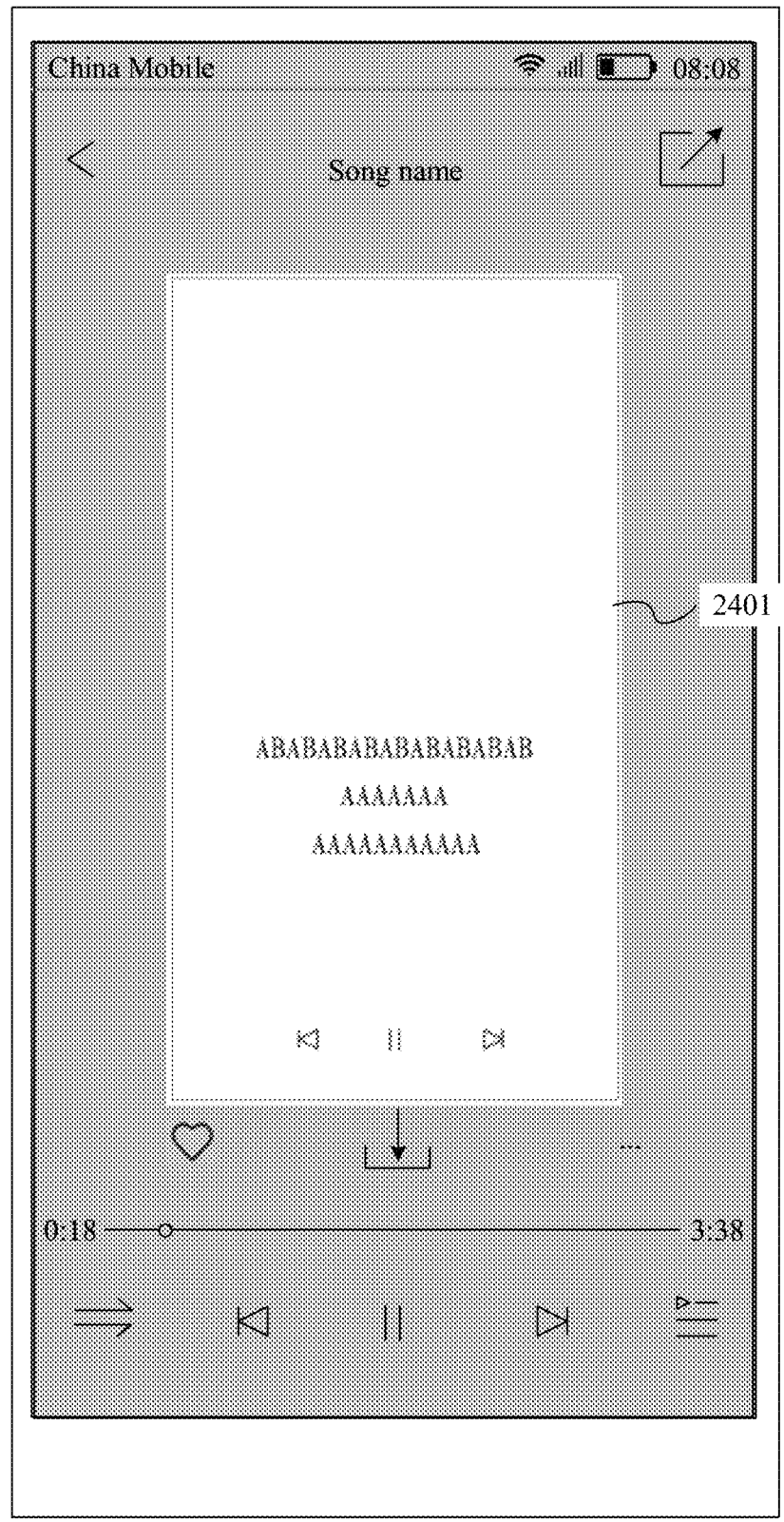
FIG. 24(a) and FIG. 24(b) are a schematic diagram of still another cross-device object drag interface according to an embodiment of this application.
Figure 24B:
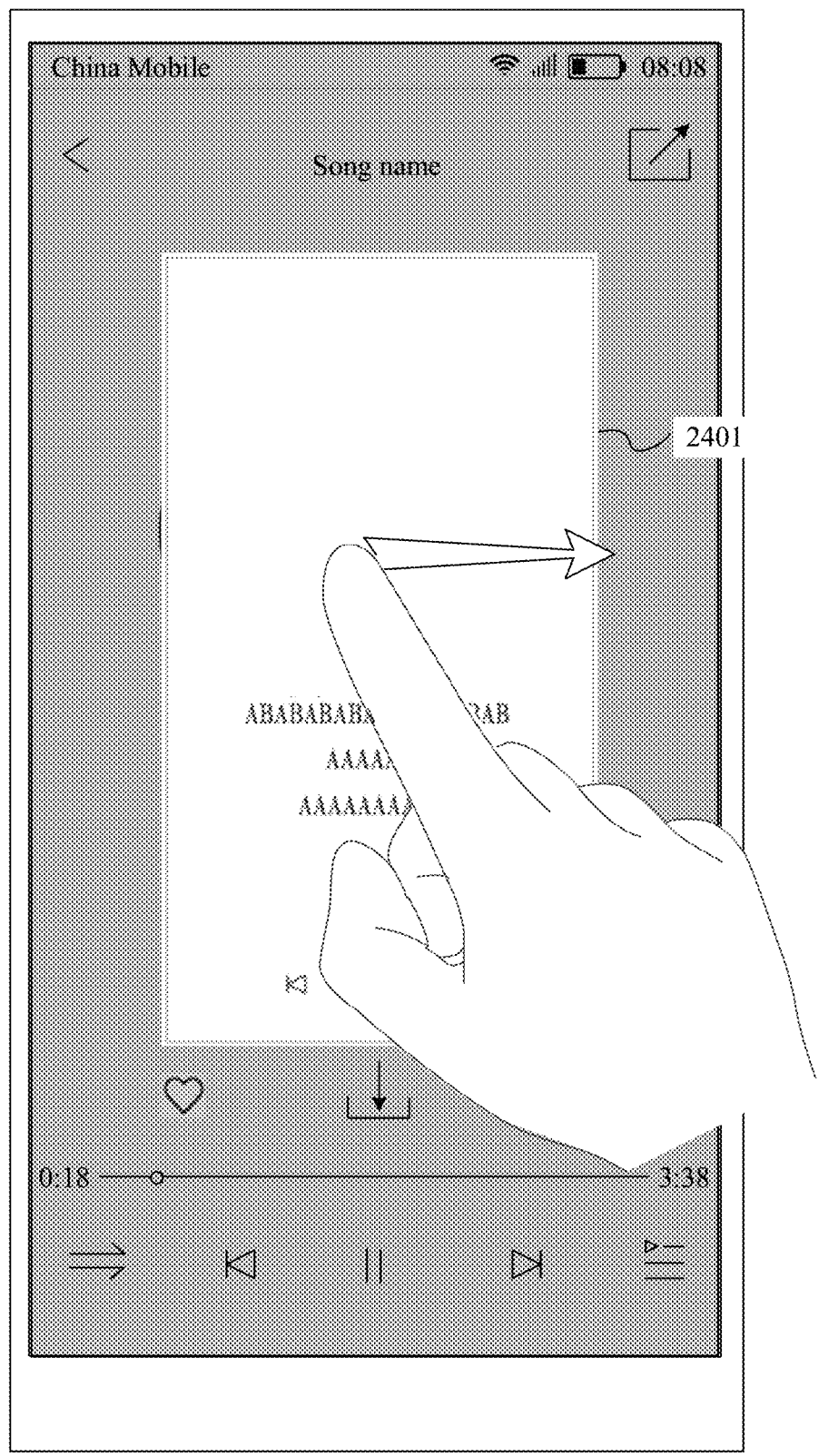

Then, the mobile phone may draw and display an animation in which the selected UI control moves as the finger of the user moves. In some embodiments, the mobile phone may draw and display an animation in which a shadow (shadow, or referred to as a dragged shadow) of the selected UI control moves as a finger of the user moves. For example, before displaying the animation, the mobile phone may generate the shadow of the selected UI control. For example, with reference to FIG. 3 and the example shown in FIG. 23(a) and FIG. 23(b), a specific process in which the mobile phone generates the shadow may be as follows: After the user selects the UI control that the user wants to drag, and performs the press and movement operation on the selected UI control, a drag service module of the mobile phone may receive the corresponding operation. The drag service module of the mobile phone sends, to a framework layer of the mobile phone, an indication for triggering drag for the control. For example, the indication may include an identifier that is of the dragged UI control and that is obtained by the mobile phone. After receiving the indication, the framework layer of the mobile phone monitors the corresponding UI control based on the identifier of the dragged UI control, and sends control information of the dragged UI control to the drag service module of the mobile phone. The control information may include the identifier and the shadow of the dragged UI control, location information of the dragged UI control on the first interface, and the like. For example, the lyric 2205, the previous button 2210, the play/pause button 2211, and the next button 2212 are the dragged UI controls. The framework layer of the mobile phone monitors these UI controls, namely, the lyric 2205, the previous button 2210, the play/pause button 2211, and the next button 2212 based on received identifiers of the UI controls, and transmits the identifier and the shadow of each UI control of the lyric 2205, the previous button 2210, the play/pause button 2211, and the next button 2212 and location information of each of the lyric 2205, the previous button 2210, the play/pause button 2211, and the next button 2212 on the first interface to the drag service module of the mobile phone. The drag service module of the mobile phone may generate the shadow of the selected UI control based on the received control information of the dragged UI control. For example, the generated shadow is shown in 2401 in FIG. 24(a). In this way, as the finger of the user moves, the mobile phone may display an animation in which the shadow is dragged, to give the user a visual effect of dragging the selected UI control by the finger of the user. For example, with reference to FIG. 24(b), the user moves the finger rightward. As the finger of the user moves, the mobile phone, for example, the framework layer of the mobile phone, may draw an animation in which the shadow 2401 moves with the finger of the user, and send the animation to an application layer (for example, a launcher at the application layer) of the mobile phone to display, on the touchscreen of the mobile phone, the animation in which the shadow 2401 moves with the finger of the user. In addition, the dragged UI control may still be displayed on the first interface (as shown in FIG. 24(*a*) and FIG. 24(*b*)), or may not be displayed (not shown in the figure). This is not limited in this embodiment. It should be noted that the shadow 2401 shown in FIG. 24(*a*) and FIG. 24(*b*) includes the shadows of the dragged UI controls and a background carrying these shadows. The background is used to carry the shadow of the dragged UI control, and the background may be a canvas or a drawing board, and may be transparent or opaque (as shown in FIG. 24(*a*) and FIG. 24(*b*)). This is not specifically limited in this embodiment.

After receiving the corresponding operation, the mobile phone (for example, the drag service module of the mobile phone) may identify, by using the UI control, a type of the UI control dragged by the user. The mobile phone may determine an identifier of the dragged UI control based on the identified type of the UI control. The type of the control is in a one-to-one correspondence with the identifier, and the correspondence is pre-stored in the mobile phone. For example, the type of the UI control dragged by the user may be identified by using an artificial intelligence (artificial intelligence) identification method. For example, each interface (for example, which includes the foregoing music playing interface) of each application on the mobile phone may be obtained in advance. For example, entire-frame image data of the music playing interface may be obtained by using a screen capture method. A region of each UI control on the music playing interface may be located by using a target detection technology (for example, a model algorithm, for example, an R-CNN, a Fast-R-CNN, or YOLO) in machine learning, and then, the located region and a type of each UI control on the music playing interface and an identifier of the music playing interface may be stored in the mobile phone in a correspondence manner. After receiving an operation of dragging the UI control on the music playing interface by the user, the mobile phone may identify, based on a location touched when the user selects the UI control and the stored region of each UI control on the music playing interface, the type of the UI control dragged by the user. For another example, after an operation of dragging the UI control on the music playing interface by the user is received, the UI control selected by the user may be drawn, and then a type of the drawn UI control may be identified by using a target classification technology (for example, a ResNet model algorithm) in machine learning.

S2103: The mobile phone sends drag data 1 to the PC when determining that a drag intent of the user to drag the UI control is cross-device drag.

The drag data 1 may be first drag data in this application. The drag data 1 may include rect information of the shadow, the shadow, and the identifier of the dragged UI control. The drag data 1 may further include a type (for example, a UI control) of the dragged object and/or an indication indicating that the drag data 1 is related data in a drag start event.

S2104: Send drag data 2 to the PC in a process in which the UI control continues to be dragged on the mobile phone.

The drag data 2 may be second drag data in this application. The drag data 2 may include coordinate information of a first corner of the shadow. The first corner may be any one of the upper left corner, the lower left corner, the upper right corner, and the lower right corner of the shadow. In some other embodiments, the drag data 2 may alternatively include coordinate information of a plurality of corners of the upper left corner, the lower left corner, the upper right corner, and the lower right corner of the shadow. In the following embodiment, an example in which the drag data 2 includes the coordinate information of the first corner of the shadow and the first corner is the upper left corner is used for description.

The drag data 2 may further include an indication indicating that the drag data 2 is related data in a drag movement event.

S2105: The PC receives the drag data 1 and the drag data 2. When it is determined that the UI control has a region that overflows the touchscreen of the mobile phone, the PC displays a partial region of the UI control based on the received drag data 1 and drag data 2.

It should be noted that, in S2103 to S2105 in this embodiment, specific descriptions of determining whether the drag intent is cross-device drag, determining a drag direction, determining the target device, and displaying the partial region of the UI control by the target device based on the drag data 1 and the drag data 2 are similar to descriptions of corresponding content in S403 to S405 in the embodiment shown in FIG. 4. Details are not described herein again.

For example, with reference to FIG. 3 and the examples shown in FIG. 23(*a*) and FIG. 23(*b*) and FIG. 24(*a*) and FIG. 24(*b*), after the mobile phone receives the user operation in S2101, the mobile phone (for example, a third-party application at the application layer of the mobile phone, which is specifically a music player) triggers drag for the UI control on the mobile phone. The drag service module at the application layer of the mobile phone may obtain the drag data 1 and send the obtained drag data 1 to the target device for cross-device drag, for example, a television. In a process of dragging the UI control, the drag service module at the application layer of the mobile phone may obtain the drag data 2 and send the drag data 2 to the target device.

Figure 25:
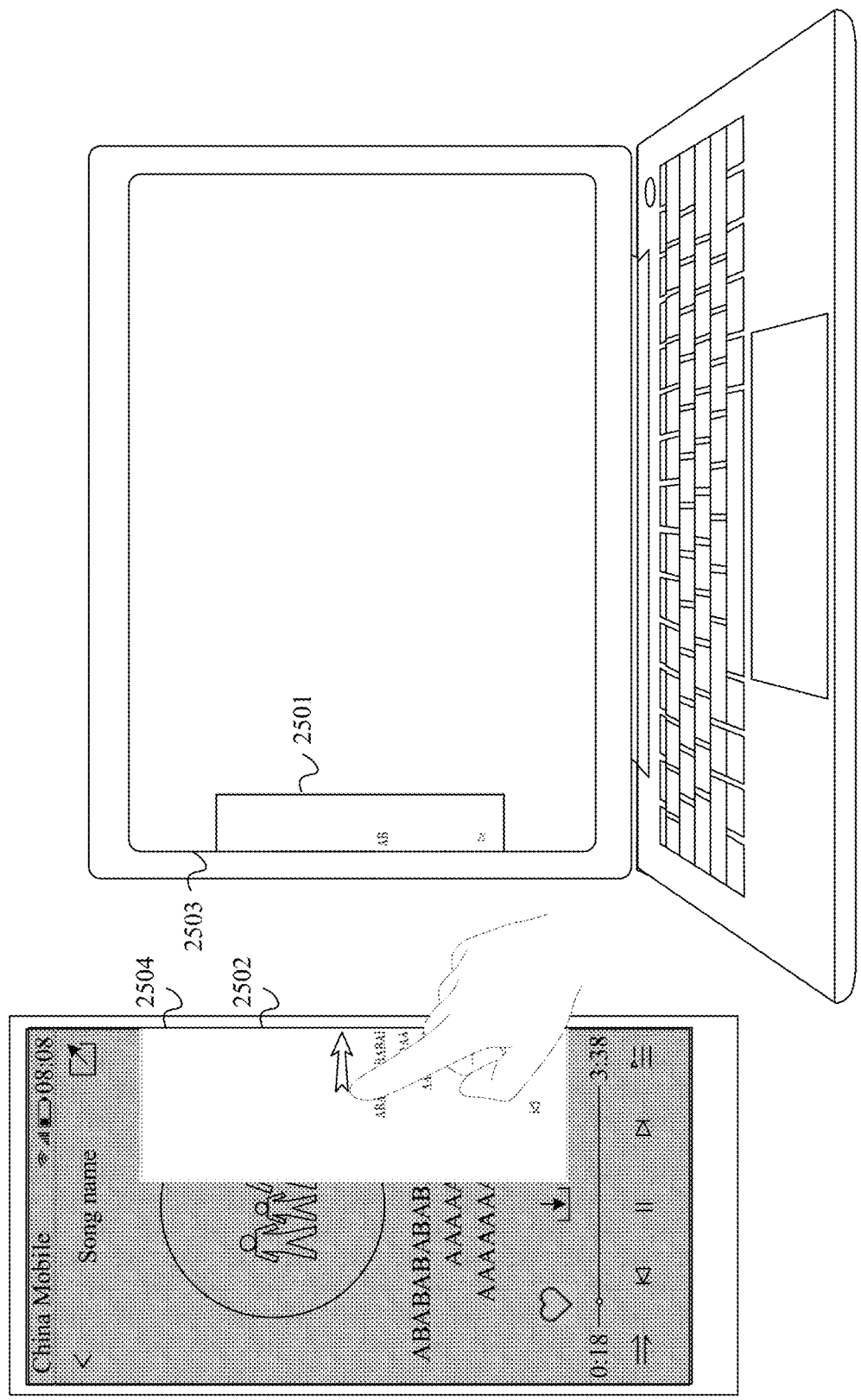
FIG. 25 is a schematic diagram of still another cross-device object drag interface according to an embodiment of this application.

A drag service module at an application layer of the PC may receive the drag data 1 and the drag data 2. When the drag service module at the application layer of the PC determines, based on the received drag data 1 and drag data 2, that the dragged UI control, for example, the shadow of the dragged UI control, has the region that overflows the touchscreen of the mobile phone, the drag service module at the application layer of the PC may determine a specific region that overflows the touchscreen of the mobile phone and that is of the shadow, and send a determined result and the shadow to a framework layer of the PC. The framework layer draws a partial region of the shadow based on the determined result of the specific region that overflows the touchscreen of the mobile phone and that is of the shadow, and displays the partial region of the shadow on a display of the PC. For example, as shown in FIG. 25, the shadow displayed by the PC is shown by 2501. It can be seen that content in the shadow 2501 is the same as content in a part that overflows the mobile phone and that is of a shadow 2502, or the shadow 2501 and a part that is displayed on the mobile phone and that is of a shadow 2502 can present complete content in the shadow 2502. In addition, the shadow 2502 is dragged rightward, and a drag-in location of the shadow 2501 is on the left edge 2503 of the PC. In addition, a drag-out location is the center location of the right edge 2504 of the touchscreen of the mobile phone, and the drag-in location also is specifically the center location of the left edge 2503. In this way, a visual effect provided for the user is that the UI control is dragged from the mobile phone to a target device end for cross-device drag, namely, the PC.

It may be understood that, as the UI control continues to be dragged on the mobile phone, the mobile phone may dynamically adjust, based on the user operation, a size of a region that is displayed on the touchscreen of the mobile phone and that is of the shadow. In addition, the mobile phone obtains the drag data 2 in real time and sends the drag data 2 to the PC in real time. The PC may dynamically adjust, based on the received drag data 2, a size of the region that is displayed on the display of the PC and that is of the shadow. A specific implementation is similar to descriptions of corresponding content in the embodiment shown in FIG. 4. Details are not described herein again.

S2106: The mobile phone receives a drag release user operation.

S2107: In response to the user operation in S2106, the mobile phone projects the dragged UI control onto the PC for display.

Specific descriptions of S2106 and S2107 in this embodiment are similar to descriptions of corresponding content in S406 and S407 in the embodiment shown in FIG. 4. A difference lies in that, in this embodiment, the mobile phone performs instruction extraction on the first interface to obtain an instruction stream corresponding to the first interface. After the mobile phone sends the obtained instruction stream to the PC, the PC may extract, from the instruction stream based on the identifier of the dragged UI control included in the drag data 1, a canvas (canvas) instruction corresponding to the dragged UI control. In this way, the dragged UI control is displayed on the PC based on the canvas instruction. The dragged UI control may be displayed in the middle or on an edge of a screen of the PC in a floating manner. For example, the PC provides a surface view to display content of the canvas instruction. The content is the UI control. The PC may display each UI control based on a pre-configured layout file when the UI control is displayed by the surface view. The layout file includes a configuration of a drawing region of each UI control (for example, a configuration including the identifier, a location, and a style of the UI control), and the drawing regions of the UI controls do not overlap. In addition, the drawing region of each UI control in the layout file may not correspond to a region of a corresponding UI control on an original interface. In other words, re-layout of the UI control may be implemented by using the layout file. The UI control may be displayed on the PC in a form of a window. In addition, in this embodiment, the UI control supports in being displayed on the display of the target device for cross-device drag, for example, the PC, in a form of a floating window.

Figure 26:
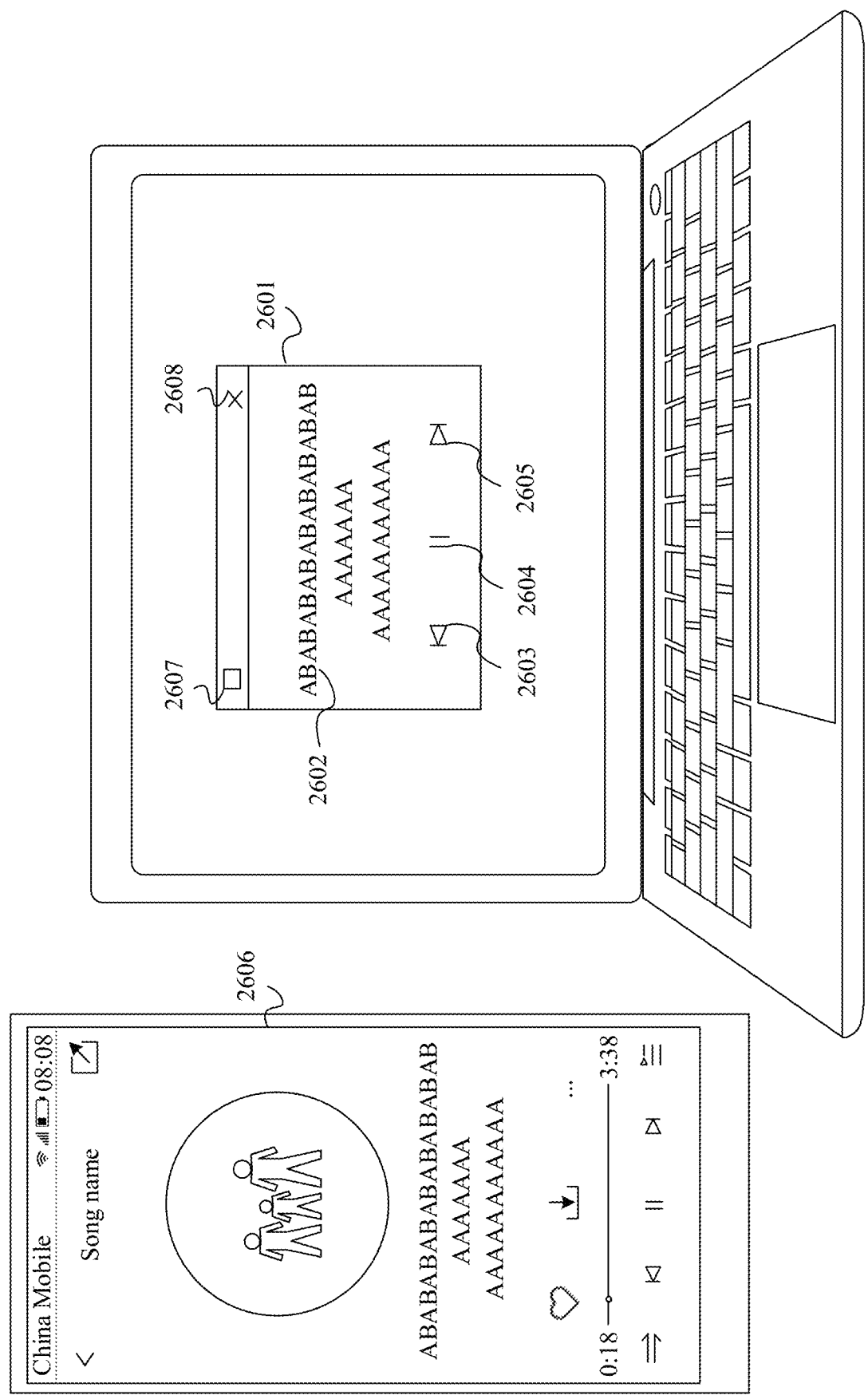
FIG. 26 is a schematic diagram of still another cross-device object drag interface according to an embodiment of this application.

For example, with reference to FIG. 3 and the examples shown in FIG. 23(a) and FIG. 23(b), FIG. 24(a) and FIG. 24(b), and FIG. 25, after triggering cross-device drag, the user stops moving the finger and uplifts the finger. Correspondingly, the mobile phone may receive the drag release user operation. In response to the operation, the mobile, for example, the drag service module of the mobile phone, may obtain an instruction stream of a current display interface, and send the instruction stream to the PC. After receiving the instruction stream, the drag service module of the PC may send the obtained instruction stream to the framework layer of the PC. The framework layer of the PC may extract, from the instruction stream based on the identifier of the dragged UI control included in the drag data 1, the canvas instruction corresponding to the dragged UI control, then implement re-layout of the UI control based on the pre-configured layout file and the canvas instruction, and as shown in FIG. 26, draw the corresponding UI controls and display the corresponding UI controls, for example, which includes a lyric 2602, a previous button 2603, a play/pause button 2604, and a next button 2605, in a window 2601. It can be seen that a layout of the dragged UI controls projected onto the PC is different from a layout of these controls on the mobile phone. In addition, as shown in FIG. 26, for the mobile phone, after receiving the drag release user operation, an interface 2606 displayed by the mobile phone may include the dragged UI control (as shown in FIG. 26), or the dragged UI control may not be shown (not shown in the figure). This is not specifically limited in this embodiment.

The user may further implement control, for example, a control operation such as scaling up or reverse control, on the window 2601 by using an input device (for example, a mouse) of the PC. For example, the window 2601 further includes a button 2607. The user may perform a click operation on the button 2607 by using the mouse of the PC, and in response to the click operation, the window 2601 is displayed on the display of the PC in full screen. For another example, the window 2601 further includes a button 2608. The user may perform a click operation on the button 2608 by using the mouse of the PC, and in response to the click operation, the window 2601 stops being displayed on the display of the PC. In addition, the PC may further send a projection exit request to the mobile phone, and after receiving the request, the mobile phone stops projection of the UI control. For another example, reverse control may be control, for example, playing/pausing, playing a previous song, playing a next song, or adjusting lyric progress of music on a mobile phone end at a PC end. Specific descriptions are similar to descriptions of corresponding content in S1708 in the embodiment shown in FIG. 17. Details are not described herein again.

By using the method in the embodiment shown in FIG. 21, a UI control in an application window can be dragged from the source device to the target device. For example, the user drags a canvas of a picture editing or drawing window to a tablet computer, to perform hand drawing by using a stylus of the tablet computer, while a tool, for example, a palette or a stroke, is retained on the mobile phone.

Figure 27A:
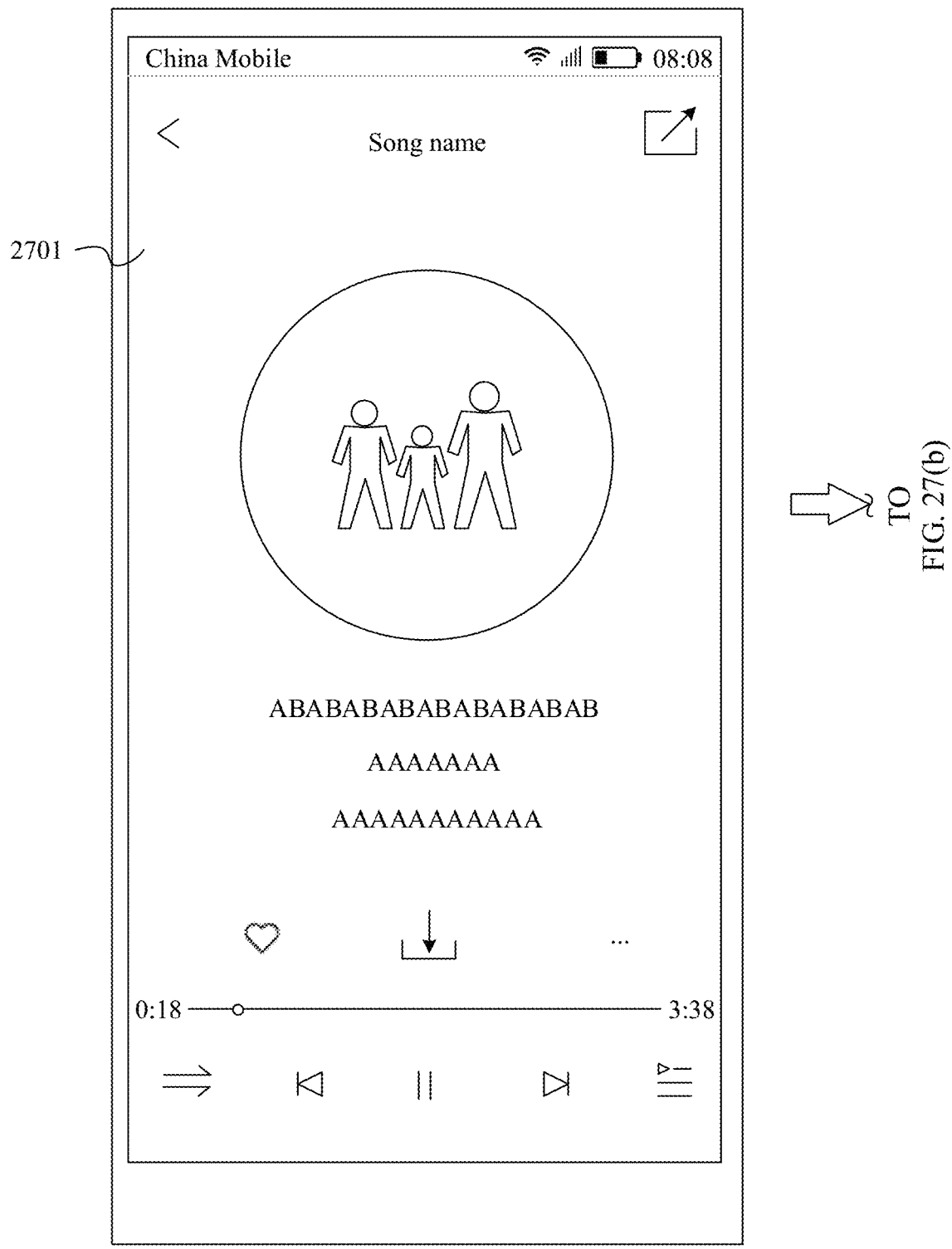
FIG. 27(a) to FIG. 27(d) are a schematic diagram of still another cross-device object drag interface according to an embodiment of this application.
Figure 27B:
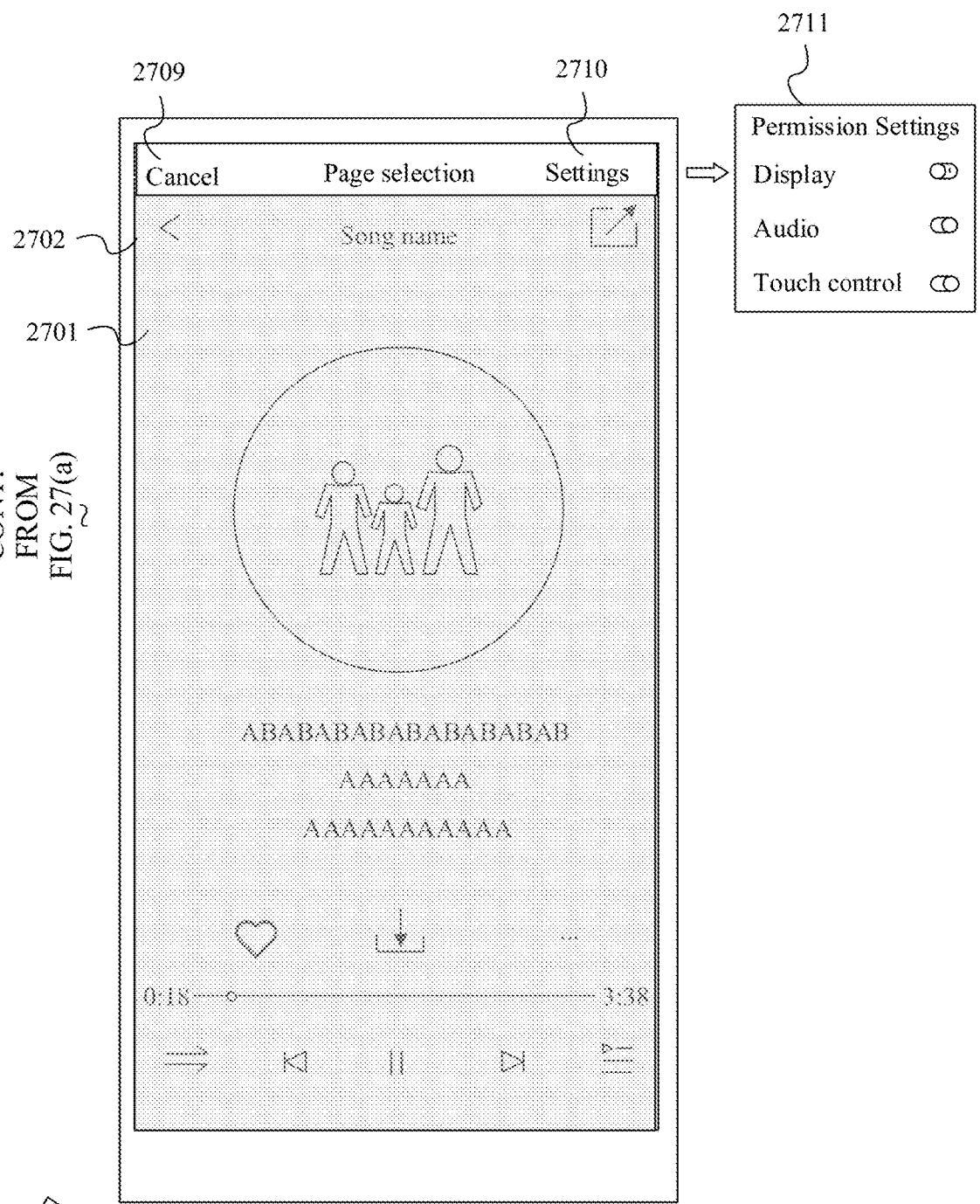
Figure 27C:
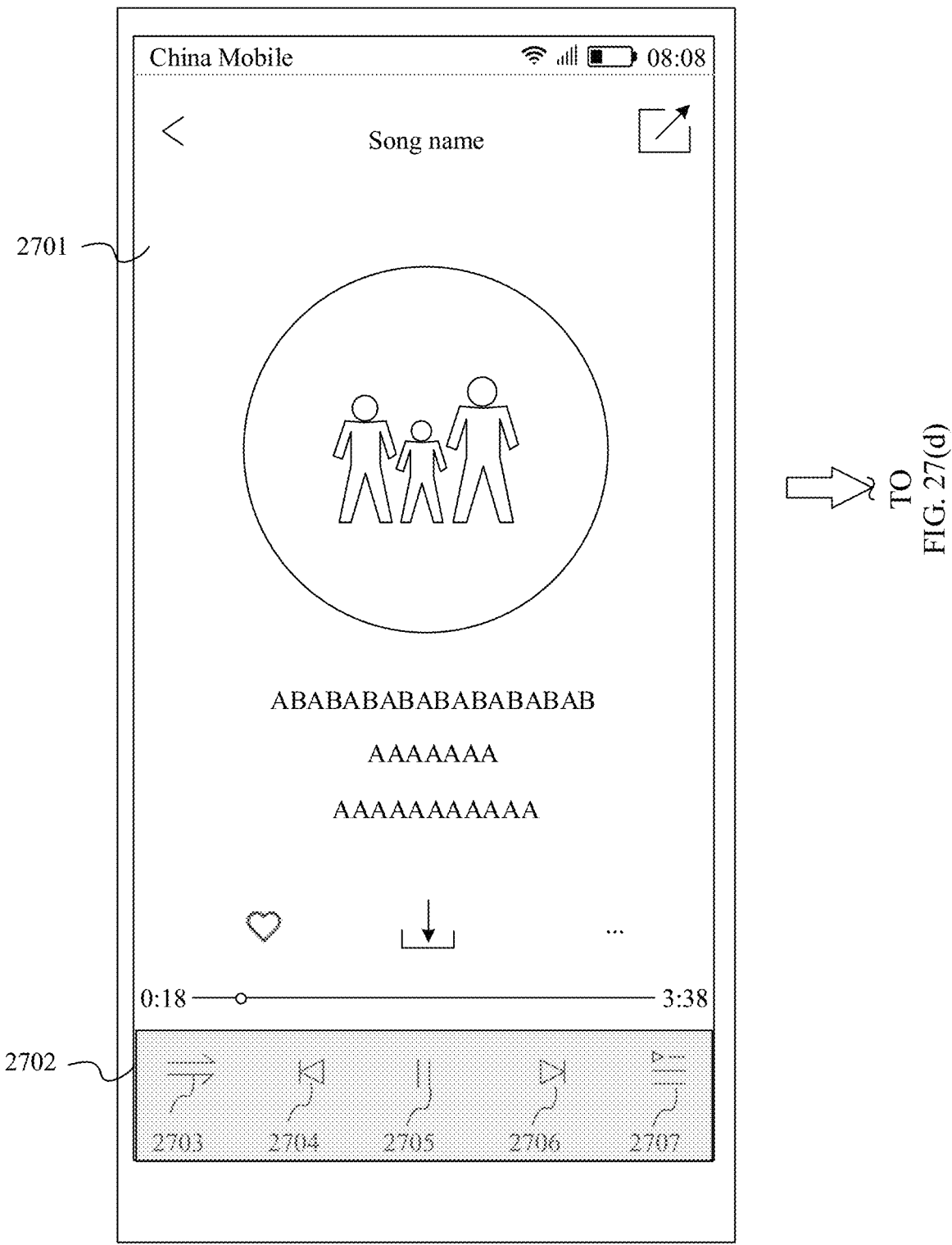
Figure 27D:
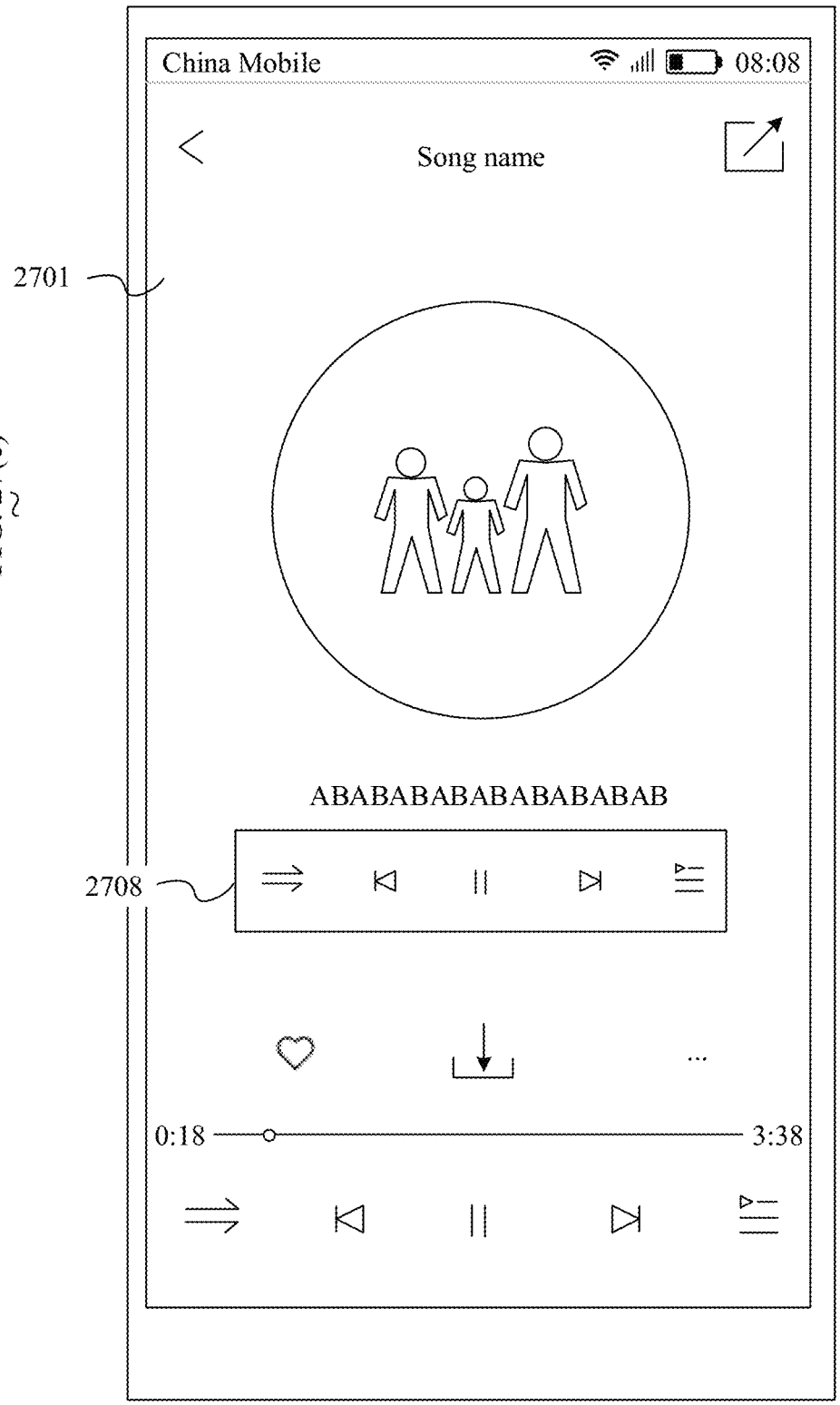

In the foregoing embodiment, how to drag the UI control on the first interface is described. In some other embodiments, the user may alternatively select, in a form of box selection (for example, drawing a circle) by using a page selection gesture, a knuckle gesture, or a finger (for example, an index finger) gesture, or by using a mouse, a region that the user wants to drag and that is of the first interface, that is, may drag a partial region of the first interface. For example, with reference to FIG. 27(a) to FIG. 27(d), the user box-selects, by using the page selection gesture, the region that the user wants to drag and that is of the first interface. As shown in FIG. 27(a), the mobile phone currently displays a first interface 2701, and the first interface 2701 is a music playing interface. When wanting to drag a partial region of the first interface 2701, the user may perform a predetermined operation. The operation may be a predefined operation used to indicate the mobile phone to enter a page selection state, for example, double taping a status bar. This is not specifically limited in this embodiment. In response to the operation, the mobile phone enters the page selection state, as shown in FIG. 27(b), and displays a selection box 2702 on the first interface 2701. The user may adjust the selection box 2702 by using a gesture operation, to select a region that the user wants to drag. A region box-selected by using the selection box 2702 is the region that the user selects and wants to drag. For example, the user adjusts, by using the gesture operation, the selection box 2702 to a location and a size shown in FIG. 27(c), and a region box-selected by an adjusted selection box 2702 is the region that the user wants to drag. Then, the user may indicate, to the mobile phone by touching and holding the adjusted selection box 2702 or by performing an operation on a button used to determine a to-be-dragged region, that the region that the user wants to drag is selected. After receiving the operation, the mobile phone may obtain an identifier of a UI control in the to-be-dragged region selected by the user. The mobile phone may generate, based on the obtained identifier of the UI control, a shadow corresponding to the selected to-be-dragged region (where a specific implementation is similar to an implementation of dragging the UI control, and details are not described herein again). For example, as shown in FIG. 27(*c*), the to-be-dragged region selected by the user includes a play mode button 2703, a previous button 2704, a play/pause button 2705, a next button 2706, and a menu button 2707. After receiving the operation that the user selects the to-be-dragged region, the mobile phone may obtain an identifier of the play mode button 2703, an identifier of the previous button 2704, an identifier of the play/pause button 2705, an identifier of the next button 2706, and an identifier of the menu button 2707. Based on these identifiers, the mobile phone may generate the shadow corresponding to the selected to-be-dragged region, for example, 2708 shown in FIG. 27(*d*). Then, the user may move the finger, and as the finger of the user moves, the mobile phone may draw and display an animation in which the shadow 2708 of the selected to-be-dragged region moves as the finger of the user moves, that is, drag the region of the interface. Then, a procedure of cross-device drag is similar to a procedure of dragging the UI control. Details are not described herein again. In addition, after the mobile phone enters the page selection state, the mobile phone may further display an exit button 2709 and a setting button 2710. The exit button 2709 is used to exit the page selection state, to normally display a page. The setting button 2710 provides a permission setting after cross-device drag. For example, after the user performs a tap operation on the setting button 2710, the mobile phone may display a permission setting option 2711. Through on/off selection for a button in the permission setting option 2711, whether the target device for cross-device drag supports display, audio, and reverse control may be controlled. For example, if display permission is enabled, after cross-device drag is completed, the dragged object, for example, the foregoing selected to-be-dragged region, may be displayed on the target device for cross-device drag. For another example, if touch permission starts, the user is allowed to perform an operation on the control in the dragged region displayed on the target device for cross-device drag, to control the source device.

It should be noted that, when the dragged object is a partial region of the first interface, in addition to the solution in the embodiment shown in FIG. 21, drag from the source device to the target device may be further implemented according to the solution in the embodiment shown in FIG. 4, and a difference lies in that the drag data 1 includes rectangle information of the dragged region, and the drag data 2 includes coordinate information of the first corner of the region. In addition, after drag is released, only the dragged region is displayed on the target device.

Figure 28A:
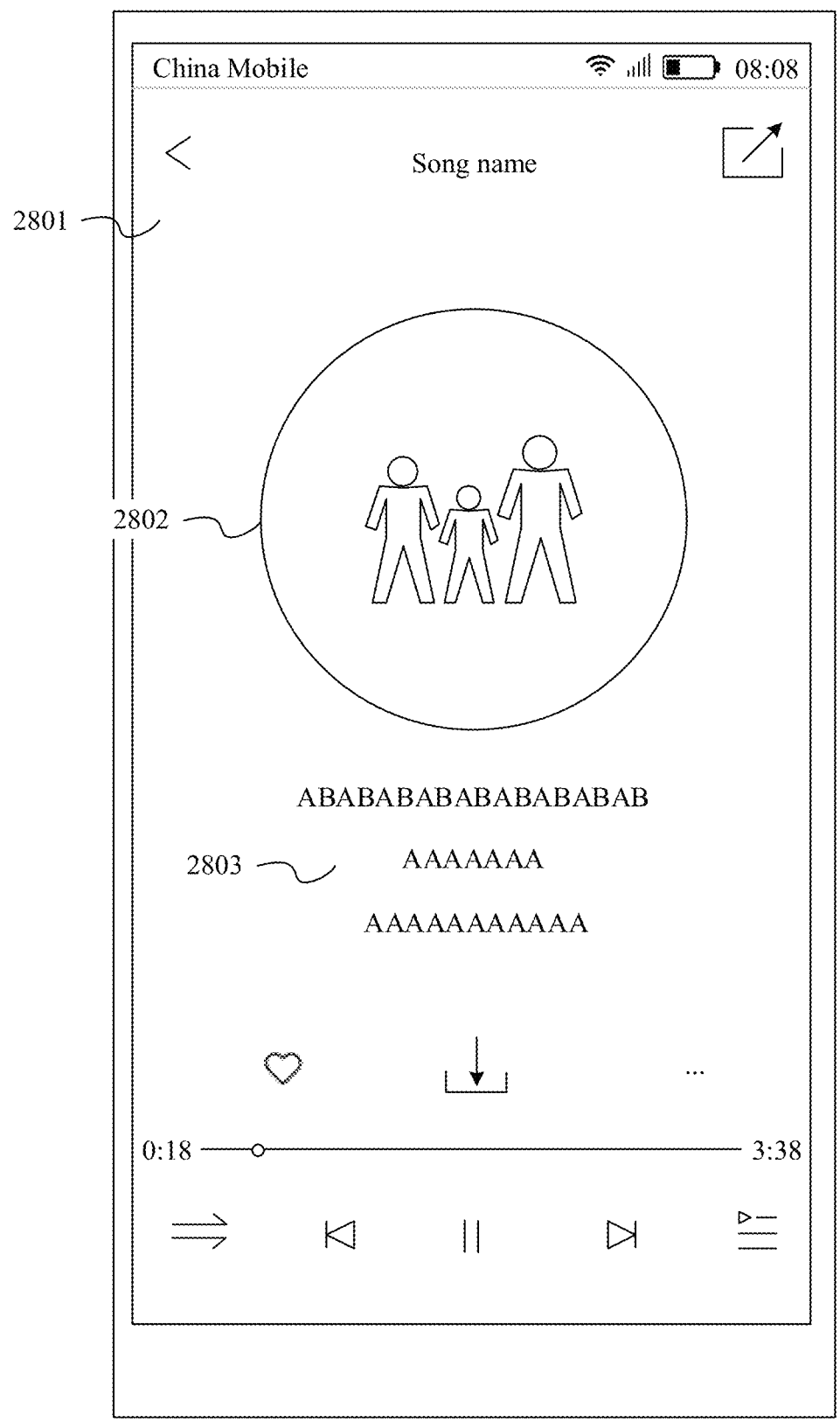
FIG. 28(a) to FIG. 28(c) are a schematic diagram of still another cross-device object drag interface according to an embodiment of this application.
Figure 28B:
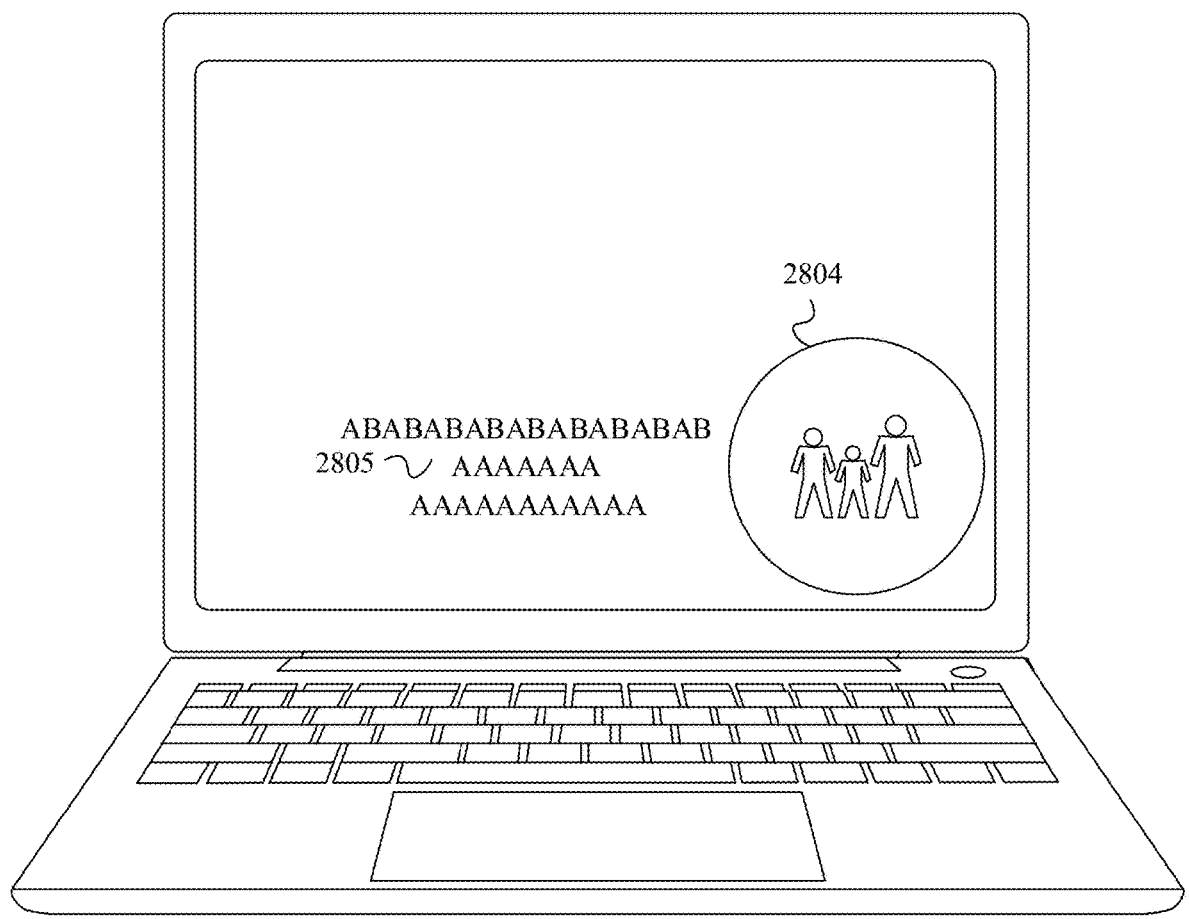
Figure 28C:
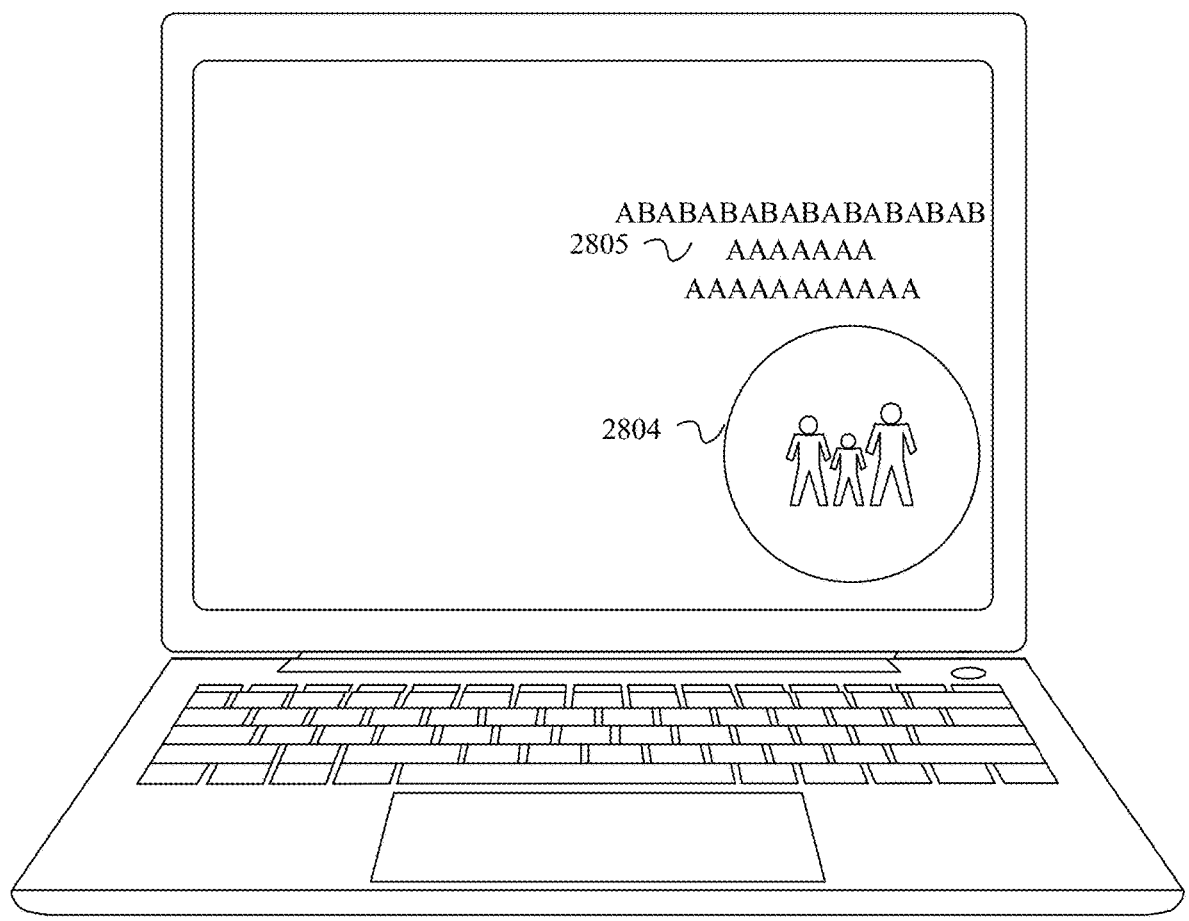

In addition, in the foregoing embodiment, an example in which the plurality of UI controls on the first interface are dragged at a time is used to describe an implementation process of dragging the UI controls. In some other embodiments, the plurality of UI controls on the first interface may be alternatively dragged for a plurality of times, and one or more UI controls may be dragged at a time. For example, with reference to FIG. 28(*a*) to FIG. 28(*c*), the user drags two controls to the PC end for two times. As shown in FIG. 28(*a*), the user may trigger drag, on the mobile phone, of a first interface 2801, for example, an album button 2802 on a music playing interface by performing the user operation in S2101. The mobile phone may obtain an identifier of the album button 2802 based on the user operation. By monitoring the album button 2802, the mobile phone may obtain control information corresponding to the album button 2802, and the mobile phone may generate a corresponding shadow based on the control information, to draw an animation in which the shadow moves with the user operation and display the animation on the mobile phone. In a process in which the user drags the control, the mobile phone may send corresponding drag data to the PC, so that the mobile phone and the PC collaborate to achieve a cross-screen drag effect. After the user releases drag, the mobile phone may project the album button 2802 onto the PC end for display. As shown in FIG. 28(*b*), the album button 2802 is projected onto the PC end for display, as shown in 2804. Then, the user may triggers drag, on the mobile phone, of the first interface 2801, for example, a lyric 2803 on the music playing interface by re-performing the user operation in S2101. Similarly, the mobile phone may collaborate with the PC to implement a cross-screen drag effect of the lyric 2803. After the user releases drag, the mobile phone may project the lyric 2803 onto the PC end for display. As shown in FIG. 28(*b*), the lyric 2804 is projected onto the PC end for display, as shown in 2805. It should be noted that, after drag is released for the first time, descriptions of projecting the album button 2802 onto the PC end for display are the same as descriptions of corresponding content in the foregoing embodiment. After drag is released for the second time, projection and display of the UI control are also similar to descriptions of corresponding content described above. A difference lies in that, when the UI control is projected for the second time, the UI control dragged for the first time also needs to be added, to achieve an effect of projecting and displaying all UI controls dragged for two times on the target device. In addition, after the UI control is projected onto the PC for display, this embodiment may further support processing, for example, moving or scaling up, the projected and displayed UI control by the user on the PC end. For example, as shown in FIG. 28(*c*), the user may move the lyric 2805 displayed on the PC from the left to the top of the album button 2804.

It should be noted that descriptions of other content in this embodiment are similar to descriptions of corresponding content in FIG. 4. Details are not described herein again. In addition, a specific implementation when the dragged object is a widget (for example, a clock widget, a card widget, a calendar widget, or a music widget) is similar to a specific implementation when the dragged object is the UI control in the embodiment shown in FIG. 21. Details are not described herein again.

In conclusion, by using the method provided in this embodiment, the user is allowed to drag, by using an input device, for example, a mouse or a touchscreen, a window, a UI element, or a UI control on an interface from one terminal to another terminal that is collaboratively used with the terminal, to improve usage efficiency of collaboratively using a plurality of terminals, make drag more direct and explicit, and improve user experience in drag. This breaks a barrier between screens and systems of different terminals, and can implement dragging an application window and various UI elements (for example, a floating window and the UI control) without depending on a projection window. In addition, the source device and the target device end collaboratively display the animation of the dragged object based on drag of the user, so that the drag animation is smoothly and intuitively presented to the user. In addition, a drag target end device does not need to be used as an extended screen of the source device, to implement cross-device and cross-system window drag in a real sense. In addition, the user can implement window drag without installing other auxiliary software in advance.

It should be noted that, in the foregoing embodiments, an example in which the object is dragged from the source device to the target device is used for description. The user may alternatively drag the object from the target device to the source device. A specific implementation is similar to an implementation of dragging the object from the source device to the target device. Details are not described herein again.

Figure 29:
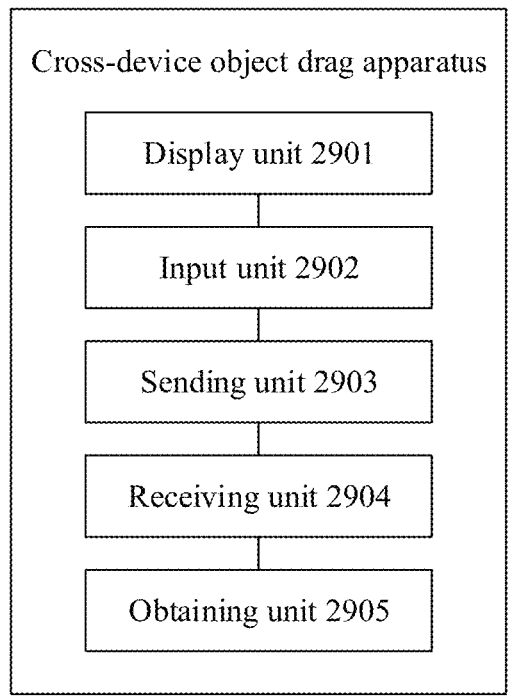
FIG. 29 is a schematic diagram of composition of a cross-device object drag apparatus according to an embodiment of this application.

FIG. 29 is a schematic diagram of composition of a cross-device object drag apparatus according to an embodiment of this application. As shown in FIG. 29, the apparatus may be used in a first terminal (for example, the foregoing mobile phone). The first terminal is connected to a second terminal. The apparatus may include a display unit 2901, an input unit 2902, and a sending unit 2903.

The display unit 2901 is configured to display an object on a display of the first terminal.

The input unit 2902 is configured to receive a drag operation entered by a user, where the drag operation is used to initiate drag for the object.

The display unit 2901 is further configured to display, by the first terminal on the display of the first terminal in response to the drag operation, an animation in which the object moves with the drag operation.

The sending unit 2903 is configured to drag data to the second terminal after it is determined that a drag intent of the user is cross-device drag, where the drag data is used by the second terminal to display the object on a display of the second terminal.

Further, the display unit 2901 is further configured to: in a process in which the object moves on the display of the first terminal, display a second region of the object on the display of the first terminal when a first region of the object is dragged out of the display of the first terminal.

The drag data is specifically used by the second terminal to display the first region of the object on the display of the second terminal. The second region of the object displayed on the first terminal and the first region of the object displayed on the second terminal can present complete content of the object.

Further, the drag operation includes at least an operation of triggering the object to move. The second region of the object displayed by the display unit 2901 on the display of the first terminal dynamically changes with the operation.

Further, the apparatus may further include: a receiving unit 2904, configured to receive third drag data from the second terminal, where the third drag data is sent by the second terminal to the first terminal after the second terminal receives a drag operation of the user on the first region of the object displayed on the second terminal, and the third drag data includes coordinate information of a first corner of the object.

The second region of the object displayed by the display unit 2901 on the display of the first terminal dynamically changes with a change of the third drag data.

Further, the drag data may include first drag data and second drag data.

The apparatus may further include: an obtaining unit 2905, configured to obtain the first drag data from a drag start event when the object starts to be dragged; and obtain the second drag data from a drag movement event in the process in which the object moves on the display of the first terminal.

Further, the object may be a window or a partial region of a window, and the window includes an interface of an application. The first drag data may include the interface of the application and rectangle information of the object. The second drag data may include the coordinate information of the first corner of the object.

Further, the input unit 2902 is further configured to receive a drag release operation entered by the user, where the drag release operation is used to indicate that drag for the object ends.

The sending unit 2903 is further configured to send data to the second terminal in response to the drag release operation, where the data is used by the second terminal to display the interface of the application or a partial region of the interface of the application on the display of the second terminal.

Further, the first drag data may further include an application label of the application, and the application label is used by the second terminal to start a local application that is on the second terminal and that corresponds to the application label.

The input unit 2902 is further configured to receive a drag release operation entered by the user, where the drag release operation is used to indicate that drag for the object ends.

The sending unit 2903 is further configured to send indication information to the second terminal in response to the drag release operation, where the indication information indicates that drag for the object ends.

Further, the window may be an application window or a freeform window.

Further, the object may be a video component, a floating window, a picture-in-picture, or a freeform window. The first drag data may include rectangle information of the object, and a layer name of the object on a current display interface of the first terminal. The second drag data may include the coordinate information of the first corner of the object.

Further, after the first terminal determines that the drag intent of the user is cross-device drag, the sending unit 2903 is further configured to send screen recording data to the second terminal, where the screen recording data and the drag data are used by the second terminal to display a partial region or an entire region of the object on the display of the second terminal.

Further, the input unit 2902 is further configured to receive a drag release operation entered by the user, where the drag release operation is used to indicate that drag for the object ends.

The sending unit 2903 is further configured to send indication information to the second terminal in response to the drag release operation, where the indication information indicates the second terminal to display the entire region of the object on the display of the second terminal.

Further, the object is a UI control on a first interface, or the object is a partial region of a first interface, and the partial region includes a UI control.

The display unit 2901 is specifically configured to display, on the display of the first terminal in response to the drag operation, an animation in which a shadow of the object moves with the drag operation, where the first drag data includes rectangle information of the shadow, the shadow, and an identifier of the UI control, and the second drag data includes coordinate information of a first corner of the shadow.

Further, the input unit 2902 is further configured to receive a drag release operation entered by the user, where the drag release operation is used to indicate that drag for the object ends.

The obtaining unit 2905 is further configured to obtain an instruction stream of the first interface.

The sending unit 2903 is further configured to send the instruction stream of the first interface to the second terminal. The instruction stream and the identifier of the UI control are used by the second terminal to display the UI control on the display of the second terminal.

Further, the apparatus may further include: a determining unit, configured to determine that the second region of the object displayed on the first terminal is less than a first threshold, or determine that the first region that is dragged out of the display of the first terminal is greater than a second threshold.

In another possible implementation, the display unit 2901 is further configured to display the second region of the object on the display of the first terminal when it is determined that the second region of the object displayed on the first terminal is greater than the first threshold, or it is determined that the first region that is dragged out of the display of the first terminal is less than the second threshold.

Further, the determining unit is further configured to determine that the drag intent of the user is cross-device drag.

The determining unit is specifically configured to determine that the object is dragged to a drag sensing region disposed on an edge of the display of the first terminal; or determine that a distance between the object and an edge of the display of the first terminal is less than a predetermined distance.

Further, the determining unit is further configured to determine that a target device for cross-device drag is the second terminal.

Further, the display unit 2901 is further configured to display information about at least two candidate terminals. The at least two candidate terminals include a terminal connected to the first terminal, and/or a terminal that is not connected to the first terminal but whose distance from the first terminal is within a connectable range.

The input unit 2902 is further configured to receive a selection operation of the user on information about at least one second terminal. The determining unit is specifically configured to determine, based on the selection operation of the user, that the target device for cross-device drag is the second terminal.

If the second terminal selected by the user is not connected to the first terminal, the apparatus may further include: a connection unit 2907, configured to establish a connection to the second terminal.

In another possible implementation, the display unit 2901 is further configured to display prompt information when it is determined that the drag intent of the user is cross-device drag, where the prompt information is used to prompt that the object is to be dragged out of the display of the first terminal.

Figure 30:
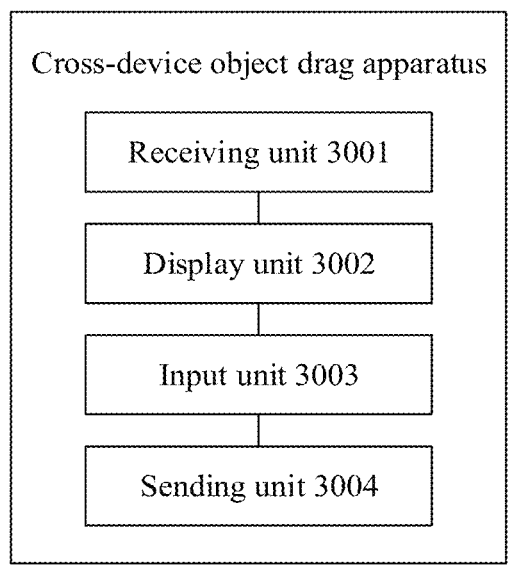
FIG. 30 is a schematic diagram of composition of another cross-device object drag apparatus according to an embodiment of this application.

FIG. 30 is a schematic diagram of composition of a cross-device object drag apparatus according to an embodiment of this application. As shown in FIG. 30, the apparatus may be used in a second terminal (for example, the tablet computer, the television, or the PC), and the second terminal is connected to a first terminal. The apparatus may include a receiving unit 3001 and a display unit 3002.

The receiving unit 3001 is configured to receive drag data from the first terminal. The drag data is sent by the first terminal after the first terminal determines that a drag intent of a user to drag an object on a display of the first terminal is cross-device drag.

The display unit 3002 is configured to display the object on a display of the second terminal based on the drag data.

Further, the display unit 3002 is specifically configured to display a first region of the object on the display of the second terminal based on the drag data when it is determined that the first region of the object is dragged out of the display of the first terminal, where a second region of the object displayed on the first terminal and the first region of the object displayed on the second terminal can present complete content of the object.

Further, the drag data includes first drag data and second drag data, and the first region of the object displayed by the display unit 3002 on the display of the second terminal dynamically changes with a change of the second drag data.

Further, the apparatus may further include an input unit 3003, configured to receive a drag operation of the user on the first region of the object displayed on the display of the second terminal.

The first region of the object displayed by the display unit 3002 on the display of the second terminal dynamically changes with the drag operation.

Further, the apparatus further includes: a sending unit 3004, configured to send third drag data to the first terminal, where the third drag data includes coordinate information of a first corner of the object, and is used by the first terminal to dynamically adjust the second region of the object displayed on the display of the first terminal.

Further, the object is a window or a partial region of a window, and the window includes an interface of an application. The first drag data includes the interface of the application and rectangle information of the object. The second drag data includes coordinate information of a first corner of the object.

Further, the receiving unit 3001 is further configured to receive data from the first terminal, where the data is sent by the first terminal after the user enters a drag release operation, and the drag release operation is used to indicate that drag for the object ends.

The display unit 3002 is further configured to display the interface of the application on the display of the second terminal based on the data, or display a partial region of the interface of the application on the display of the second terminal based on the data and the drag data.

Further, the first drag data further includes an application label of the application.

The receiving unit 3001 is further configured to receive indication information from the first terminal, where the indication information is sent by the first terminal after the user enters a drag release operation, and indicates that drag for the object ends.

The display unit 3002 is further configured to start a local application that is on the second terminal and that corresponds to the application label, and display an interface of the application corresponding to the application label, or display a partial region of the interface of the application corresponding to the application label based on the drag data.

Further, the window is an application window or a free-form window.

Further, the object is a video component, a floating window, a picture-in-picture, or a freeform window. The first drag data includes rectangle information of the object, and a layer name of the object on a current display interface of the first terminal. The second drag data includes coordinate information of a first corner of the object.

Further, the receiving unit 3001 is further configured to receive screen recording data from the first terminal.

The display unit 3002 is specifically configured to display the first region of the object on the display of the second terminal based on the drag data and the screen recording data when it is determined that the first region of the object is dragged out of the display of the first terminal.

Further, the receiving unit 3001 is further configured to receive indication information from the first terminal, where the indication information is sent by the first terminal after the user enters a drag release operation.

The display unit 3002 is further configured to display an entire region of the object on the display of the second terminal in response to the indication information based on the screen recording data.

Further, the object is a UI control on a first interface, or the object is a partial region of a first interface, and the partial region includes a UI control.

The display unit 3002 is specifically configured to display a first region of a shadow of the object on the display of the second terminal based on the drag data when it is determined that the first region of the object is dragged out of the display of the first terminal, where the first drag data includes rectangle information of the shadow, the shadow, and an identifier of the UI control, and the second drag data includes coordinate information of a first corner of the shadow.

Further, the receiving unit 3001 is further configured to receive an instruction stream from the first interface of the first terminal.

The display unit 3002 is further configured to display the UI control on the display of the second terminal based on the instruction stream and the identifier of the UI control.

Further, a layout of the UI control on the display of the second terminal is different from a layout of the UI control on the first interface.

Further, the display unit 3002 is further configured to display the first region of the object on the display of the second terminal.

Further, the display unit 3002 is further configured to display prompt information, where the prompt information is used to prompt that the object is to be dragged to the display of the second terminal.

An embodiment of this application further provides a cross-device object drag apparatus. The apparatus may be used in the first terminal or the second terminal in the foregoing embodiments. The apparatus may include a processor, and a memory configured to store instructions that can be executed by the processor. When executing the instructions, the processor is configured to implement functions or steps performed by the mobile phone, the tablet computer, the PC, or the television in the foregoing method embodiments.

An embodiment of this application further provides a terminal (the terminal may be the first terminal or the second terminal in the foregoing embodiments). The terminal may include a display, a memory, and one or more processors. The display and the memory are coupled to the processor. The memory is configured to store computer program code. The computer program code includes computer instructions. When the processors execute the computer instructions, the terminal may perform functions or steps performed by the mobile phone, the tablet computer, the PC, or the television in the foregoing method embodiments. Certainly, the terminal includes but is not limited to the foregoing display, memory, and one or more processors. For example, for a structure of the terminal, refer to the structure of the mobile phone shown in FIG. 2.

Figure 31:
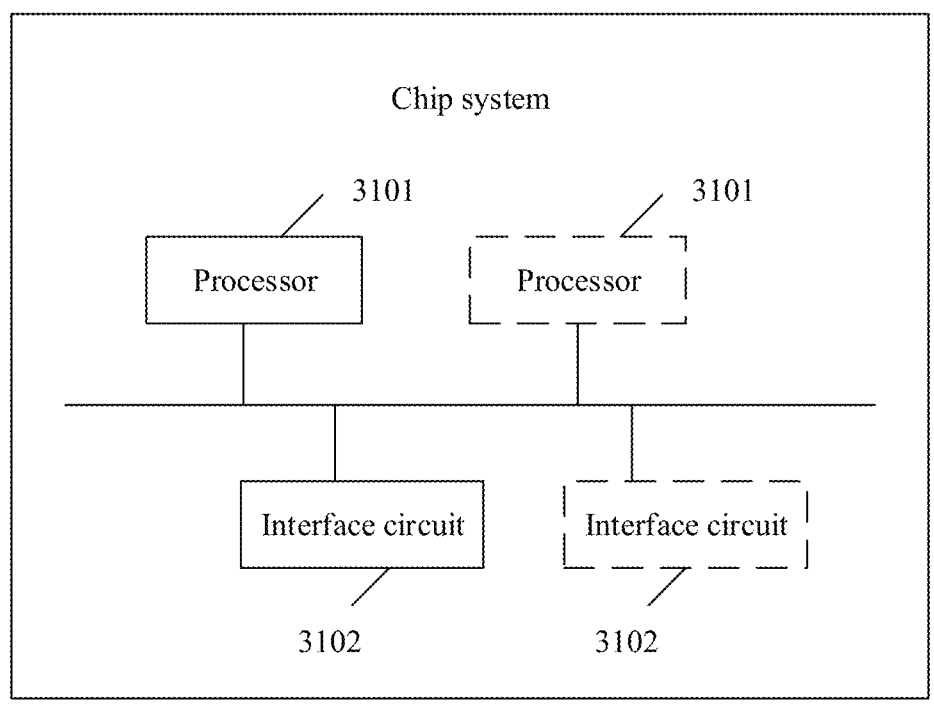
FIG. 31 is a schematic diagram of composition of a chip system according to an embodiment of this application.

An embodiment of this application further provides a chip system. The chip system may be used in the terminal (for example, the first terminal or the second terminal) in the foregoing embodiments. As shown in FIG. 31, the chip system includes at least one processor 3101 and at least one interface circuit 3102. The processor 3101 may be the processor in the foregoing terminal. The processor 3101 and the interface circuit 3102 may be connected to each other through a line. The processor 3101 may receive computer instructions from the memory of the terminal through the interface circuit 3102 and execute the computer instructions. When the computer instructions are executed by the processor 3101, the terminal is enabled to perform steps performed by the mobile phone, the tablet computer, the PC, or the television in the foregoing embodiments. Certainly, the chip system may further include another discrete device. This is not specifically limited in this embodiment of this application.

An embodiment of this application further provides a computer-readable storage medium, configured to store computer instructions run by the terminal (for example, the mobile phone, the tablet computer, the PC, or the television).

An embodiment of this application further provides a computer program product, including computer instructions run by the terminal (for example, the mobile phone, the tablet computer, the PC, or the television).

The foregoing descriptions about implementations allow a person skilled in the art to clearly understand that, for the purpose of convenient and brief description, division into the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A first terminal, comprising:
   at least one processor; and
   a memory coupled to the at least one processor and configured to store programming instructions that, when executed by the at least one processor, cause the first terminal to:
   display an object on a display of the first terminal;
   receive a drag operation for dragging the object;
   display, on the display of the first terminal in response to the drag operation, an animation in which the object moves with the drag operation;
   determine a first edge from which the object is to be dragged out based on direction of the drag operation;
   display a first interface element on the first edge after determining that a distance between the object and the first edge is less than a predetermined distance, and
   send drag data to the second terminal, wherein the drag data is used by the second terminal to display the object on a display of the second terminal.

2. The first terminal according to claim 1, wherein the programming instructions, when executed by the at least one processor, further cause the first terminal to:
   in a process in which the object moves on the display of the first terminal, display a second region of the object on the display of the first terminal when a first region of the object is dragged out of the display of the first terminal, wherein
   the drag data is used by the second terminal to display the first region of the object on the display of the second terminal, and the second region of the object displayed on the first terminal and the first region of the object displayed on the second terminal can implement complete presentation of content of the object.

3. The first terminal according to claim 1, wherein the drag operation comprises at least an operation of triggering the object to move, and the second region of the object displayed on the display of the first terminal dynamically changes with the operation.

4. The first terminal according to claim 1, wherein after the display a second region of the object on the display of the first terminal, the programming instructions, when executed by the at least one processor, further cause the first terminal to:
   receive third drag data from the second terminal, wherein the third drag data is sent by the second terminal to the first terminal after the second terminal receives a drag operation for the first region of the object displayed on the second terminal, and the third drag data comprises coordinate information of a first corner of the object, wherein
   the second region of the object displayed on the display of the first terminal dynamically changes with a change of the third drag data.

5. The first terminal according to claim 1, wherein the drag data comprises first drag data and second drag data; and
   before sending the drag data to the second terminal, the programming instructions, when executed by the at least one processor, further cause the first terminal to:
   obtain the first drag data from a drag start event when the object starts to be dragged; and
   obtain the second drag data from a drag movement event in the process in which the object moves on the display of the first terminal.

6. The first terminal according to claim 5, wherein the object is a window or a partial region of a window, and the window comprises an interface of an application;
   the first drag data comprises the interface of the application and rectangle information of the object; and
   the second drag data comprises coordinate information of a first corner of the object.

7. The first terminal according to claim 5, wherein the object is a video component, a floating window, a picture-in-picture, or a freeform window;
   the first drag data comprises rectangle information of the object, and a layer name of the object on a current display interface of the first terminal; and
   the second drag data comprises coordinate information of a first corner of the object.

8. The first terminal according to claim 7, wherein after the first terminal determines that a drag intent of the drag operation is cross-device drag, the programming instructions, when executed by the at least one processor, further cause the first terminal to:
   send screen recording data to the second terminal, wherein the screen recording data and the drag data are used by the second terminal to display a partial region or an entire region of the object on the display of the second terminal.

9. The first terminal according to claim 1, wherein after sending drag data to the second terminal, the programming instructions, when executed by the at least one processor, further cause the first terminal to:
   receive a drag release operation that is used to indicate that drag for the object ends; and
   send indication information to the second terminal in response to the drag release operation, wherein the indication information is used to indicate the second terminal to display the entire region of the object on the display of the second terminal.

10. A second terminal, comprising:
    at least one processor; and
    a memory coupled to the at least one processor and configured to store programming instructions that, when executed by the at least one processor, cause the second terminal to:

receive drag data from the first terminal, wherein the drag data is sent by the first terminal after the first terminal detects a drag intent of a cross-device drag on a first edge of the display of the first terminal;

display a second interface element on a second edge in which the object is to be dragged, wherein the second interface element indicates the first terminal from which the object is dragged out, and display the object on a display of the second terminal based on the drag data.

11. The second terminal according to claim 10, wherein the display the object on the display of the second terminal based on the drag data comprises:

display a first region of the object based on the drag data on the display of the second terminal when determining that the first region of the object is dragged out of the display of the first terminal, wherein a second region that is of the object and that is displayed on the first terminal and the first region of the object displayed on the second terminal can implement complete presentation of content of the object.

12. The second terminal according to claim 10, wherein the drag data comprises first drag data and second drag data; and the first region of the object displayed on the display of the second terminal dynamically changes with a change of the second drag data.

13. The second terminal according to claim 12, wherein the object is a window or a partial region of a window, and the window comprises an interface of an application;

the first drag data comprises the interface of the application and rectangle information of the object; and the second drag data comprises coordinate information of a first corner of the object.

14. The second terminal according to claim 12, wherein the object is a video component, a floating window, a picture-in-picture, or a freeform window;

the first drag data comprises rectangle information of the object, and a layer name of the object on a current display interface of the first terminal; and the second drag data comprises coordinate information of a first corner of the object.

15. The second terminal according to claim 14, wherein the programming instructions, when executed by the at least one processor, further cause the second terminal to:

receive screen recording data from the first terminal; and the display a first region of the object based on the drag data on the display of the second terminal when determining that the first region of the object is dragged out of the display of the first terminal comprises:

display the first region of the object on the display of the second terminal based on the drag data and the screen recording data when determining that the first region of the object is dragged out of the display of the first terminal.

16. The second terminal according to claim 15, wherein after the display a first region of the object based on the drag data on the display of the second terminal when determining that the first region of the object is dragged out of the display of the first terminal, the programming instructions, when executed by the at least one processor, further cause the second terminal to:

receive indication information from the first terminal, wherein the indication information is sent by the first terminal after the user inputs a drag release operation; and display an entire region of the object on the display of the second terminal in response to the indication information based on the screen recording data.

17. The second terminal according to claim 10, wherein the programming instructions, when executed by the at least one processor, further cause the second terminal to:

receive a drag operation for the first region of the object displayed on the display of the second terminal; and the first region of the object displayed on the display of the second terminal dynamically changes with the drag operation.

18. A cross-device object drag system, comprising a first terminal and a second terminal, wherein the first terminal is connected to the second terminal;

the first terminal is configured to: display an object on a display of the first terminal; receive a drag operation for dragging the object; display, on the display of the first terminal in response to the drag operation, an animation in which the object moves with the drag operation; display a first interface element on a first edge from which the object is to be dragged out; and send drag data to the second terminal after determining that a drag intention is cross-device drag; and the second terminal is configured to receive the drag data from the first terminal; display a second interface element on a second edge in which the object is to be dragged; and display the object on a display of the second terminal based on the drag data.

19. The system according to claim 18, wherein the first terminal is further configured to: in a process in which the object moves on the display of the first terminal, display a second region of the object on the display of the first terminal when a first region of the object is dragged out of the display of the first terminal; and the second terminal is specifically configured to display the first region of the object on the display of the second terminal, wherein the second region of the object displayed on the first terminal and the first region of the object displayed on the second terminal can present complete content of the object.

20. The system according to claim 19, wherein the drag operation comprises at least an operation of triggering the object to move, and the second region of the object displayed on the display of the first terminal dynamically changes with the operation.

* * * * *